United States Patent [19]
Krishnamoorthy et al.

[11] Patent Number: 5,321,639
[45] Date of Patent: Jun. 14, 1994

[54] DUAL-SCALE TOPOLOGY OPTOELECTRONIC MATRIX ALGEBRAIC PROCESSING SYSTEM

[75] Inventors: Ashok V. Krishnamoorthy; Gary C. Marsden, both of San Diego; Joseph E. Ford; Sadik C. Esener, both of Solana Beach, all of Calif.

[73] Assignee: Regents of the University of California, Alameda, Calif.

[21] Appl. No.: 846,277

[22] Filed: Mar. 2, 1992

[51] Int. Cl.$^5$ ............................................. G06E 3/00
[52] U.S. Cl. .................................. 364/606; 364/822; 364/713; 395/25
[58] Field of Search ............... 364/807, 822, 837, 845, 364/601, 602, 713, 606; 395/25; 359/107, 108

[56] References Cited

U.S. PATENT DOCUMENTS

| | | | |
|---|---|---|---|
| 4,705,344 | 11/1987 | Hinton et al. | 364/822 |
| 4,908,751 | 3/1990 | Smith | 364/822 |
| 4,972,363 | 11/1990 | Nguyen et al. | 364/807 |
| 4,996,648 | 2/1991 | Jourjine | 395/25 |
| 5,014,096 | 5/1991 | Matsuda et al. | 395/25 |
| 5,129,041 | 7/1992 | Pernick et al. | 395/25 |

*Primary Examiner*—Jerry Smith
*Assistant Examiner*—Jim Trammell
*Attorney, Agent, or Firm*—Fuess, Davidenas & Meadows

[57] ABSTRACT

A parallel architecture matrix algebraic processing system exhibits patterns of arrayed (i) light transmitters and (ii) light receivers that are identical, but at differing scales. Planar arrays of one or more optoelectronic processors—principally semiconductor chips or chip arrays—having both computational and light input/output capabilities optically communicate from one plane to the next through free-space space-invariant optical data distributions—principally lenses and computer-generated holograms—having both replication and distribution capabilities. Each optoelectronic processor, or OP, consists of a number of arrayed optoelectronic processing elements, or OPEs. The OPEs, in turn, typically consist of a number of optoelectronic sub-processing units are preferably electrically interconnected in a tree-based structure, preferably an H-tree. Leaf units include typically one light detector plus local memory, logic circuitry, and electrical input/output. Fanning units typically include local memory, logic circuitry, and electrical input/output. A root unit typically includes electrically-connected local memory, logic circuitry, electrical input/output, and a light transmitter. Vector results of algebraic computations and combinations are flexibly performable in the units of each OPE, and variously optically distributable to other OPEs in successive OPs. The versatile algebraic vector manipulations and vector distributions support primitive functions such as intrinsic and extrinsic vector outer products; operations such as vector-matrix multiplication; and complex systems such as neural networks, fuzzy logic and relational databases. A system of $\geq 10^3$ fully optically communicating OPEs achieves capacities of $10^6$–$10^8$ interconnects, and processing speeds of $10^{12}$ interconnects/second.

77 Claims, 27 Drawing Sheets

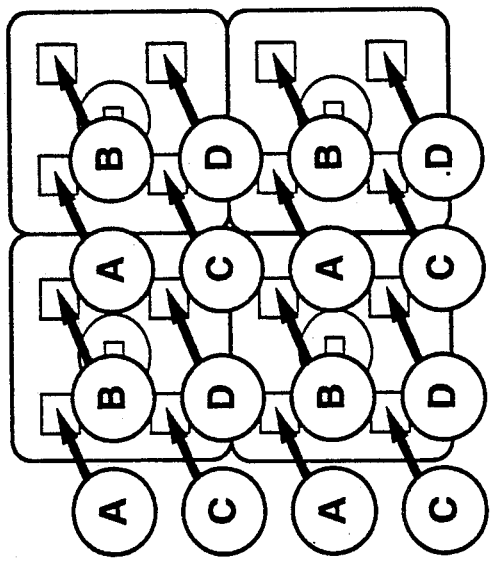
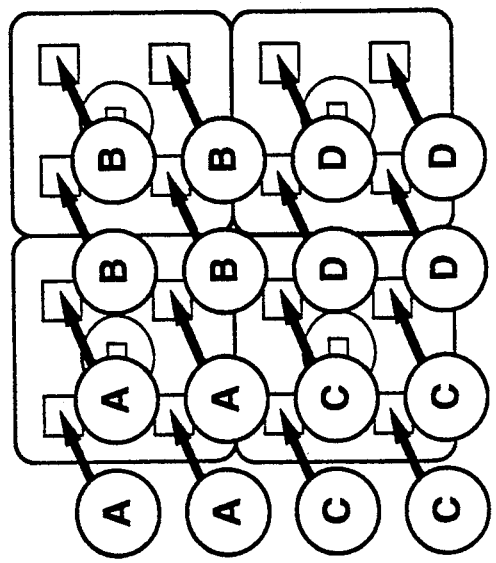
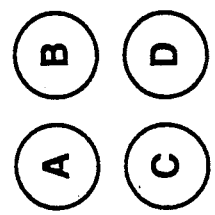
FIG. 10a
FIG. 10b $f_1 = O[N]$   $f_2 = O[\sqrt{N}]$   $f_3 = O[N]$

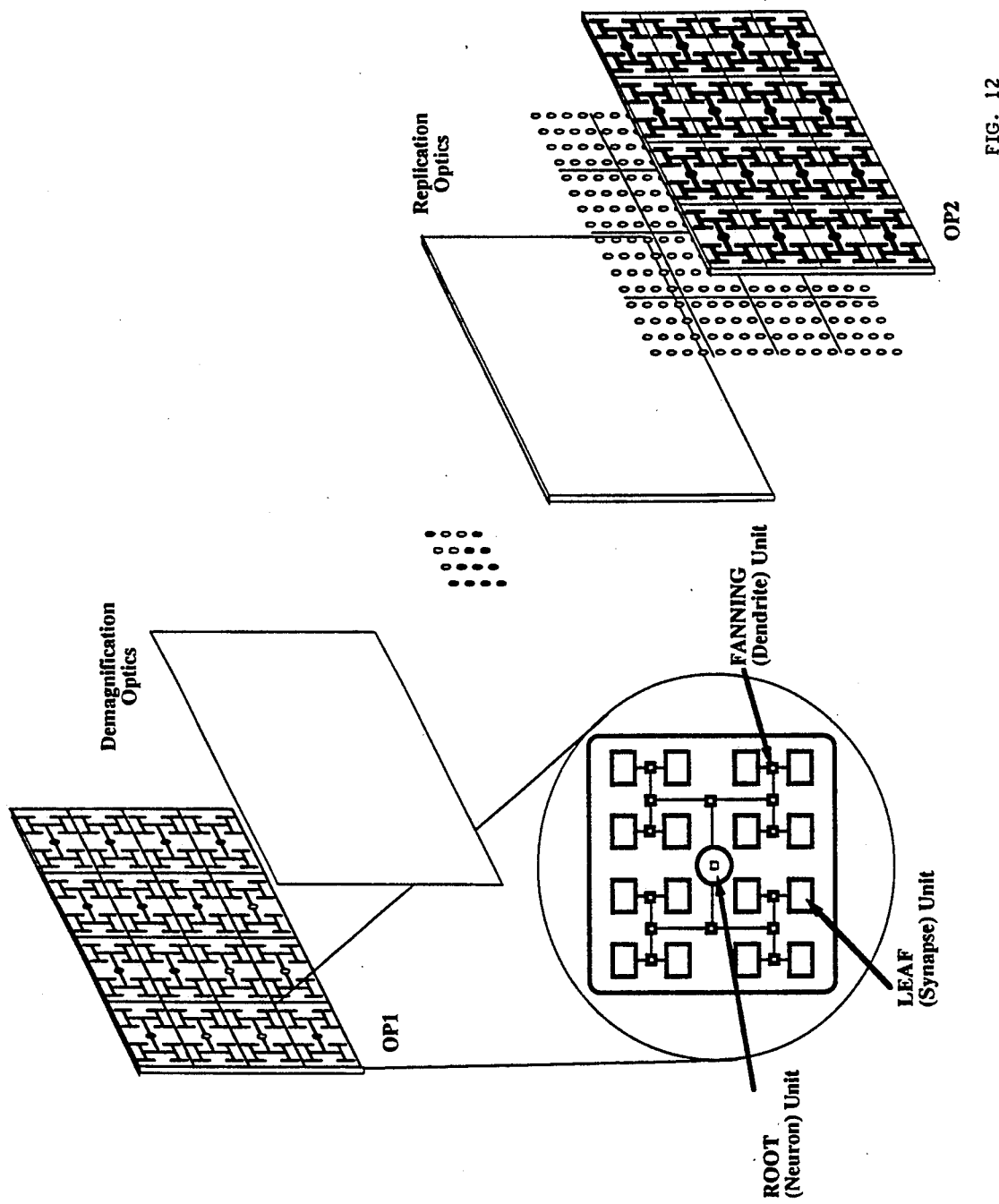

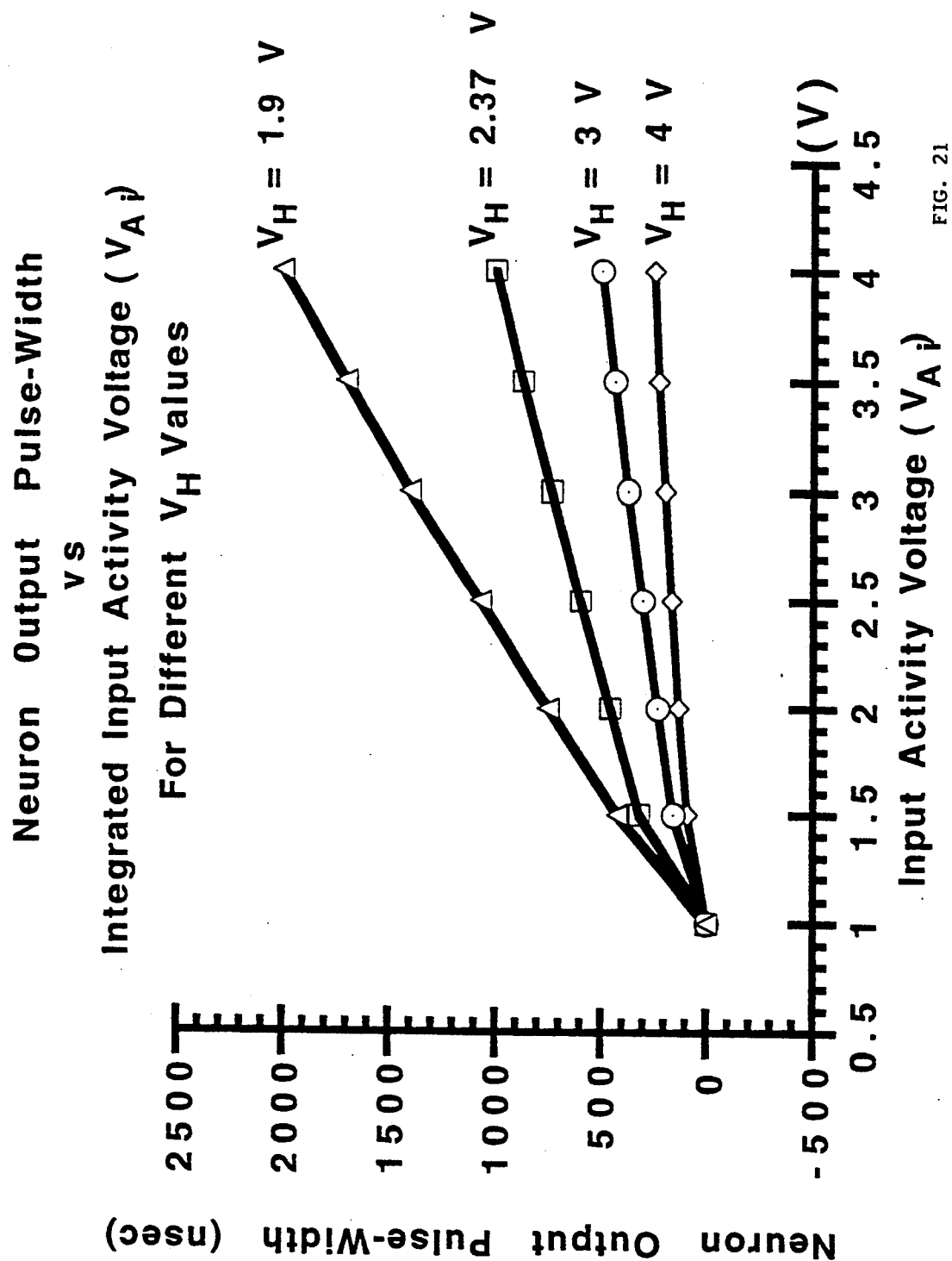

DUAL-SCALE TOPOLOGY OPTOELECTRONIC MATRIX ALGEBRAIC PROCESSING SYSTEM

This invention was made by support of the U.S. Government under Contract No. AFOSR-90-0018 awarded by the United States Air Force. The U.S. Government has certain rights in this invention.

TABLE OF CONTENTS

1. Background of the Invention
   1.1 Field of the Invention
   1.2 Description of the Prior Art
      1.2.1 Previous Electronic Matrix Processors
      1.2.2 Previous Optical Matrix Arithmetic Processors
      1.2.3 Hybrid Electronic and Optical Processors
      1 2.4 The Utility of Foregoing the Speed of Optics In Order to Perform Selective Functions Electrically in a Hybrid Optical and Electronic Matrix Algebraic Processing System
2. Summary of the Invention
   2.1 General Structure, and Components, of a System in Accordance With the D-STOP Architecture
   2.2 Basic Processes of a System in Accordance With the D-STOP Architecture
   2.3 Functional Operations of a System in Accordance With the D-STOP Architecture
   2.4 Advantages of the D-STOP Architecture
3. Brief Description of the Drawings
4. Description of the Preferred Embodiment
   4.1 Introduction to the D-STOP Architecture
   4.2 D-STOP Architecture Description
   4.3 A Dual-Scale Topology Optoelectronic Matrix Algebraic Processing System
   4.4 An Embodiment of the Optoelectronic Matrix Algebraic Processing System Using Optical Distributions Between Several Optoelectronic Processors, Particularly for Performing Vector-Matrix Multiplication or Neural Network Functions
   4.5 An Embodiment of an Optoelectronic Matrix Algebraic Processing System Using Optical Distributions Between (Typically) Two Optoelectronic Processors Operating in Tandem, Particularly for Performing An Intrinsic Vector Outer Product
   4.6 D-STOP Architecture Matrix Algebraic Processing System—Design Considerations
      4.6.1 D-STOP Architecture Optical Systems
      4.6.2 Technology Considerations
      4.6.3 Comparative Analysis
   4.7 Applications of the D-STOP Architecture
      4.7.1 Generalized Matrix Algebra
      4.7.2 Design and Analysis of a D-STOP Architecture Neural System
         4.7.2.1 Optimal Data Encoding Methods
         4.7.2.2 Optical Neuron-to-Synapse Channel
         4.7.2.3 Electronic Synapse-to-Neuron Channel
      4.7.3 Use of a D-STOP Architecture Processing System in Fuzzy Inference—Part 1
      4.7.4 Use of a D-STOP Architecture Processing System in Fuzzy Inference—Part 2
         4.7.5 Use of the D-STOP Architecture in an Optoelectronic Fuzzy Logic System
         4.7.6. Consistent Labeling
   4.8 Integration, and Extension, of the Functionality of the D-STOP Architecture
   4.9 Summary, Conclusions and Future Extensions of the D-STOP Architecture
5. Claims
6. Abstract

BACKGROUND OF THE INVENTION

1.1 Field of the Invention

The present invention generally concerns a hybrid optical and electronic, or optoelectronic, architecture for performing matrix algebraic computations.

The present invention particularly concerns a spatially- and logically-partitioned, expandable, general-purpose, matrix algebraic processing architecture, and certain preferred (i) optoelectronic processor and (ii) optical components for realizing the architecture.

1.2 Description of the Prior Art

Many computational problems can be formalized in terms of matrix algebra. Often these formalisms require the generalization of linear algebraic concepts to include nonlinear or symbolic operations in place of multiplication and summation. Prior architectures for matrix algebraic processing are generally either (i) electronic, or (ii) optical having electronic components only for purposes of delivering data to, and receiving results from, an optically-based computational system.

1.2.1 Previous Electronic Matrix Processors

VLSI electronics can provide the necessary functionality for matrix algebraic processing. However, because of interconnection (wiring) requirements, VLSI suffers from both area inefficiency and high delay for large scale matrix algebraic problems. Matrix algebraic problems are usefully solved by, and in, a hierarchical tree structure of interconnected processing elements (logic circuits). However, an all-electronic matrix algebraic system (a chip) cannot use a particular tree structure called an H-tree for solving an indefinitely large $N \times N$ matrix problem. This is because the external inputs to the beginning, leaf, processing elements are required to be made through the system (chip) perimeter. The length of this perimeter is on the order of the square root of the dimension N of the matrix (i.e., $O(N^{\frac{1}{2}})$), and cannot support N input lines.

Rather, an all-electronic tree-based matrix algebraic processing system with an external input(s) require a one-dimensional layout, with $O(N)$ line length and $O(N^2 \log N)$ area. Area limitations are a major concern for wafer-scale integrated VLSI systems, since the yield of a chip rapidly decreases as $e^{-TA}$ (assuming no defects can be tolerated), where A is the area of the chip and T is a constant). Reference I. Koren (ed.), *Defect and Fault Tolerance in VLSI Systems*, Plenum Press 1989.

Accordingly, the practical limitations on the size of a matrix algebraic processing chip or wafer limit both (i) the number of interconnections that can be made to the chip's periphery, and (ii) the number of separate processing elements that even can be connected—let alone be connected at a reasonable line lengths and at reasonable slews in the propagation delays encountered over different connection paths of differing line lengths.

On the other hand, multi-chip VLSI modules can be built with high reliability and low cost, but at the price of increased power dissipation and time delay in propagating signals off-chip.

A conceptual diagram of a semiconductor integrated circuit implementation of a matrix-vector multiplication is illustrated in FIG. 1. An input vector $I_e$ must be electrically distributed to each of the cells of a matrix $M_o$ where, after processing, the result may be electrically extracted from the same matrix $M_o$ as output, or answer, vector $O_e$. The subscript "e" stands for the electrical nature of the communication, storage, and computational operations.

As stated, the advantages of such a semiconductor-based matrix algebraic processing system include flexible functionality, accurate processing, and a mature, known-cost, technology. The disadvantages include the long propagation delays (i.e., slow computational speed), and the limited input/output bandwidth of the matrix $M_o$.

1.2.2 Previous Optical Matrix Arithmetic Processors

Existing optical matrix processors substantially avoid the area and delay penalties inherent to electronics but suffer from low accuracy and limited generality since they rely on (primarily linear) optical phenomena. Reference W. T. Rhodes, *Optical Matrix-Vector Processors: Basic Concepts,* Proc. SPIE 614, pp 146-152, 1986. In addition, these architectures are often limited in size due to their reliance on a large number of light transmitters (modulators or sources).

A conceptual diagram of an optical implementation of a matrix-vector multiplication is illustrated in FIG. 2. An input vector $I_o$ must be distributed to each of the cells of a matrix $M_o$ where, after processing, the result may be extracted from the same matrix $M_o$ as output, or answer, vector $O_o$. The subscript "o" stands for the optical nature of the communication and computational operations. The storage of matrix data within the matrix $M_o$ may be optical or electrical.

The advantages of such an optically-based matrix algebraic processing system include low propagation delays (i.e., fast computational speed), and a high, parallel, input/output bandwidth of the matrix $M_o$. The disadvantages include limited functionality, limited accuracy, and light transmitters—expensive components that are difficult of fabrication in monolithic integrated circuit technologies, especially silicon—that are of the order of $N_2$ in number ($O[N^2]$) where N is the dimension of the matrix $M_o$.

1.2.3 Hybrid Electronic and Optical Processors

Because data is often delivered to, and extracted from, optical processing systems by electronic means, hybrid processing systems have been suggested. However, such systems commonly start with electro-optic modulators that optically encode data, proceed to accomplish all algebraic processing optically at high speed, and, finally, detect the optically-encoded results with optoelectronic detectors.

However, any more intimate, or more involved, hybridization of (i) electronics and (ii) optics in a single machine (whether for matrix algebraic processing or otherwise) has been stymied by difficulties in economically communicating across the boundary between electronics and optics. In particular, optical detectors may be fabricated of silicon, and are compatibly made on the same silicon substrates otherwise containing digital logic circuitry. Accordingly, the boundary from electronics, and electrically-encoded signals, to optics, and optically-encoded signals, is not troublesome. However, despite intensive and wide-ranging attempts for over a decade, there has been only very limited progress to the present (1991) in making light transmitters compatibly with silicon-based logic circuitry. Accordingly, the boundary from optics, and optically-encoded signals, to electronics, and electrically-encoded signals, is troublesome.

Because of the speed advantages of optics in both (i) signal communication and (ii) signal processing (including operations like summation and multiplication) recited in section 1.2 above, and because of the difficulty and expense of getting from the electrical domain back into the optical domain, there has been little enthusiasm for truly, and deeply, hybrid electro-optic and optoelectronic systems having much cross-connecting and cross-communicating of optical, and electrical, signals.

1.2.4 The Utility of Foregoing the Speed of Optics In Order to Perform Selective Functions Electrically in a Hybrid Optical and Electronic Matrix Algebraic Processing System As mentioned in Section 1.2 above, optics has difficulty in achieving high accuracy, although possible solutions to this problem have been proposed. Reference Rhodes, infra. Meanwhile, VLSI circuit electronics is reliably and economically reproducible, and rock solid in performance. Moreover, it is extremely flexible, and can readily be tailored into processing elements that perform any desired arithmetic or logical (i.e., algebraic) operation. Of course electronic circuitry takes a finite time to perform calculations while optics functions significantly faster at the speed-of-light.

As will be seen, the present invention contemplates using electronics, with all its accuracy and reliability and repeatability and economy, to do what electronics does well (albeit relatively slowly): calculations. Furthermore, the present invention contemplates distributing data to the electronics by optical means, thereby alleviating the communications bottleneck of an all-electronic matrix processing system. However, merely partitioning a matrix algebraic problem between optics and electronics in this manner would not invariably be expected to give good results. Indeed, such a partitioning might well result, if crudely performed, in a somewhat cumbersome, and potentially weird, system architecture. In such an architecture certain tasks such as calculation would seemingly be performed in the wrong domain. Meanwhile, necessary information interchange between optical and electrical domains might causes significant time and/or cost penalties.

Accordingly, it is not simply sufficient to declare, in the manner of the King of Hearts from Lewis Carroll's *Alice in Wonderland,* that certain matrix algebraic processing functions will be performed in a one of the optical or electrical domains, and other functions in the other domain. It would be useful that, if the electronics is to perform certain primitives, such as summation, involved in matrix algebraic calculations, that such electronics should be structured so as to permit, by use of only quite normal semiconductor technology, that line lengths should be exceedingly short and regular, and that clock speeds should accordingly be very fast, producing on the order of one complete calculation per microsecond.

Any small, regular, fast electronic processing elements so functioning would seemingly put a great burden on the optical data distribution. Such an optical data distribution would have to distribute data from and to the electronic processing elements at a breakneck pace. Moreover, when the data is delivered from an electronic processing element in the electrical domain onto an optical data distribution path then a transmitter of light—an object that is difficult of integration and high in cost—is required.

FIGS. 3 and 4 are conceptual representations of alternative, electronic, architectures to the optoelectronic architecture of the present invention whereas FIG. 5 is a conceptual representation of the optoelectronic architecture of the present invention (to be discussed). In the FIG. 3 architecture, a vector is received electrically into each of the cells of an electrical matrix. The cells of the matrix electrically perform a matrix-vector multiplication (or other algebraic operations) on the electrically-received vector, electrically sum the results, and transmit the result vector electrically. The convention of the illustration is thus that the electrical elements are both shown as squares containing a dot, or bullet, or •, and as squares containing a plus sign, or +. The area of the processing system is of the order of $N^2$ ($O[N^2]$) and the delay is of the order of $N$ ($O[N]$). Because the architecture depicted in FIG. 3 is an all-electrical, VLSI circuit, embodiment of an matrix algebraic processor, this architecture is prior art.

Although, to the best knowledge of the inventors, it has not been so envisioned, it might be contemplated that one or more optical data distributions should respectively replace the (i) input, and/or (ii) output, electronic data distributions of the electronic, VLSI, matrix algebraic processor architecture shown in FIG. 3. (Such a hybrid architecture would not be prior art.) This would, however, be quite cumbersome. In particular, the number of output light transmitters is of the order of $N^2$ ($O[N_2]$). In particular, the optical paths would have to be worked out so that certain light-receiving and light-transmitting elements are not in each others shadow(s).

FIG. 4 shows a similar representation to FIG. 3. An input vector is electrically received into a VLSI circuit matrix, summed electrically in a tree structure of summing nodes, and transmitted electrically. An advantage of the architecture of FIG. 4 over the architecture of FIG. 3 is a reduction in the number of required output signal lines. The area of the processing system is of the order of $N^2 LogN$ ($O[N^2 Log_2N]$) and the delay is again of the order of $N$ ($O[N]$). Because the architecture depicted in FIG. 4 is an all-electrical, VLSI circuit, embodiment of an matrix algebraic processor, this architecture is prior art.

Again, and although to the best knowledge of the inventors it has not been so envisioned it might be envisioned that one or more optical data distributions should respectively replace the (i) input, and/or (ii) output, electronic data distributions of the electronic, VLSI, matrix algebraic processor architecture shown in FIG. 4. (Such a hybrid architecture would not be prior art.) The number of output light transmitters is beneficially reduced to be of the order of $N$ ($O[N]$). Again, however, the light paths are uncertain, and the use of electrical distributions in lieu of optical distributions engenders congestion, and inefficient use of area.

In a preview of the architecture of the present invention shown in FIG. 5 the input vector is received optically, algebraically processed electrically including by summation in electrical summing nodes, and then transmitted optically. (According to the fact that FIG. 5 shows a preview of the architecture of the present invention, it does not show prior art.) The area of the processing system is of the order of $N^2$ ($O[N^2]$), or roughly the same as the all-electrical architecture of FIG. 3, but the delay is reduced to be of the order of $\sqrt{N}$ ($O[\sqrt{N}]$). Notably, and as will be explained, both (some) input and (most) output data distributions are optical, and via light. Meanwhile, electrical processing within an tree structure of electrical elements beneficially reduces the number of required output light transmitters to be of the order of $N$ ($O[N]$).

Accordingly, there exist many different possibilities for all-electrical, and for hybrid electrical and optical (optoelectronic), matrix algebraic processors/processing systems. If an intimately, and closely, hybridized optical and electronic matrix algebraic processing system is—nonetheless to (i) performing some functions (e.g., calculation) in poor places (e.g., in electronics) and (ii) making large demands upon other certain other functions (e.g , optical data distribution)—to exhibit high performance then careful thought, and careful system architectural organization, is clearly required. It is the forte of the present invention that, a functional partition between electronics and optics having been made somewhat arbitrarily in accordance with the conventional wisdom, a matrix algebraic processing system is nonetheless realized that is both (i) readily presently practically implementatable with existing technology, and (ii) comparable in performance with purely theoretical systems within the literature. This system is next discussed.

SUMMARY OF THE INVENTION

The present invention contemplates a Dual-Scale Topology Optoelectronic Processor (D-STOP) parallel architecture for matrix algebraic processing. The phrase "Dual-Scale Topology" within the "D-STOP" acronym refers to the architecture's replication of two-dimensional array pattern(s) of (i) light transmitters and (ii) light receivers at two differing scales, an important feature of the invention hereinafter explained.

2.1 General Structure, and Components, of a System in Accordance With the D-STOP Architecture At its most rudimentary level, a matrix algebraic processing system in accordance with the D-STOP architecture includes, as its principal components, (i) planar optoelectronic processors—principally semiconductor chips or chip arrays—having both computational and light input/output capabilities, optically communicating from one to the next through (ii) free-space space-invariant optical data distributions—principally lenses and computer-generated holograms—having both replication and distribution capabilities.

Typically one to several optoelectronic processors, or OPs, are two-dimensionally arrayed in each of a number of functional planes, or layers. An OP has—organized in a particular structure to be discussed—each of (i) multiple arrays of light detectors each which array may receive an optically-encoded input data vector, (ii) local memories for storing a data matrix, (iii) electronic circuitry for electronically algebraically manipulating the received input data vector in consideration of the stored data matrix to produce a result vector, and (iv) light transmitters in the form of either light emitters or light modulators for transmitting the result vector as optically-encoded light. Because an OP commonly stores a complete data matrix it may be regarded as a portion of the matrix algebraic processing system that deals with matrix algebraic processing, that is, processing in consideration of a data matrix. An OP may be implemented upon a single optoelectronic chip or, typically, several such chips.

The arrayed OPs within one functional layer optically communicate with a number—one to several—of OPs in a next successive functional layer. There are typically at least two functional layers, and there may be a great number of functional layers in the manner of a daisy chain. The number of arrayed OPs within each functional layer need not be the same, and typically is not the same. According to the typically differing number of OPs in each functional layer, the physical area subtended by each functional layer typically also differs. For example, in one embodiment of a matrix algebraic processing system in accordance with the present invention particularly for performing neural network functions, some 1, 2, 4, 16, 4, 2, and 1 OPs are respectively located in each of 7 successive functional layers.

The optical communications between the successive OPs within the successive layers are via one or more free-space space-invariant optical data distributions between each layer. Each optical data distribution, functionally interleaved between functional layers of one or more optoelectronic processors, is normally functionally unidirectional, and operates to communicate optically-encoded data from the light transmitters in the OP(s) of one functional plane to the light receivers in the OP(s) of a next functional plane.

Specifically, each optical data distribution serves to optically distribute a result data vector from the light transmitters of one or more OPs in a one functional plane, or layer, to each of the multiple arrays of light detectors of one or more OPs in a next successive functional plane, or layer. The optical data distributions need not be, and typically are not, identical in either their optical characteristics, or in the optical transfers that each performs, between different functional planes, or layers, of OPs.

The optical data distributions are typically physically implemented by (i) replicating optics, normally lenslet fanouts, or by (ii) demagnifying/replicating optics, normally lenses in combination with computer generated holograms (CGH), dependent upon the optical transfer function performed.

A functional plane of one or more OPs may, or may not, constitute a separate physical plane from a next functional plane of one or more OPs. It is indeed possible for arrayed OPs of a one functional plane to lie in a physical plane that is spaced apart from, and which is typically spaced parallel to, the arrayed OPs of a next functional plane—in the manner of a layered sandwich. Commonly, however, the functional planes of arrayed OPs actually lie in one physical plane, and upon a common substrate, sharing power. The optical data communication between such functional planes is thus along a curved, or bent, path—such as is realized by the use of mirrors.

Just one single OP (i) located in a single functional (and physical) plane, and (ii) optically communicating with itself, may perform useful work. In this rudimentary configuration the optical communication of the single OP upon a single functional plane is bidirectional, and with itself. Typically, however, many functional planes, each with one or more OPs, are optically connected in series.

Each optoelectronic processor, or OP, consists of a number of two-dimensionally arrayed optoelectronic processing elements, or OPEs. An OPE is, and denotes, both functional and physical characteristics. Functionally, an OPE typically holds and manipulates, in a manner to be explained, all the data that is associated with a single row of a matrix. Physically, each OPE exhibits, in its contained units next to be explained, an associated pattern—a base-level, small-scale pattern of the D-STOP architecture within which architecture patterns, and pattern similarities, are very important. Accordingly, an OPE can be manually visually identified (typically under magnification) in an optoelectronic processor in much the same way that, for example, a repeating memory, or register, store might be visually identifiable within a VLSI circuit. An OPE should not, however, be associated with any necessarily detached, or distinct, physical entity. Just as was the case with an OP, and OPE may be implemented on many optoelectronic chips, one chip, or a portion of a chip.

The OPEs, in turn, typically consist of a number of optoelectronic sub-processing units electrically interconnected in a tree structure. From the most to the least numerous, these optoelectronic sub-processing units electrically connected in a tree are variously called leaf, fanning, and root units.

Each leaf unit typically includes, as electrically-interconnected circuit structures, (i) one or more light detectors, (ii) a local memory, (iii) logic circuitry, and (iv) electronic input/output. Each fanning unit typically includes electrically-interconnected (i) local memory, (ii) logic circuitry, and (iii) electronic input/output. The root unit typically includes electrically-interconnected (i) logic circuitry, (ii) a local memory), (iii) electronic input/output, and (iv) a light transmitter.

Any of the leaf, fanning and root units may include one or more light receivers for the receipt of data and/or optional instructions. To the extent that each unit so includes a light receiver than this light receiver, and the unit of which it is a part, are positionally equivalently located in each OPE, forming thereby a pattern. Typically only the leaf units contain light receivers, and typically only one such each leaf unit. Meanwhile, normally the root unit (only) contains the light transmitter. According to the larger number of leaf than root units, the light receivers, typically one per leaf unit and many per OPE, are more numerous than the light transmitters, typically one per root unit and thus one per OPE. The preferred H-tree structure is not only optimal for electrical interconnection of the leaf, fanning, and root units, it permits the leaf units to be laid out in a geometrically even and regular grid array pattern, with the root unit located at the center.

According to the fact that the OPEs are two-dimensionally spatially arrayed, and the fact that the light receivers within the numerous leaf units of each OPE are located at identical, set, positions within each OPE, (i) all the leaf unit light receivers within an entire OP are arrayed in a first pattern, and (ii) all the leaf unit light receivers within all the OPs which are two-dimensionally arrayed on a single functional layer are accordingly physically arrayed in repetitions of this first pattern. Likewise, and for the same reasons, (i) all the root unit light transmitters within an entire OP are arrayed in a second pattern, and (ii) all the root unit light transmitters within all the OPs which are two-dimensionally arrayed on a single functional (and physical) plane are physically arrayed in repetitions of this second pattern.

In accordance with the present invention, the second pattern of the arrayed root unit light transmitters of at least one OP of a first functional layer is the same, although at a different scale, as the first pattern of the arrayed leaf unit light receivers of each of typically many OPEs that are within at least one of the OPs of a next successive functional layer. Typically the second pattern of all the collective light transmitters arrayed within all the collective OPEs arrayed within all the collective OPs that are upon a first functional layer is symmetric with, but at a differing scale and at differing numbers, to a repeated first pattern of the light detectors that are within each of the OPEs arrayed within each of the OPs upon a next successive functional layer.

This symmetry between the pattern of light transmission, or output, from a one OP (and typically all OPs) upon a one layer with, and to, each of the typically several patterns of light reception, or input, of at least one OP (and typically all OPs) of a next functional layer serves to make optical data distributions (optical communication) in accordance with the present invention from one OP, and from one layer of OPs, to the next to be a straightforward matter. Namely, an optical data distribution is merely a matter of (1)(i) scaling (typically by reduction in size), and (ii) replication, or, simply, (2) replication. This (1) (i) scaling and (ii) replication is performed by free-space space-invariant optics, typically by lenses and holograms. This (2) replication is also performed by free-space space-invariant optics, typically by fanout lenslets. Accordingly, the optical data distribution is very efficient, very fast (at the speed of light), and economical.

The efficiency of the optical components arises from their property of space invariance. That is, once the required optical connections from one light transmitter to the respective detectors has been established all other light transmitters use the same optical system only with a relative shift in the input, and in the output, planes respectively. This space invariance greatly reduces the required space-bandwidth product, and hence the area, of the optical system to the order of $N^2$ ($O[N^2]$) where N is the number of detectors in the receiving optoelectronic processor. Hence the area of an optical system within a matrix algebraic processing system in accordance with the D-STOP architecture grows at the same rate as the area of an optoelectronic processor—thus maintaining a system that may readily be scaled in size.

It should be recognized that the (i) numbers of OPs per layer, one layer to the next, need not be, and often is not, the same. Neither are the (ii) numbers and/or types of OPEs comprising each OP within different functional layers (or even, rarely, the same layer) invariably the same. Even the (iii) arrayed patterns of the OPEs and/or OPs from may vary from one layer to the next. To the extent that the patterns, or scales, do so vary then (iv) the optical data distribution systems from one layer to the next will also be different. According to such possible variations in the particular optical data distributions transpiring from one functional layer to the next, the present invention does not contemplate a particular optical distribution, but broadly contemplates that optical communication from one functional layer of OP(s) to the next may be realized with simple, inexpensive, and fast optics that are both free-space and space-invariant. "Free-space" means that the optics are outside the functional (and physical) planes of the OPs. "Space-invariant" was explained above.

2.2 Basic Processes of a System in Accordance With the D-STOP Architecture

A rudimentary embodiment of a matrix algebraic processing system in accordance with the D-STOP architecture preferably supports six basic processes. These processes, when appropriately combined, permit various matrix algebraic operations.

As a preliminary, zero, process, one or more data vectors originating outside the optoelectronic matrix algebraic processing system, and outside any optoelectronic processor (OP) which is a part of the system, can be introduced into an OP, preferably via either of preferably two optical data distributions. (An external data vector can be introduced by an electrical distribution, or by an optical distribution and an electrical distribution jointly.) This introduction of a source vector or vectors (even so many times, and so far, so as to constitute the introduction of a complete source matrix into the system) is not identified as a separate process because identical, or similar, (optical, and electrical) data distributions also exist. Optical distributions from each OP upon a one functional plane to one or more OPs upon a next functional plane are discussed as first and second processes in the immediately following paragraph. An electrical distribution transpiring within an OP is discussed as a third process in the second following paragraph.

As a first process, one or more optical vertical distributions each communicates an external vector element $x_j$ to the jth leaf unit of each optoelectronic processing element (OPE). As a second process, one or more optical horizontal distributions each communicates an external vector element $y_i$ to each leaf unit of the ith OPE. Each of the two, vertical and horizontal, optical distributions is preferably received at an associated one of a preferable two light detectors at each leaf unit of each OPE of the OP, but may alternatively be received at different times into a single light detector at each OPE.

As a third process, an electrical communication, or data distribution, path exists between the units within each OPE. This electrical communication path is preferably bidirectional between OPE units. A leaf unit may electronically communicate data via this electrical path down and up the OPE tree structure to and from the other leaf units that are within the OPE, as well as to the OPE's fanning units and root unit. Notably, this electrical communication is not between different OPE's, nor between units that are within different OPEs—even if part of the same OP. When, as will be discussed in the following section 2.3, a D-STOP architecture system is used for matrix algebraic processing, the electrically-communicating leaf units of a single OPE typically hold a single row of a data matrix. Accordingly, the third process electrical communication permits data interchange between matrix columns within a row, but does not support the transfer of data between rows.

As a fourth process, local computation can be performed at the leaf units on (i) data received through any of the various optical (2) or electrical (1) distributions and/or (ii) data stored in local memory. Local computation can also be performed at any of the fanning or root units on (i) data received through any of the electrical distribution and/or (ii) data stored in local memory.

During a fifth, fan-in, process, a computation is performed within each OPE on (i) vector data received—normally optically—at the leaf units, and (ii) vector or matrix data stored within the OPE. The computation is normally distributed at the leaf units themselves. The results of the computations transpiring in the several units of each OPE are ultimately combined at the root unit. Notably, the computation may be variously distributed among any or all of the leaf, fanning and/or root units.

Finally, as a sixth process, the transmitter at the root node of each OPE produces an optically-encoded light output signal:

2.3 Functional Operations of a System in Accordance With the D-STOP Architecture The basic processes of the OPEs, and the OP that is made from OPEs, can be combined to perform generalized matrix algebraic and symbolic operations.

One of the most important of these operations is matrix vector multiplication, which is achieved using three basic processes performed stepwise. First, an input vector X is distributed by the optical vertical distribution. Second, each OPE leaf unit performs a local multiplication with a locally-stored matrix element, $M_{ij}$. Third, the products $M_{ij}*X_j$ are then summed on the OPE tree as a fan-in process. Fourth, the root unit may optionally perform further processing—such as, for example, thresholding in non-linear processes such as neural networks—on the summed data to obtain an element of an output vector $Z_1$. The resulting output vector elements $Z_i$ are optically transmitted from the root units.

Because the multiplications and summations are performed electronically, they may be generalized to non-linear or symbolic operations by substitution of the appropriate circuitry. Many problems can be formalized as matrix-vector multiplications if such generalizations are allowed. For example, a parallel formalization of modus ponens inference in fuzzy logic can be achieved by substituting a minimum operator for multiplication and a maximum operator for summation.

The D-STOP architecture can also be used to perform vector outer products of two different types: an extrinsic vector outer product as that performed on two vectors which originate outside of the D-STOP system or an intrinsic vector outer product on vectors stored within the local memories of the units of the OPEs of an OP.

In performance of the vector outer product operation, an external row vector X is introduced to an OP via the optical vertical distribution. The external column vector Y is introduced to the same OP by the optical horizontal distribution. The products can be performed with local computations at the leaf units of each OPE within the OP. Again, these products can be generalized to include nonlinear or symbolic functions.

In performance of the intrinsic vector outer product operation an outer product is computed between a selected row and selected column of a matrix, with the result returned to the matrix for further processing. In the intrinsic vector outer product operation two encodings of the matrix data are used. In the leaf unit local memories of the OPEs a first optical processor, OP 1, matrix data is encoded normally in row and columns. Meanwhile, another optical processor, OP 2, encodes the transpose of the matrix. That is, each OPE in OP 1 represents one row vector of the matrix while each OPE of OP 2 represents a column vector of the same matrix. In OP 1, the selected column vector is distributed via the intrinsic electronic distribution, while OP 2 uses this mechanism to distribute the selected row vector. Each OPE has one matrix vector to be distributed in this manner. In addition, these vectors are transmitted via the light transmitters of each OPE of each OP (OP1 and OP2) to the selected leaf unit optical receivers of all OPE's of the other OP (i.e., OP2 and OP1). The extrinsic vertical optical distributions deliver the appropriate row vector to OP 1 and the appropriate column vector to OP 2.

Accordingly, in performance of the intrinsic vector outer product operation each leaf unit (of any OPE of either OP) receives one of the necessary two vectors for calculating the outer product optically. The other, complimentary, vector resides within the OP— but only at one leaf unit of each OPE. It is distributed from this leaf unit to all other leaf units electrically. This use of the electrical distribution in performance of the intrinsic vector outer product operation is why the electrical distribution between the units of each OPE is bi-directional, and why the intermediate units are called "fanning" units.

Finally in performance of the intrinsic vector outer product operation, a local computation at the leaf units is performed. The matrix calculated as the vector product preferably ultimately ends up in both OP1 and OP2. The use D-STOP tandem architecture in performance of the intrinsic vector outer product operation is, again, readily generalizable to various arithmetic and logical operations other than simply multiplication.

These few basic processes, and their combination, in the performance of (i) matrix vector multiplication or (ii) intrinsic and extrinsic outer products, only "scratches the surface" of the capacity of systems in accordance with the D-STOP architecture to perform generalized matrix algebraic and symbolic operations. A general system in accordance with the architecture includes L optoelectronic processors. Each optoelectronic processor $OP_k$, where k equals 1 though L, includes $M_k$ optoelectronic processing elements, each of which in turn includes $N_k$ leaf units. The system further includes an arbitrary number V of vertical optical distributions and H of horizontal optical distributions. Any number of these optical distributions can be between any pair of processors, including the possibility that a processor may transmit a vector to itself. Each processor may act as a transmitting processor to an arbitrary number of optical distributions, and through these optical distributions to an arbitrary number of destination processors (which need not be, and often are not, in one-to-one correspondence with the optical distributions). Each processor receive an arbitrary number of data vectors through an arbitrary number of vertical and (two types of) horizontal distributions (wherein, due to the possibility of time multiplexing, the number of input vectors received may be greater than the number of distributions).

Despite its generality, a system in accordance with the D-STOP architecture obeys strict rules, or restrictions. These are as follows. First, given a transmitting/receiving pair of processors in a vertical optical distribution then the number, and pattern, of the arrayed optoelectronic processing elements (and the light transmitters within these optoelectronic processing elements) within the transmitting processor must equal the number, and the pattern, of leaf units in each optoelectronic processing element of the receiving processor. Second, given a transmitting/receiving pair of processors in a horizontal optical distribution then the number, and pattern, of the arrayed optoelectronic processing elements (and the light transmitters within these optoelectronic processing elements) within the transmitting processor must equal the number, and the pattern, of optoelectronic processing elements within the receiving processor.

2.4 Advantages of the D-STOP Architecture

The D-STOP architecture confers several advantages. It uses only a small number of light transmitters, thereby reducing the cost and difficulty of fabrication. The electronic circuitry is readily and inexpensively implementatable, and reliable in operation without incurring such noise or attenuation in the output signal as is typical of optics-based processing. There is negligible timing skew between signals, which facilitates pipelined operations.

The optical system of the D-STOP architecture is simple, compact and relatively inexpensive since the required optical interconnections are space-invariant. Quite general matrix algebraic processing systems in accordance with the D-STOP architecture outperform fully electronic chips and computers performing the same or more limited functions in terms of delay, area, and power dissipation. For neural system implementations, low area, high linear dynamic range analog synapse and neuron circuits compatible with on-chip learning are fully compatible for use with the D-STOP architecture. For parties whose concerns are more mundane than neural systems, it will be understood that matrix algebraic multiplication can be quite simply used, almost as a trivial case, to implement a crossbar switch.

The present specification disclosure discusses, as a rudimentary but exemplary embodiment of the invention, a 16×16 processing element array which, when operated at a modest 1 Mhz clock speed, has already obtained performance of roughly 256M bit operations per second. Using proven, presently available (circa 1992) state-of-the-art VLSI and optoelectronic technologies, a system with greater than 1,000 fully connected processing elements can be achieved. For neural network systems, this corresponds to capacities of $10^6$–$10^8$ interconnects, and processing speeds of $10^{12}$ interconnects/second.

These and other aspects and attributes of the present invention will become increasingly clear upon reference to the following drawings and accompanying specification.

BRIEF DESCRIPTION OF THE DRAWINGS

FIG. 7b is a conceptual representation of the row distribution within the architecture of the first embodiment of the D-STOP architecture optoelectronic matrix algebraic processing system in accordance with the present invention previously shown in FIG. 7a.

FIG. 10, consisting of FIGS. 10a and 10b, is a diagrammatic representation of first, vertical, and second, horizontal, optical data distributions to the first embodiment of the optoelectronic processor (OP) in accordance with the present invention previously seen in FIGS. 6–8.

FIG. 12 is a schematic of a complete D-STOP architecture optoelectronic matrix algebraic processing system in accordance with the present invention, the system particularly using the second embodiment of an optoelectronic processing element (OPE) previously shown in FIG. 9, the FIG. 12 showing in exploded view the OPE layout including detectors (synapse) units, modulator (neuron) units, and fan-in (dendrite) units.

FIG. 18b is a schematic diagram of the leaf-node SYNAPSE UNIT previously shown in FIG. 18a.

FIG. 19b is a schematic diagram of the FANIN UNIT previously shown in FIG. 19a.

FIG. 20b is a schematic diagram of the SOMA UNIT previously shown in FIG. 20a.

FIG. 21 is a graph of the Neuron Output Pulse-Width versus the Integrated Input Activity Voltage ($V_{Ai}$) for Different $V_H$ Values realizable with the second embodiment of the optoelectronic processor (OP) previously diagrammatically represented in FIGS. 9, 17a, 19a and 20a, and previously shown in schematic diagram in FIGS. 18b, 19b and 20b.

DESCRIPTION OF THE PREFERRED EMBODIMENT

4.1 Introduction to the D-STOP Architecture

Figure 1:
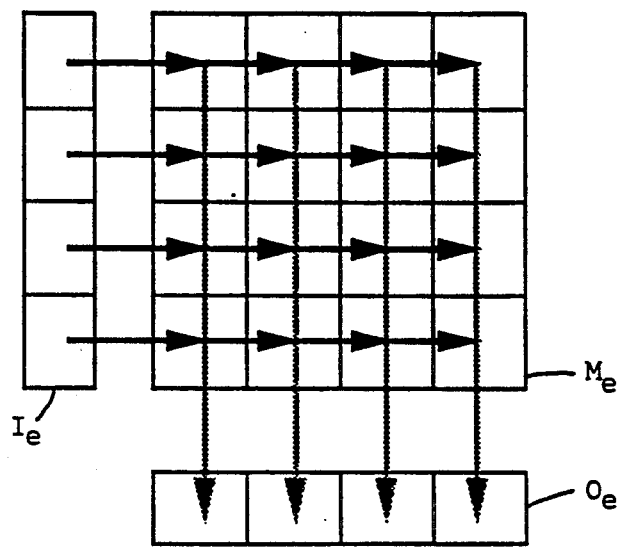
FIG. 1 is a conceptual representation of a prior art electronic matrix algebraic processor/matrix algebraic processing system.
Figure 2:
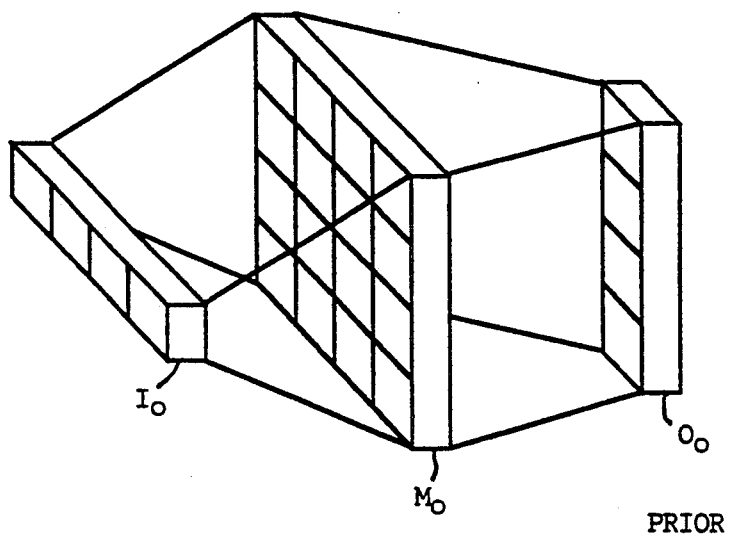
FIG. 2 is a conceptual representation of a prior art optical matrix algebraic processor/matrix algebraic processing system, particularly a fixed-mask optical matrix-vector multiplier.

The present invention is embodied in the architecture of a generalized optoelectronic matrix algebraic processing system. This architecture is called "Dual-Scale Topology Optoelectronic Processor(s)/Processing System", or "D-STOP". Note that, despite the nouns going to make up the D-STOP acronym, it is the architecture of the system, and not the system itself, which is properly called "D-STOP". Accordingly, "D-STOP" is an adjective, and is used in the manner of a trademark. The "D-STOP" adjective may properly be applied to the system itself, e.g., D-STOP system, and also to parts of the system—of which there are many at many different scales and numbers. However, it is not so applied within this specification because it desired to accentuate that, in its major aspect, the present invention is an architecture that is susceptible of being expressed in many different systems, and is not, in its broader aspects, merely a system or systems, nor a component of one system or several systems.

The words "dual-scale topology" within the "D-STOP" acronym is an adjective phrase referring to the fact that a two-dimensional array pattern is replicated at two differing scales in implementation of the D-STOP architecture. At the smaller scale, a relatively smaller array pattern is formed by the (arrayed) locations of light detectors within each of a large number of optoelectronic processing elements (OPEs). The OPEs are themselves two-dimensionally spatially arrayed, and a number of OPEs collectively constitute a optoelectronic processor (OP). At the larger scale, a relatively larger array pattern is formed by the single light transmitters associated with, and located at, each of one of the arrayed OPEs.

The D-STOP architecture is typically implemented in and by two or more optoelectronic processors (OPs) that are functionally separate, and which are normally spaced physically apart from one another, and are most commonly spaced-parallel. Although both OPs are typically substantially planar, and thus have the same type of topology, when they are physically spaced-parallel they obviously do not share the same topological surface (a geometric locus of points unaltered by elastic deformation). Accordingly, although the adjective "dual" in the phase "dual-scale topology" modifies the noun "scale", it is not adverse to the sense of the D-STOP acronym if the duality is also attributed to the noun "topology".

An optoelectronic matrix algebraic processing system in accordance with the D-STOP architecture typically includes (i) two or more spatially separate optoelectronic processors (OPs), each such having (ii) a dual scale of (arrayed) optical reception and transmission features, each of the processors being communicatively connected to the next by (iii) a free-space optical system. These concepts will become increasingly clear upon reference to the following drawings and accompanying specification.

The present invention is also embodied (i) in optoelectronic processors (OPs), of which typically two or more are used within a single matrix algebraic processing system, (ii) in optoelectronic processing elements (OPEs), of which typically N such are arrayed in rows to construct each OP, (iii) in optical systems used to distribute and replicate data from one OP to the next in a matrix algebraic processing system, (iv) in optoelectronic, optical, and electrical circuits for use in constructing OPEs and OPs, (iv) in preferred physical constructions for OPEs and OPs, and for optoelectronic matrix algebraic processing systems constructed of such OPEs and OPs, and (v) in methods of optically and electrically communicating and processing data to perform matrix algebraic, neural network fuzzy logic, and other sophisticated functions.

All these embodiments fit under the Dual-Scale Topology Optoelectronic Processor, D-STOP, architecture: a parallel architecture that combines electronics and optics in an optimal manner. In all forms but the most rudimentary, systems in accordance with the architecture can implement generalized matrix-vector multiplication and two types of generalized vector outer products.

4.2 An Embodiment of an Optoelectronic Vector-Matrix Algebraic Processing System Using Optical Distributions Between Several Optoelectronic Processors, Particularly for Performing Vector-Matrix Multiplication of Neural Network Functions In one of its many embodiments, the present invention functions to iteratively algebraically manipulate a source vector in accordance with one or more stored matrices to produce, after successive iterations, a final result vector. Such an embodiment to operate on a vector with a matrix, such as, for example, for purposes of matrix multiplication, uses a number of optoelectronic processors (OPs), each of which OPs has a number of optoelectronic processing elements (OPEs). The OPs, and the OPEs of which they are comprised, each may be, and typically are, physically located on one of more chips, or flip-chip pairs, combining both (i) electronics and (ii) optical input/output.

Each OPE includes typically three types of electrically-interconnected sub-processing units, namely (i) leaf units, (ii) fanning units and (iii) a root unit. The units are typically electrically-interconnected as a tree, preferably an H-tree, proceeding from the leaf units through the fanning units to a root unit. The tree is more particularly an H-tree.

At least the leaf unit includes (i) one or more light detectors for receiving portions of one or more input data vectors. The leaf unit normally also includes (ii) a local memory for a storing a (row or column) portion of a data matrix, (iii) electronic circuitry for electronically performing an algebraic operation on a received portion of the input data vector(s) and the stored data matrix portion so as to produce a part of a vector, and (iii) an electrical input/output receiver/driver.

The fanning units typically receive different processed parts of the same vector from two leaf units (in a binary tree; ternary and quaternary trees are also possible). The fanning units typically include (i) a local memory, again typically used for a storing a (row or column) portion of a data matrix, (ii) electronic circuitry for electronically performing an algebraic operation, normally summation, on that part of a data vector received from two (in a binary tree) leaf nodes, and (iii) an electrical input/output receiver/driver to forward the processed (summed) part of the vector.

The root unit typically receives two processed (summed) parts of the same vector from two (in a binary tree) fanning nodes to which it is connected, and operates to (i) sum and, optionally (ii) further algebraically process, these parts. The root unit again typically includes (i) a local memory, (ii) electronic circuitry for electronically performing an algebraic operation, normally summation, on that part of a data vector received from two (in a binary tree) fanning nodes, and (iii) a light transmitter for transmitting the result vector part as an optically-encoded light output signal. The root unit also typically includes (iv) an electrical input/output receiver/driver for communicating parts of vectors back up the tree to the fanning nodes, and then to the leaf notes.

A number of processor-to-processor distribution-and-replication optical stages (i) replicate and (ii) distribute the optically-encoded output signals collectively arising from the collective light transmitters that are within the collective OPEs of each OP. This distribution is such that a result vector of one OP is received as an input vector by the plurality of light detectors that are within the plurality of OPEs that are within a next successive OP.

Each OP iteratively in turn performs an algebraic operation on its received vector in accordance with its stored matrix so that, finally, an optically-encoded result vector is produced. This final result vector represents an algebraic manipulation of an original, source, data vector by those matrices that are held within the local memories of the OPEs of each of the OPs.

Importantly to the present invention, and to the optical data distribution occurring within an optoelectronic vector-matrix algebraic processing system in accordance with the present invention, the light transmitters that are within the root unit of each OPE of each OP are two-dimensionally arrayed in a pattern. Moreover, the light detectors that are contained within a next successive OP are physically arrayed in the same pattern, but a smaller scale. This is the meaning of "Dual-Scale Topology" within the "D-STOP" acronym.

The equivalence of the array pattern of (i) the light transmitters of the collective OPEs of one OP with (ii) the light detectors of each OPE of the next successive OP permit OP-to-OP optical distribution(s) and replication(s) to be (i) free space and (ii) time-invariant. These distribution(s)/replication(s) is (are) accomplishable (i) by lenses including a microlens array of lenslets, and/or (ii) by lenses in combination with holograms, and particularly Computer-Generated Holograms (CGH).

In one distribution/replication mode and optical path, called a "vertical optical distribution" in consideration of the matrix that is stored within the local memories of the optoelectronic processing elements, the time-invariant free-space OP-to-OP optical distribution and replication distributes each bit of each result vector so that it is received by a corresponding one of the optical detectors within each of the OPEs of the next OP. In another distribution/replication mode, called a "horizontal optical distribution", the time-invariant free-space OP-to-OP optical distribution and replication distributes each bit of each result vector so that it is received by all the optical detectors that are within each corresponding OPE of the next successive OP.

These optical distributions are very powerful. They permit an optically-mapping optoelectronic vector-matrix algebraic processing system in accordance with the D-STOP-architecture to usefully solve many problems of practical interest.

In greater detail, this first embodiment of the invention employs the vertical optical distribution to serve as an optically-mapping optoelectronic vector-matrix algebraic processing system for algebraically manipulating an N-bit input vector X in accordance with one or more M×N-bit stored matrices Y to produce a M-bit output vector. Such a vector-matrix algebraic processing system includes a number L of optoelectronic processors 1, 2, ... L. Each processor k, k equals 1 through L, has a number $M_k$ of arrayed optoelectronic processing elements 1, 2, ... $M_k$.

Each optoelectronic processing element has $N_k$ detector sub-processing elements, or leaf units. Each optoelectronic processing element thus represents an $M_k \times N_k$ matrix with the additional restriction that $N_k = M_{k-1}$ to maintain proper consistency during vector-matrix processing (particularly including multiplication).

Each processing element i, i equals 1 through N, includes (i) a number M of light detectors, each for detecting a data bit $X_j$ of an optically-encoded input vector X, j equals 1 through M, (ii) a at least M local memories each for storing a data bit $Y_{ij}$ of a stored vector Y, j equals 1 through M, (iii) electronic circuitry for electronically performing an algebraic operation on the input vector X detected by the M light detectors in consideration of the stored data vector Y held within the M local memories to produce a result bit $Z_i$ of a result vector Z, and (iv) a light transmitter for transmitting the result bit $Z_i$ of the result vector Z as an optically-encoded output signal.

The collective local memories of each of the N optoelectronic processors thus hold a matrix $Y_k$ of size $N_k \times M_k$ data bits. The stored matrix $Y_k$ may be the same, or different, between successive processors. The collective light transmitters of each optoelectronic processor thus transmit a result vector Z of $M_k$ bits. The algebraic operations performed by the collective optoelectronic processors serve to successively manipulate an N-bit input vector $X_0$ by one or more $N_k \times M_k$-bit matrices Y.

The processor-to-processor optical distribution/replication serves to optically distributing a first result vector $Z_1$ from the $M_1$ light transmitters of a first processor to the $N_2$ optical detectors of each of the optoelectronic processing elements of a next processor and so on, processor to processor as each processor in turn performs an algebraic operation. Each optical distribution/replication is of the vertical type where each bit $Z_{1i}$ of the first result vector $Z_1$ of the first processor is transmitted to the ith optical detector of all $M_2$ processing elements of the next processor, and so on. The last optically-encoded result vector $Z_L$ so derived is an algebraic manipulation of the original optically-encoded input vector $X_0$ by the matrices $Y_k$, k=1 through L, as were held within each the plurality L of optoelectronic processors.

The original matrices $Y_k$, and/or the vectors of which each such matrix is comprised, may have been (i)

optically received, in the manner of a distribution, into the light detectors of the optoelectronic processing elements of each optoelectronic processor, or (ii) electrically received by the electronic circuitry of the optoelectronic processing elements of each optoelectronic processor.

Accordingly, and as an even more generalized expression of an optically-mapping optoelectronic vector-matrix algebraic processing system in accordance with the present invention, the system is for algebraically manipulating an N -bit input vector stepwise in accordance with L stored matrices $Y_k$, each matrix $Y_k$ being of $M_k$ rows by $N_k$ columns where k equals 1 through L, in order to produce a $M_k$-bit output vector. Such a vector-matrix algebraic processing system includes one or more, L, optoelectronic processors. Each optoelectronic processor $OP_k$ equals 1 through L, includes a number of $M_k$ arrayed optoelectronic processing elements 1, 2, ... $M_k$.

Each optoelectronic processing element $OPE_m$, m equals 1 through $M_k$, includes a number $N_k$ of light detectors. Each light detector $LD_n$, n equals 1 through $N_k$, is for detecting a corresponding data bit $X_n$, n equals 1 through $N_k$, of an optically-encoded $N_k$-bit input vector X. Each optoelectronic processing element $OPE_m$ further includes at least $N_k$ local memories, each local memory $LM_n$, n equals 1 through $N_k$. Each local memory $LM_n$ is for storing a data bit $Y_{mn}$ of a row m of a matrix $Y_k$, m equaling the number of the $OPE_m$ in processor $OP_k$, in which processor $OP_k$ the local memory $LM_{mn}$ is located while n equals 1 through $N_k$. Each optoelectronic processing element $OPE_m$ further includes an electrical computational means for electrically performing an algebraic operation on the $N_k$-bit input vector X detected by the $N_k$ light detectors of processor $OP_k$ in consideration of the row m of the stored matrix $Y_k$ held within the at least $N_k$ local memories to produce a result bit $Z_i$ of a result vector Z. Finally, each optoelectronic processing element $OPE_m$ a light transmitter for transmitting the result bit $Z_i$ of the result vector Z as an optically-encoded output signal.

In this construction the collective $N_k$ local memories of the collective $M_k$ optoelectronic processing elements of each optoelectronic processor $OP_k$ hold a matrix $Y_k$ of size $M_k$ rows $\times N_k$ columns. The collective $M_k$ light transmitters of the collective $M_k$ optoelectronic processing elements of each optoelectronic processor $OP_k$ transmit a result vector $Z_j$ of $M_k$ bits. Finally, the algebraic operation performed by the collective L optoelectronic processors is the stepwise manipulation of an $N_1$-bit input vector X by a successive matrices $Y_k$ each of $M_k$ rows by $N_k$ columns, k equals 1 through L, with the additional restriction that $N_k$ is equal to $M_{k-1}$.

The vector-matrix algebraic processing system further includes a processor-to-processor optical distribution means for optically distributing a first result vector $Z_1$ from the $N_1$ light transmitters of an first optoelectronic processor $OP_1$ to the $N_1$ light detectors of each of the $M_2$ optoelectronic processing elements of a next optoelectronic processor $OP_2$ and so on, processor-to-processor as each in turn performs an algebraic operation. The distribution is so that each bit $Z_1$ of the first result vector $Z_1$ of the first optoelectronic processor $OP_1$ is transmitted to the ith light detector of all $M_1$ rows of processing elements of the next optoelectronic processor $OP_2$ and so on.

According to this generalized construction, a last optically-encoded result vector $Z_L$ is derived as an algebraic manipulation of the original optically-encoded input vector X by a series of matrices $Y_k$, k equals 1 through L, that are held within each of the plurality L of optoelectronic processors.

4.3 An Embodiment of the Optoelectronic Vector-Matrix Algebraic Processing System Using Optical Distributions Between (Typically) Two Optoelectronic Processors Operating in Tandem, Particularly for Performing and Intrinsic Vector Outer Product A second embodiment of the present invention uses two (only) optoelectronic processors in tandem. This second embodiment particularly serves to perform vector-vector algebraic processing, particularly for intrinsic vector outer product computations. It algebraically manipulates an N-bit vector X in accordance with an M-bit vector Y to produce a M×N-bit result matrix Z, and, in tandem and typically simultaneously, algebraically manipulates the same M-bit vector Y in accordance with the same N-bit vector X to separately again produce the N×M-bit result matrix Z. The two same-result matrices Z are located separately, one within each of the two optoelectronic processors.

This optically-mapping optoelectronic tandem vector-vector algebraic processing system producing two result matrices in tandem includes a first optoelectronic processor 1 having M arrayed optoelectronic processing elements 1, 2, ... M. Each processing element i, i equals 1 through M, includes N light detector sub-processing units, or leaf units, each of which detects a data bit $X_j$ of an optically-encoded input vector X, j equals 1 through N. Each processing element also includes at least N local memories, at least one of which stores a data bit $Y_i$ of a stored vector Y. An electronic circuit electronically performs an algebraic operation on the input vector X detected by the N light detectors in consideration of the stored data vector Y held within the N local memories to produce a result bit $Z_i$ of a result vector Z. A light transmitter transmits a received bit-signal as an optically-encoded output signal. Finally, a bi-directional electrical distribution communicates, at a first time, the data bit $Y_i$ of the vector Y which is stored in at least one of the N local memories to the light transmitter in order that it may be transmitted as an output signal, and, at a second time, the result bit $Z_i$ to the N local memories for storage therein as a new result data bit $Z_{ij}$ of the result matrix Z.

According to this construction, the collective local memories of the collective M optoelectronic processing elements initially hold a vector Y of size M bits. At the first time the collective light transmitters of the collective M optoelectronic processing elements transmit this vector Y of M bits. After the first optoelectronic processor's own receipt of the vector X (in a manner to be explained) its collective optoelectronic processing elements manipulate this N-bit input vector X by the M-bit stored vector Y to produce a M×N-bit result matrix Z which is stored in the collective local memories of the first optoelectronic processor.

In mirror symmetry, the optically-mapping optoelectronic tandem vector-vector algebraic processing system also includes a second optoelectronic processor 2 having a plurality of N arrayed optoelectronic processing elements 1, 2, ... N. Again, each processing element i, i equals 1 through N, includes M light detectors, this time each for detecting a data bit $Y_j$ of an optically-encoded input vector Y, j equals 1 through N. Similarly, each processing elements includes at least M local memories at least one of which is now for storing a data bit $X_i$ of a stored vector X. The electronic circuitry functions as before to electronically perform an algebraic operation on the input vector Y detected by the M light detectors in consideration of the stored data vector X held within the M local memories to produce a result bit $Z_i$ of a result vector Z. The light transmitter again transmits a received bit-signal as an optically-encoded output signal. Finally, the bi-directional electrical distribution serves, at the first time, to communicate the data bit $X_i$ of the vector X as is stored in at least one of the M local memories to the light transmitter in order that it may be transmitted as an output signal, and, at a second time, to distribute the result bit $Z_i$ to the N local memories for storage therein as a new result data bit $Z_{ij}$ of the result matrix Z.

Thus, for the second optoelectronic processor the collective local memories of the collective N optoelectronic processing elements initially hold a vector X of size N bits. At the first time, the collective light transmitters of the collective N optoelectronic processing elements transmit this vector X of N bits. This is, of course, how the vector X is received by the light detectors of the processing elements of the first optoelectronic processor. The collective optoelectronic processing elements of the second optoelectronic processor algebraically manipulate the N-bit input vector Y by the M-bit stored vector X to produce the M×N-bit result matrix Z, which matrix Z is now stored in the collective local memories of the second optoelectronic processor.

The optically-mapping optoelectronic tandem vector-vector algebraic processing system includes two—a vertical and a horizontal—optical distributions. A first-processor-to-second-processor optical distribution optically distributes the data vector Y from the M light transmitters of the first processor to each of the M optical detectors of each of the N processing elements of the second processor. This distribution is such that each bit $Y_i$ of the data vector Y of the first processor is transmitted to the ith optical detector of all N rows of processing elements of the second processor. The second-processor-to-first-processor optical distribution optically distributes the data vector X from the N light transmitters of the second processor to each of the N optical detectors of each of the M processing elements of the first processor. This distribution is such that each bit $X_i$ of the data vector X of the second processor is transmitted to the ith optical detector of all M rows of processing elements of the first processor.

Resultant to both these distributions, and to the algebraic manipulations transpiring in each processor, a result matrix Z is derived in the first processor as an algebraic manipulation of the original optically-encoded input vector X by a the vector Y that was originally held within local memories of its M arrayed optoelectronic processing elements. Meanwhile, the transpose of the same result matrix Z* is derived in the second processor as an algebraic manipulation of the original optically-encoded input vector Y by a the vector X that was originally held within local memories of its N arrayed optoelectronic processing elements.

4.4 D-STOP Architecture Description

Figure 6:
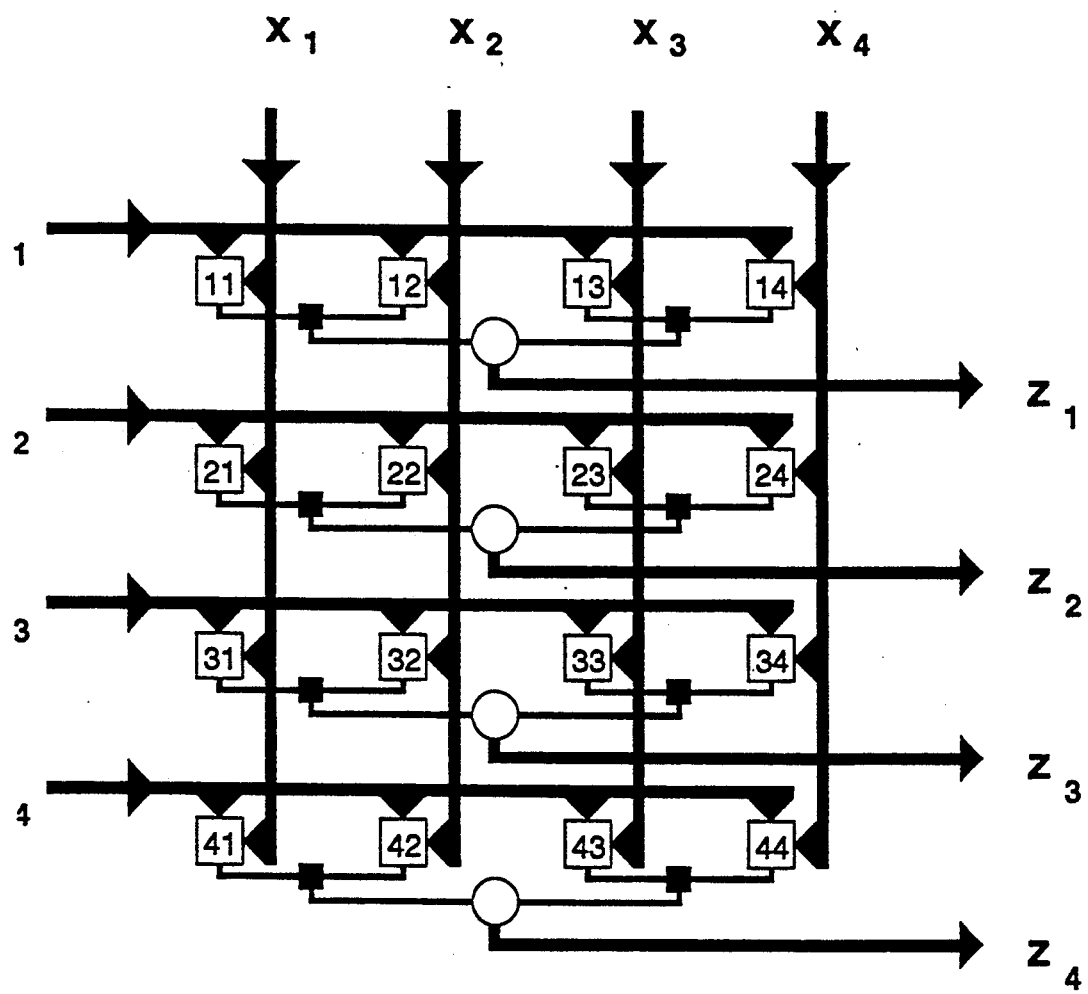
FIG. 6 is a conceptual representation of the architecture of a first embodiment of an optoelectronic processor (OP) in accordance with the present invention, which OP (i) is used as part of an optoelectronic matrix algebraic processing system, and (ii) is itself constructed in a modular fashion from optoelectronic processing elements (OPEs).
Figure 13:
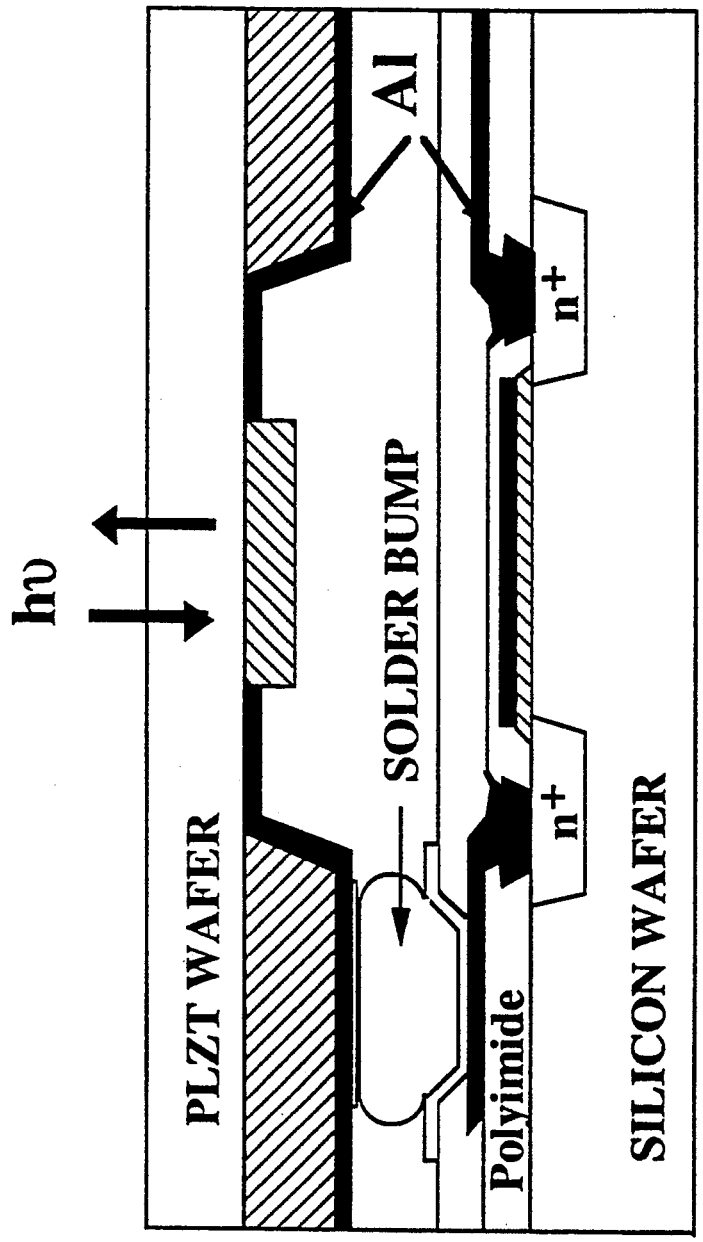
FIG. 13 is a diagrammatic cross-sectional view at an expanded scale of a flip-chip construction wherein a PLZT wafer is bonded to a silicon wafer, which flip-chip construction is useful in implementing the optoelectronic processing elements (OPEs) used in the optoelectronic processors (OPs) used in the D-STOP optoelectronic matrix algebraic processing system in accordance with the present invention.
Figure 14:
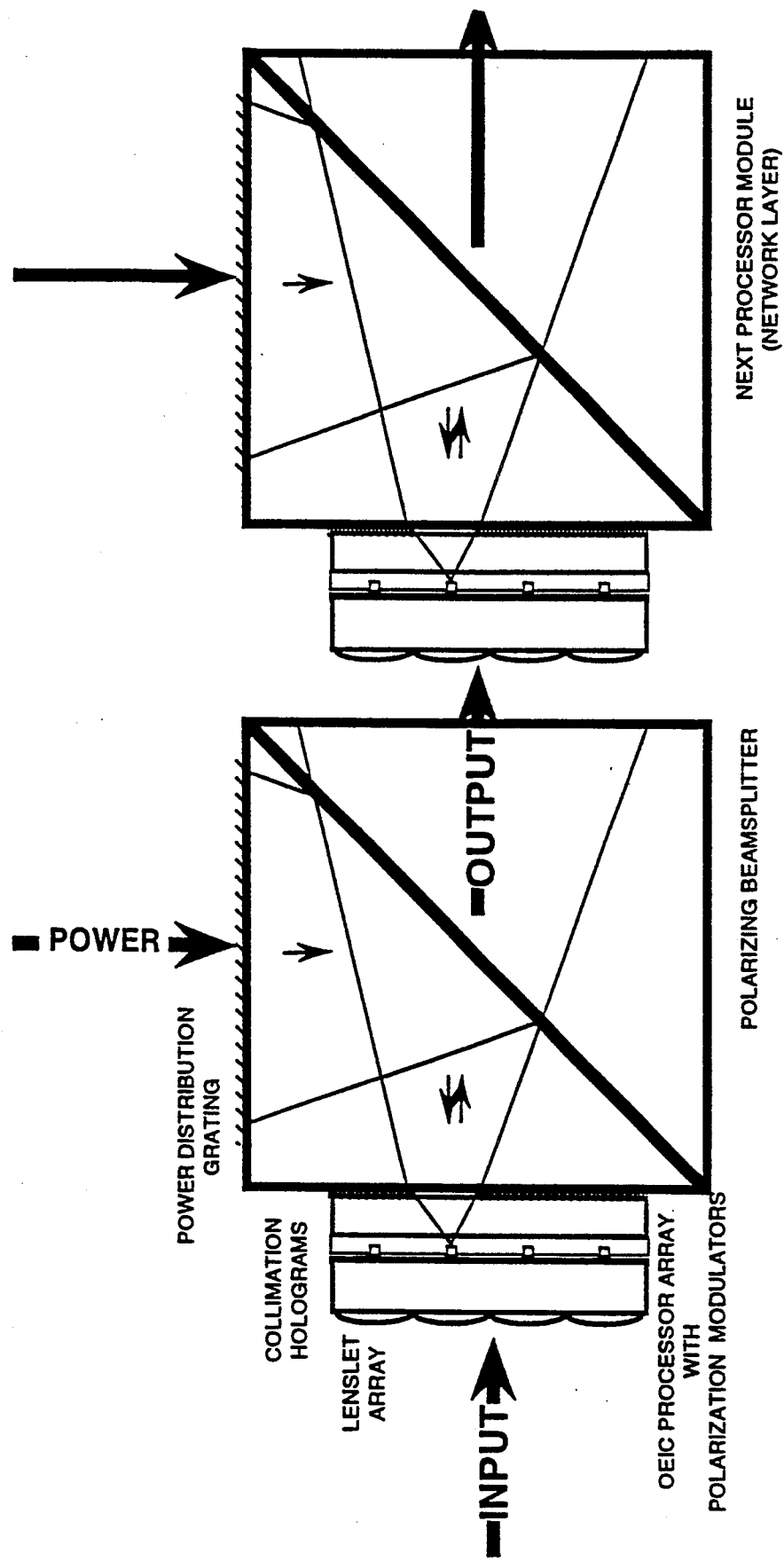
FIG. 14 is a diagrammatic view of one, packaged, embodiment of a D-STOP architecture optical module, the module using two-sided reflection-modulator Opto-Electronic Integrated Circuit (OEIC) technology.

FIG. 6 shows an abstract, diagrammatic, representation of one portion of the basic D-STOP architecture. The portion diagrammatically represented is called an optoelectronic processor (OP). (Other representations of this same, first embodiment, OP will be shown in FIGS. 7a, 9, 12 and 13. A second embodiment of an OP will be shown in FIG. 8, 10a and 10b. Remaining, optical, portions of the D-STOP architecture will be shown in FIGS. 11a, 11b and 13.) For an N×N matrix problem size, this optoelectronic processor (OP) portion of the architecture consists of N optoelectronic processing elements (OPEs), one for each row. Accordingly, there are four such OPEs within the single OP shown in FIG. 6.

Each OPE contains a number of functional units in a binary tree structure. Each OPE has N leaf units which correspond to the matrix elements within the given row. Each leaf unit typically contains one or two light detectors, a local memory, arithmetic/logic circuitry, and an electronic I/O. (Reference FIG. 9 for an exploded view of a typical layout, or floor plan, of an OPE (not the identical OPE of the OP shown in FIG. 6) having a single light detector.)

At the intermediate nodes of the tree-structured OPE are fanning units. The units are called "fanning" as opposed to "fan-in" or "fan-out" because, in the preferred embodiments of the OPEs, the can pass (electrically-encoded) data bi-directionally. Each fanning unit typically also has local memory, arithmetic/logic circuitry and electronic I/O. (Reference FIG. 9 for an exploded view of a typical layout of a fanning unit.)

At the root of the tree-structured OPE is the root unit. In addition to local memory, arithmetic/logic circuitry and electronic I/O, the root unit has an optical transmitter. A unit of any type may also have optical detectors for the receipt of data, instructions and/or clock signals. (Reference FIG. 9 for an exploded view of a typical layout, or floor plan, of a root unit.)

Figure 3:
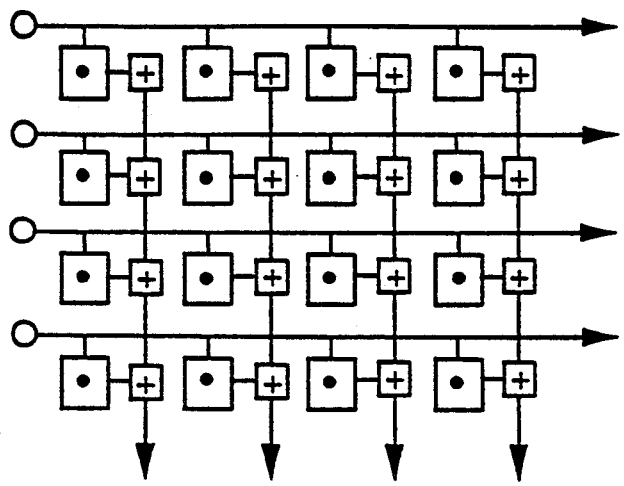
FIG. 3 is a conceptual representation of a rejected alternative architecture to the "Dual-Scale Topology Optoelectronic Processor(s)/Processing System", or "D-STOP", architecture of the present invention, which rejected matrix-vector multiplier architecture has electrical inputs and optical outputs.
Figure 4:
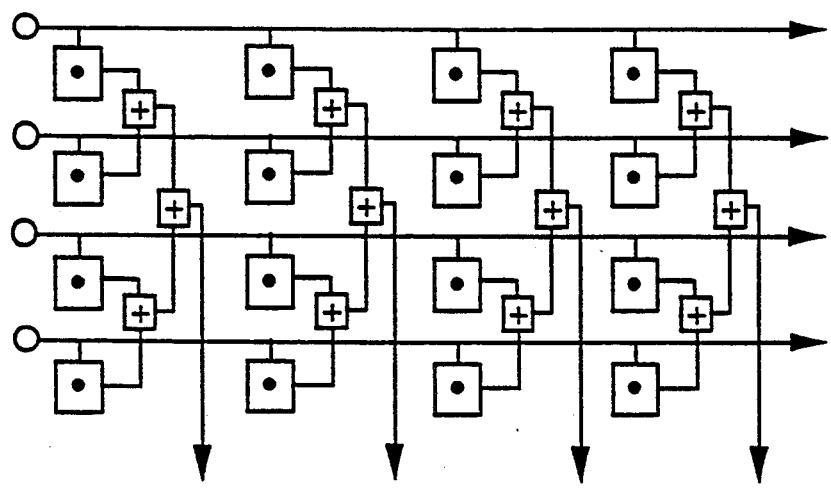
FIG. 4 is a conceptual representation of another rejected alternative architecture to the "D-STOP" architecture of the present invention, which rejected matrix-vector multiplier architecture has electrical inputs, a tree-structured electrical fan-in of these inputs, and optical outputs that are reduced in number relative to the optical outputs of the architecture of FIG. 3.
Figure 5:
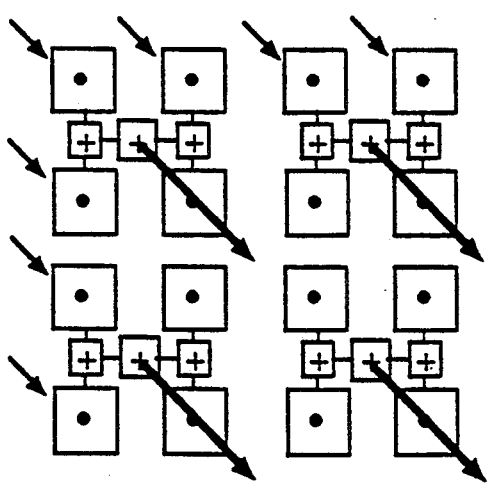
FIG. 5 is an abbreviated first conceptual representation of the "D-STOP" architecture of the present invention, which abbreviated conceptual representation is particularly directed to initially showing that the "D-STOP" architecture has optical inputs, a tree-structured electrical fan-in of these inputs, and optical outputs that are again reduced in number relative to the optical outputs of the architecture shown in FIG. 3.

The D-STOP architecture supports six basic processes, which when appropriately combined permit various matrix algebraic operations. Data vectors originating outside the optoelectronic matrix algebraic processing system, and outside any OP which is a part of the system, can be introduced into an OP via either or both of its preferably two optical interconnections. An optical vertical distribution, shown in FIG. 6 as $X_i$, communicates an external vector element $x_j$ to the jth leaf unit of each OPE. An optical horizontal distribution, shown in FIG. 3 as $Y_j$, communicates an external vector element $y_i$ to each leaf unit of the ith OPE.

Each of the two, vertical and horizontal, optical distributions is preferably received at an associated one of a preferable two light detectors at each leaf unit of each OPE of the OP. However, certain usages of the OPE's, of OPs constructed from OPEs, and of a matrix algebraic processing system constructed using OPs, do not even require two optical distributions (as will be explained). Moreover, even when both optical distributions are used they are not invariably beneficially pipelined, and overlapped in time. Accordingly, one only light detector at each leaf unit of each OPE will suffice for both optical distributions if time multiplexed, and used sequentially.

An electrical communication, or data distribution, path exists between units within each OPE. This electrical communication path is preferably bidirectional between OPE units. A leaf unit electronically communicates data via this electrical path down and up the OPE tree structure to and from the other leaf units that are within the OPE, as well as to the OPE's fanning units and root unit. Local computation can be performed at the leaf units on (i) data received through any of the various optical (2) or electrical (1) distributions and/or (ii) data stored in local memory. Local computation can be performed at the fanning or root units on (i) data received through any of the electrical distribution and/or (ii) data stored in local memory.

During the fan-in process, a computation is performed within each OPE on (i) vector data received—normally optically—at the N leaf units, and (ii) vector or matrix data stored within the OPE, normally in a manner distributed at the leaf units themselves. The results of the computations transpiring in the several units of each OPE are ultimately combined at the root unit. Notably, the computation may be variously distributed among any or all of the leaf, fanning and/or root units. Finally, the transmitter at the root node of each OPE permits an optical output.

The basic processes of the OPEs, and the OP that is made from OPEs, can be combined to perform matrix algebraic operations. One of the most important of these operations is matrix vector multiplication, which is achieved using three basic steps. First, an input vector X s distributed by the optical vertical distribution. Second, each OPE leaf unit performs a local multiplication with a locally-stored matrix element, $M_{ij}$. Third, the products $M_{ij}* x_j$ are then summed on the OPE tree as a fan-in process. The resulting output vector elements $Z_i$ are optically transmitted from the root units.

Because the multiplications and summations are performed electronically, they may be generalized to nonlinear or symbolic operations by substitution of the appropriate circuitry. Many problems can be formalized as matrix-vector multiplications if such generalizations are allowed. For example, a parallel formalization of modus ponens inference in fuzzy logic can be achieved by substituting a minimum operator for multiplication and a maximum operator for summation. Reference sections 4.5 and 4.6 following, and also G. C. Marsden et. al., OSA Optical Computing Tech Digest, 212, 1991.

The D-STOP architecture can also be used to perform vector outer products. Applicants differentiate two types of vector outer products, defining an extrinsic vector outer product as that performed on two vectors which originate outside of the D-STOP system. The external row vector X is introduced to the architecture via the optical vertical distribution. The external column vector Y is introduced by the optical horizontal distribution. The products can be performed with local computations at the leaf units of each OPE. Again, these products can be generalized to include nonlinear or symbolic functions.

Figure 7A:
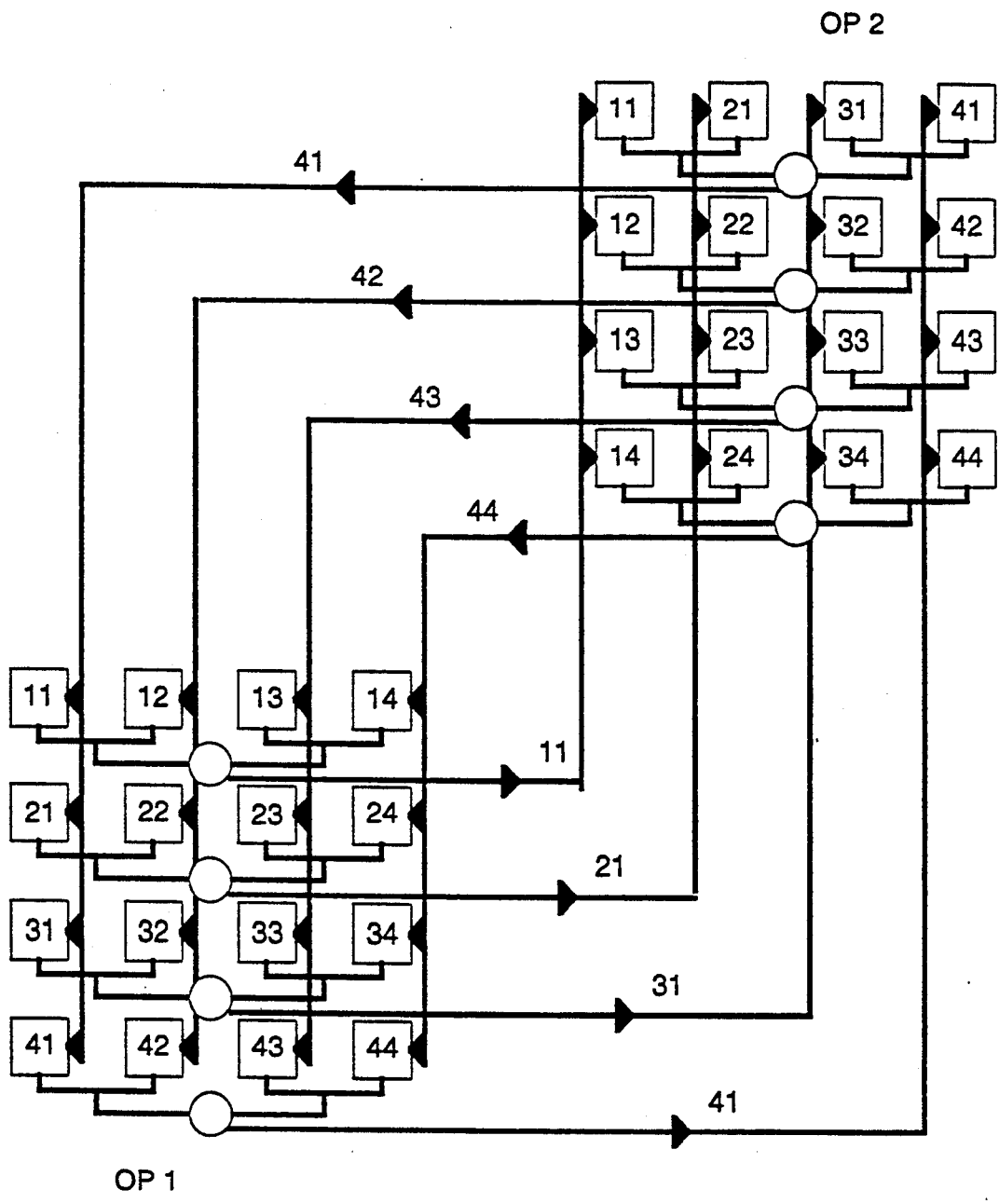
FIG. 7a is a conceptual representation of the tandem architecture of a first embodiment, using two of the optoelectronic processors (OPs) previously shown in FIG. 6, of an optoelectronic matrix algebraic processing system in accordance with the present invention, which processing system tandem architecture is called "Dual-Scale Topology Optoelectronic Processor(s)/Processing System", or "D-STOP".
Figure 7B:

FIGS. 7a and 7b diagrammatically show a tandem architecture used to perform an operation which is defined as an "intrinsic vector outer product". An outer product is computed between a selected row and selected column of a matrix, with the result returned to the matrix for further processing. This operation can be used, for example, in parallel implementations of Gauss-Jordan elimination in linear algebra—reference R. A. Athale and J. N. Lee, Proc.IEEE 72, 931, 1984—and consistent labeling in artificial intelligence—reference section 4.7 following and G. C. Marsden et. al., Appl. Opt. 30, 185, 1991.

In performing the "intrinsic vector outer product" operation two encodings of the matrix data are used. In the optical processor OP 1, the data is encoded as before, while the other optical processor OP 2 encodes the transpose of the matrix. That is, each OPE in OP 1 represents one row vector of the matrix while each OPE of OP 2 represents a column vector of the same matrix. In OP 1, the selected column vector is distributed via the intrinsic electronic distribution, while OP 2 uses this mechanism to distribute the selected row vector (FIG. 7b). Each OPE has one matrix vector to be distributed in this manner. In addition, these vectors are transmitted via the light transmitters of each OPE of each OP (OP1 and OP2) to the selected leaf unit optical receivers of all OPE's of the other OP (i.e., OP2 and OP1). The extrinsic vertical optical distributions deliver the appropriate row vector to OP 1 and the appropriate column vector to OP 2.

Thus, each leaf unit (of any OPE of either OP) receives one of the necessary two vectors for calculating the outer product optically. The other, complimentary, vector resides within the OP—but only at one leaf unit of each OPE. It is distributed from this leaf unit to all other leaf units electrically, which is why the arrows in FIG. 7b are shown as bi-directional. This use of the electrical distribution in performance of the "intrinsic vector outer product" operation is why the electrical distribution between units of each OPE is bi-directional, and why the intermediate units are called "fanning" units.

Finally, a local computation at the leaf units is performed. The matrix calculated as the vector product preferably ultimately ends up in both OP1 and OP2. It is usefully located in both places to provide maximum flexibility, fully parallel operations, and versatility, to ensuing operations, and to maintain both OPs of the system in the identical state. The use D-STOP tandem architecture in performance of the "intrinsic vector outer product" operation is, again, readily generalizable to various arithmetic and logical operations other than simply multiplication.

Figure 8:
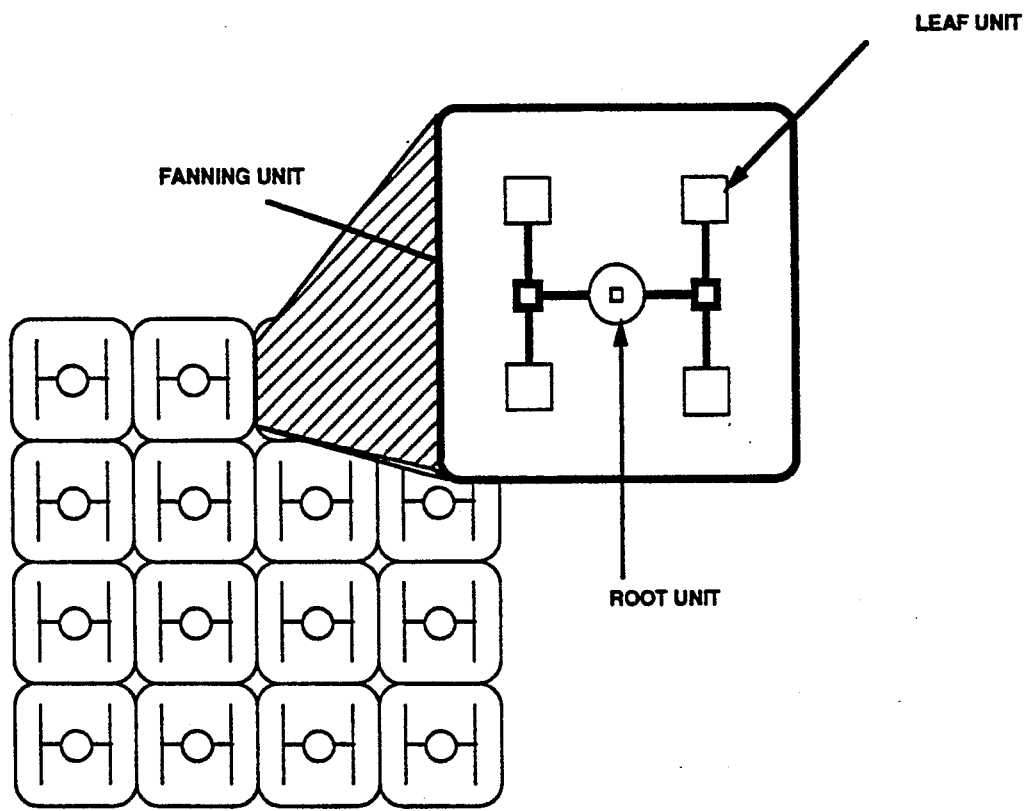
FIG. 8 is a diagrammatic representation of the physical structure of the first embodiment of the optoelectronic processor (OP) previously shown in FIG. 6, the representation showing in exploded view one optoelectronic processing element (OPE) of the OP, the represented first embodiment of the OP being that particular embodiment of the OP that is used in that particular D-STOP architecture optoelectronic matrix algebraic processing system previously shown in FIGS. 7a and 7b.

FIG. 8 diagrammatically shows the physical structure of a first embodiment of an optical processor, or OP, in accordance with the D-STOP architecture. The OP has four (4) optoelectronic processing elements, or OPEs, distributed in a two by two (2×2) planar grid array. One OPE is shown at an expanded scale.

The binary tree structure of each OPE is preferably laid out as an H-tree. H-trees have several optimal properties. Reference C. Mead and M. Rem, IEEE JSSC SC-14 (2) April 1979. First, the area of the communication paths, or lines, within the tree is negligible. That is, the area of each OPE having N leaf units is on the order of N, or O(N). Secondly, the line length to any leaf unit is constant, reducing signal skew during fan-in and electronic horizontal distribution. Lastly, because the leaf units are distributed in two-dimensions, the length of electronic wire from the root unit to any leaf unit is of the order of the square root of N ($O(N^{\frac{1}{2}})$).

Still other layouts for tree structures have these properties. For example, an X-tree—a quaternary tree—connects units at successive levels in an "X" pattern. Accordingly, the word "H-tree" should be broadly interpreted within this specification, and should be recognized by practitioners of the electronic circuitry layout arts to incorporate a scheme for laying out circuit units at equal minimum distances. It is only incidentally, and in certain members of topologically equivalent patterns supporting functionally equivalent interconnection, that an "H-tree" actually reflects the geometry of the letter "H".

It is also possible to use other than binary tree structures. X-trees, for example, have four (4) inputs to each fanning unit. X-trees so function while still maintaining a constant line length between any leaf unit and the root unit.

Before continuing with the explanation of the OP, and of optoelectronic matrix arithmetic processing systems based on OPs, it is useful to pause to consider the benefit of an H-tree, or other equivalent 2-D tree-based, layout. In contrast to the optoelectronic system of the present invention, all-electronic systems (chips) cannot use an H-tree structure when external inputs to the leaf units are required, because the system (chip) perimeter, which is $O(N^{\frac{1}{2}})$ in circumference, cannot support N input lines. Rather, all-electronic tree-based matrix algebraic systems with an external input(s) require a one-dimensional layout, with $O(N)$ line length and $O(N \log N)$ area.

Therefore, an OP in accordance with the D-STOP architecture of the present invention can, by using optical input from the third dimension and the H-tree layout, reduce the electronic delay, which is approximately linear in line length, by a factor $O(N^{\frac{1}{2}})$ less than would be the case for an all-electronic circuit.

Figure 9:
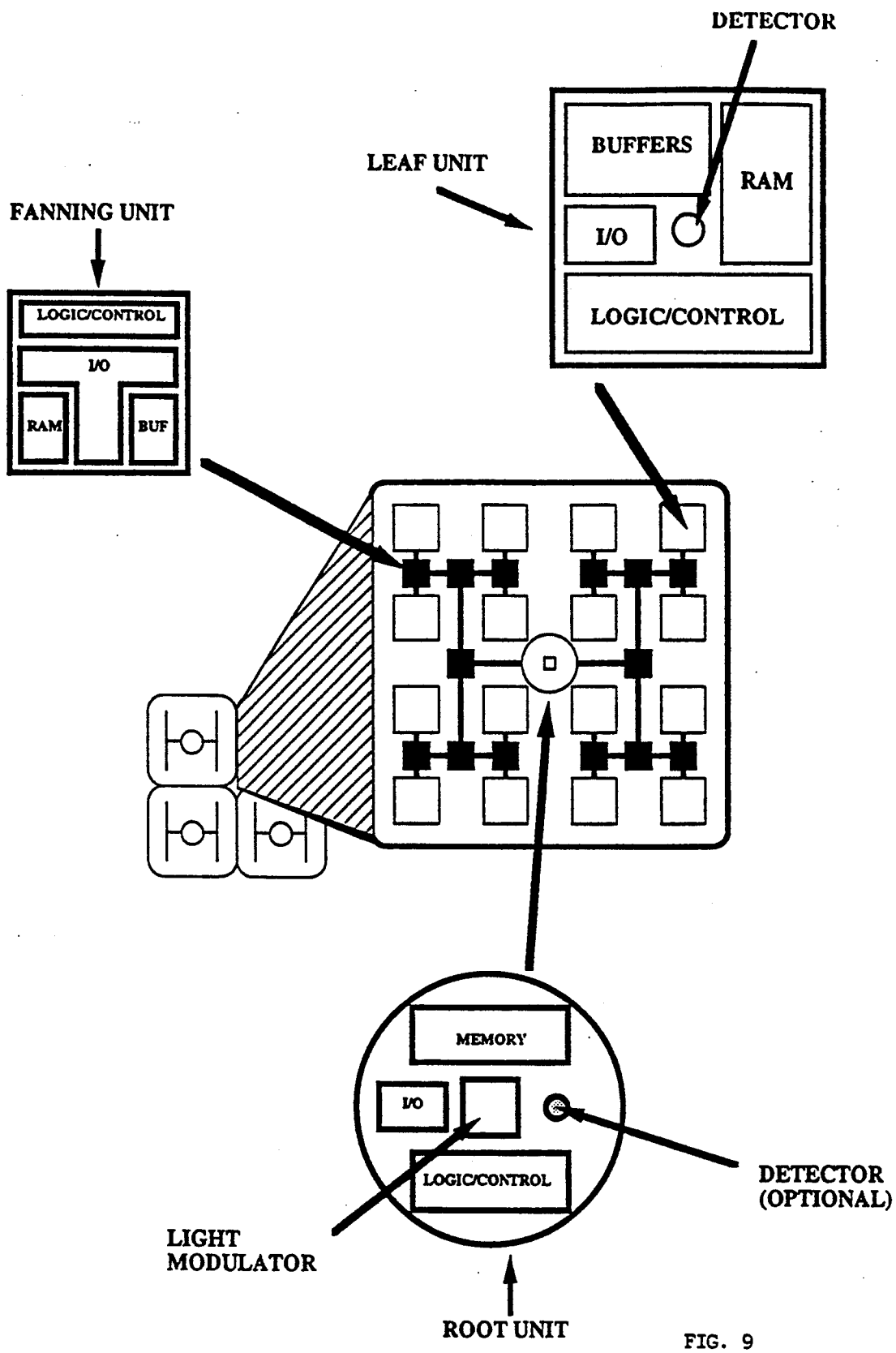
FIG. 9 is a diagrammatic representation, similar to FIG. 8, of the structure of a second embodiment of the optoelectronic processor (OP), the representation now showing (i) in a first exploded view the physical structure of a second embodiment of an optoelectronic processing element (OPE), and (ii) in a second exploded view a typical floor plan and contents of each of a leaf unit, a fanning unit, and a root unit of this second embodiment of the OPE.

A diagrammatic representation of the physical structure of a second embodiment of an optoelectronic processor, or OP, in accordance with the D-STOP architecture of the present invention is shown in FIG. 9. This second embodiment of the OP has both (i) a greater number of OPEs (sixteen, in a four by four matrix), and (ii) a greater number of leaf (and fanning) units per OPE, than did the first embodiment of an OP shown in FIG. 8. This second embodiment of the OP is used to implement a particular embodiment of a D-STOP optoelectronic matrix algebraic processing system shown in FIGS. 18-20. It is presently introduced in FIG. 9 only in order that it may early be recognized that the D-STOP architecture of the present invention is expandable, and that matrix algebraic problems of differing $N \times M$ size may be solved.

Typical constituent components, and typical layouts, or floor plans, of each of the leaf, fanning, and root units are shown in exploded view in FIG. 9. The indicated structures are commonly implemented in silicon semiconductors as an integrated circuit.

FIG. 10a diagrammatically shows the mapping of vectors by the vertical optical distribution, and FIG. 10b diagrammatically shows the mapping of vectors by the horizontal optical distribution, of the D-STOP architecture in accordance with the present invention. The distributed data vectors may arise (i) externally or (ii) internally to the system. Both (i) scaling and (ii) replication of vector data elements may be observed.

For each distribution the input transmitter array pattern of a transmitting OP is identical to that of the detectors within a receiving OP, but at a larger scale. Herein lies the "dual-scale" principle of the present invention. Because the pattern of the output transmitters in each OP is similar (i.e., identical but at a differing scale) to that of the input detectors in each OP, the extrinsic vertical distribution requires only demagnification and replication. The extrinsic horizontal distribution requires only replication.

Both these functions can be realized using free-space space-invariant optics. "Free-space" means that the optics are positioned along optical paths proceeding in three dimensions (as are most optics). "Space invariance" means that once the required optical connections from one light transmitter to the respective detectors has been established then all other light transmitters use the same optical system, only with a relative shift in the input, and in the output, planes respectively. Space invariance greatly reduces the required space-bandwidth product, and hence the area, of the optical system to the order of the square of N ($O[N^2]$) where N is the number of detectors in the receiving optoelectronic processor.

Figure 11A:
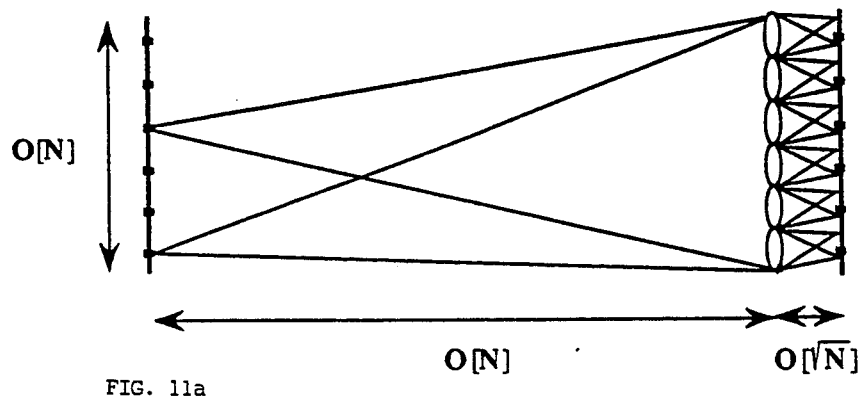
FIG. 11a is a diagrammatic representation of the complete D-STOP optoelectronic matrix algebraic processing system previously shown in FIGS. 7a and 7b; this diagrammatic representation particularly showing a ray trace diagram of a first embodiment of an optical system—a lenslet fanout system—usable in conjunction with two optoelectronic processors (OPs) in accordance with the present invention such as were previously shown, for example, in FIGS. 6-8 to realize said complete D-STOP optoelectronic matrix algebraic processing system.

Demagnification and replication can be obtained using a lenslet array, as is shown by ray trace diagram in FIG. 11a. Reference N. Farhat and D. Psaltis, Chapter 2.3, Academic Press 1987. Alternatively, demagnification and replication can be realized by a demagnification lens in combination with a lens and grating for replication and fanout, as shown by ray trace diagram in FIG. 11b. Reference A. V. Krishnamoorthy et. al., Proc. OSA topical meeting on optical computing, Salt Lake City 1991, pp. 244.

The space-invariant optical communication in accordance with the present invention is area (or volume) efficient in that it effectively uses the available optical space-bandwidth product. This should be contrasted with existing all-optical systems. The D-STOP architecture for matrix algebraic processing provides several advantages over an all-optical architecture, and processor.

First, the functionality and accuracy of the D-STOP architecture can readily be tailored to a given matrix algebraic problem by the appropriate choice of electronics. Such electronics can include analog, digital or hybrid circuitry.

Second, and importantly, the number of light transmitters is reduced from $O(N^2)$ to $O(N)$. Light transmitters cannot readily be made, if at all, in silicon. Reduction in the numbers of such transmitters greatly facilitates fabrication of large size, large capacity, matrix algebraic processing systems.

Third, the D-STOP architecture of the present invention permits the use of a common structure for both matrix-vector multiplication and vector outer product, allowing simple integration of these operations in complex computations.

Fourth, the H-tree organization of the electronics is very beneficial to the operational speed of the system. The timing skew resulting from the optical fan-out—approximately 10-100 picoseconds—can essentially be neglected in setting the maximum clock rate at which a matrix algebraic processing system in accordance with the D-STOP architecture may function. Because the electronic line lengths between units of the H-tree are equal, there is negligible timing skew between signals arriving at the tree's root unit from the different leaf units. The negligible timing skew facilitates efficiently pipelined operations in a synchronous system, or preserves precise timing relationships in an asynchronous system.

4.5 D-STOP Architecture Matrix Algebraic Processing System—Desiqn Considerations The D-STOP architecture is based on a well-considered inquiry into the appropriate level at which optical connections should be introduced into systems for opto-electronically implementing matrix-vector algebraic computation. The choice of the level, abundance, and nature of the optical connections depends largely on the availability, performance, and fabrication and integration costs of (i) optical transmitter technologies (such as laser diode arrays and light modulators) as well as (ii) optical interconnect technologies (such as computer generated holograms (CGH)). Note that (iii) light detectors are omitted. This is because they are small, inexpensive, easy to make, and easy to make compatibly with silicon semiconductor logic circuitry. Accordingly, the accommodation of the system design to light detectors is of lessor concern.

The reason why light transmitters are important to the design of an optoelectronic system is that they are presently, circa 1992, both expensive and hard to make relative to either the (i) optical detectors, or (ii) electronic circuitry, that can both be made quite reliably and inexpensively from silicon. The reason that optical interconnection technology is important to the design of an optoelectronic system is that, for correct and reliable system performance, all optical communication must be reliable at adequate noise margins.

Two possible optical interconnect methods can theoretically be distinguished. The first would use optical interconnects to perform the fan-out operation and electronic interconnects for fan-in. The second would use optical interconnects for both fan-out and fan-in operations. The distribution, or fan-out, operation can be achieved optically with relative ease using a CGH requiring only $O(N)$ transmitters and $O(N^2)$ detectors where N is the number of neurons. However, if optical fan-in is also used, as is the case with existing optical matrix-vector architectures (Reference W. T Rhodes, infra.), then a greater burden is placed on the transmitter array size ($O(N^2)$). Because the latter systems use intensity-based encoding methods, network accuracy is limited by laser and detector noise as well as by light modulator contrast ratios. Existing optical architectures also have limited functional flexibility in terms of generalizing the multiplication and summation operations conventionally associated with matrix-vector processing.

These considerations favor the first approach using the optical interconnections solely for fan-out. The use of optical fan-out and electronic fan-in/processing beneficially (i) reduces the requirements on the number of light transmitters while (ii) being advantaged by the flexibility, accuracy and economy of both VLSI circuitry and computer-generated holograms (CGH). Namely, VLSI circuitry is flexible, low cost, reliable and predictable for implementing synapses. Namely, computer generated holograms permit economical high density neuron-to-synapse connections. Typically up to $10^6$ connections/cm$^2$ may be reliably realized by using e-beam fabricated CGH with $0.5\mu$ feature size and 16 phase levels.

Accordingly, the D-STOP architecture of the present invention is readily currently (circa 1992) practically implementatable by integrating (i) optical modulator materials such as PLZT (reference section 4.3.2 and FIG. 13, following), with (ii) prefabricated silicon detectors and circuitry on a silicon or silicon-on-sapphire substrate. Because matrix algebraic processing, and neural network, systems in accordance with the present invention have capacities of from $10^6$ to $10^8$ interconnects (thereby being suitable for large problems) and processing speeds on the order of $10^{12}$ bit operations per second (thereby being suitable to solve problems speedily)—as will be further developed—the previous statement that the system of the present invention is presently practically realizable is of considerable importance. The proof of this statement is the subject of the remaining sections of this specification.

4.6 D-STOP Architecture Optical Systems

Several optical systems can provide the full broadcast interconnections required by the D-STOP architecture. In general, the choice of optical system depends on the transmitter technology used and the system configuration (transmissive or reflective modulators), as well as the particular application.

For instance, a refractive microlens array (shown in FIG. 11a) can be used to replicate the optical inputs. Reference N. Farhat, infra. Each lenslet forms an image of the entire input array onto one output neuron. This allows a very compact system implementation since only a single plane of optical components is required. In this case, the aperture and resolution of each lenslet necessarily limits the resolution of the entire system.

Figure 11B:
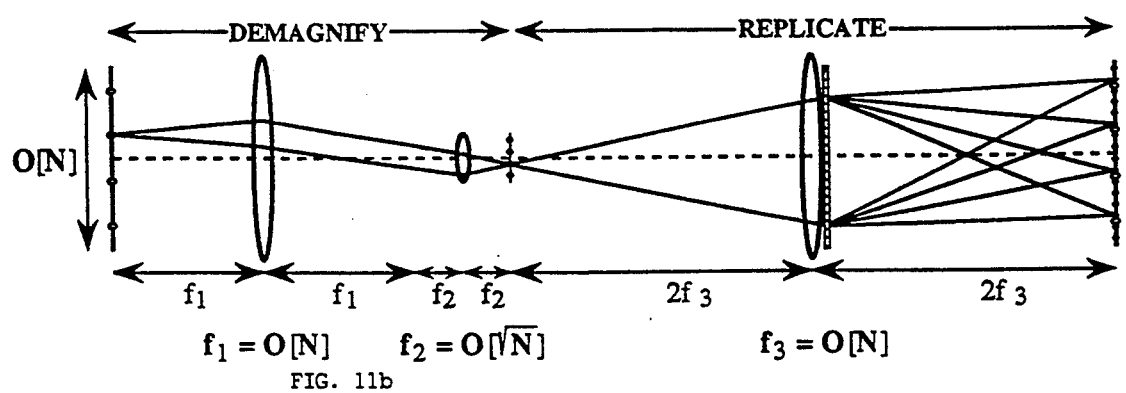
FIG. 11b is another diagrammatic representation, similar to FIG. 11a, of the complete D-STOP architecture optoelectronic matrix algebraic processing system previously shown in FIGS. 7a and 7b; this diagrammatic representation particularly showing a ray trace diagram of a second embodiment of an optical system—a demagnification/replication optical system—again usable in conjunction with two optoelectronic processors (OPs) in accordance with the present invention such as were previously shown, for example, in FIGS. 6-8 to realize said complete D-STOP optoelectronic matrix algebraic processing system.

An alternative is to use holographic beamsplitting in a common-path system. This optical system is shown in FIG. 11b. Reference A. V. Krishnamoorthy et. al., Proc. OSA topical meeting on optical computing, Salt Lake City 1991, pp. 244. The first two lenses form a demagnified image of the input array of modulators. The third lens transfers this image to the output plane. A holographic beamsplitter in contact with the third lens performs the replication and can also provide aberration correction. Because the light shares a common path, there is no "small-aperture" bottleneck, and the system's diffraction-limited resolution is high. The telecentric demagnifying stage maintains high throughput efficiency, and separates the holographic beamsplitter from the short focal length demagnifying lens, allowing a fixed maximum diffraction angle.

A diagrammatic representation of the optical distribution from an OP1 to an OP2, each OP1,2 being of a $16 \times 16$ array size, is shown in FIG. 12. An exploded view of a single OPE introduces the concept, to be further developed in Section 4.6 following, that, for neural network applications of the D-STOP architecture, a leaf unit may be called a "synapse", a fanning unit may be called a "dendrite", and a root unit may be called a "neuron".

Figure 11C:
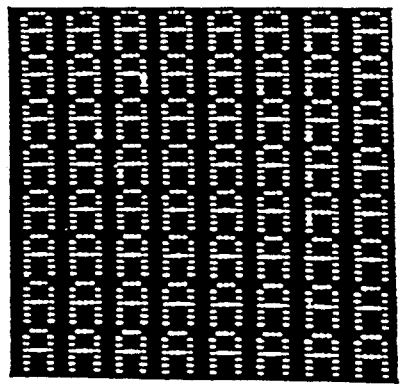
FIG. 11c is a pictorial representation of a rudimentary, but exemplary, 64×64 optical distribution achievable with the second embodiment of the optical system previously diagrammed in FIG. 11b.
Figure 11D:
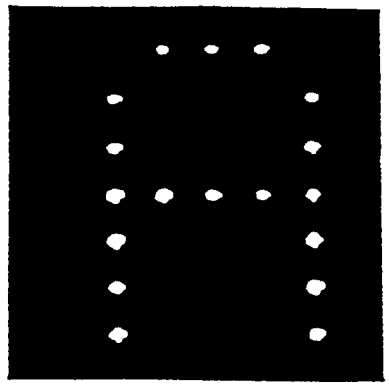
FIG. 11d is a pictorial representation of a portion of FIG. 11c at an expanded scale.

Experimental results for a modestly-sized $64 \times 64$ detector array ($8 \times 8$ modulator array) are shown in FIG. 11c. A Burch-encoded binary amplitude hologram was used. An $8 \times 8$ input (not shown) displayed the letter A with an input (modulator) spacing of 675 $\mu$m, and the optical system replicated this to an $8 \times 8$ array of A's with an output (detector) spacing of 85 $\mu$m. A view of a central "A" at an expanded scale is shown in FIG. 11d. The maximum spot size (main lobe) was 14 $\mu$m. The meaning of the experimental results shown in the pictures is that, just as there is no problem with the accuracy and noise of free-space optical distributions and replications over a $64 \times 64$ array of a few square centimeters, there is no difficulty foreseen to the similar distributions/replications over the areas of much larger arrays ranging to several thousand square and larger.

This is not surprising. A main advantage of the D-STOP optical system is that it is space-invariant; i.e., the impulse response of the system is identical for each optical transmitter. Assuming N OPEs and an $N \times N$ detector array, the space-bandwidth product required of the hologram is $Cn^2$, where c is a constant. Reference B. K. Jenkins et. al., Appl. Opt. 23, no. 19, Oct. 1, 1984.

It should be noted that all light transmissions, and all optical distributions/replications, in accordance with the present invention do not require either monochromatic or collimated light. Neither is any active light steering device required. This is highly advantageous: useful communication interconnection is realized with and by spatially fixed and unmoving components.

The total cross-sectional area required by the optical components is also $O(N^2)$, which matches the area growth of the OP array. Because the holographic beamsplitter is functionally separate from the demagnifying stage, the maximum diffraction angle does not increase with array size. As a result, the system length can be shown to scale as O(N) while maintaining a constant F-number and CGH minimum feature size. The system achieves high density optical interconnection ($\geq 10^4$ interconnections/cm$^2$ using the circuits described in Section 4.5). This integration density is limited only by the synapse circuit area, and not by the resolution of the optical system or the power dissipation of the detector units.

4.6.1 Technology Considerations

The D-STOP architecture system has been designed to take full advantage of both free-space optical interconnections and electronic VLSI systems on a hybrid optoelectronic integrated circuit (OEIC) technology base. The system achieves full connectivity between OPEs using space-invariant optical interconnections that can be efficiently implemented with existing refractive optical elements and multi-level phase diffractive optical elements. Because a thin CGH beamsplitter is used, mutually incoherent optical sources such as laser diodes or even narrow line width LEDs can be used instead of modulators.

The system of the present invention also minimizes the number of required modulators compared to existing optoelectronic matrix-vector architectures: thereby allowing the silicon integrated circuits (ICs) and the light modulators to be fabricated on separate chips (or wafers) and later bonded face-to-face using available electronic packaging technologies. An exemplary "flip-chip" bonded construction is diagrammatically illustrated in FIG. 13. The electrical connections between the output of the ICs and the electrodes of the modulators are preferably realized through Indium bonds. Since the density of modulators needed is low, the flip-chip bonding process permits the present implementation of OEICs with a relatively high yield.

PLZT light modulators are preferred for implementation of D-STOP architecture light transmitters because they can provide large fan-out (up to 1,000) with acceptable power dissipation due to their non-absorptive nature. Furthermore, PLZT light modulators can be operated at high speeds with relatively large contrast ratios. This permits simple detector designs and high system bandwidth. The construction of a two-dimensional PLZT spatial light modulator (SLM) is discussed by T. H. Lin, A. Ersen, J. H. Wang, S. Dasgupta, S. C. Esener, and S. H. Lee, in their paper "Two-dimensional spatial light modulators fabricated in Si/PLZT," Appl. Opt. 29, pp 1595–1603, April, 1990. Reference also co-pending U.S. patent application Ser. No. 07/632,033 filed Dec. 21, 1990, U.S. Pat. No. 3,242,707 for a SYSTEM AND METHOD FOR PRODUCING ELECTRO-OPTIC COMPONENTS INTEGRATABLE WITH SILICON-ON-SAPPHIRE CIRCUITS to the selfsame Sadik Esener who is an inventor of the present application, and also to Sing Lee, Subramania Krishnakumar, Volken Ozguz and Chi Fan. The contents of this related patent application are incorporated herein by reference.

The light supplied to, and modulated by, PLZT light modulators is normally supplied by a laser or other bright light source. It should be understood that the light transmitters of a system in accordance with the D-STOP architecture can alternatively be realized by light-emitting devices such as light emitting diodes (LEDs).

The scaling of a system in accordance with the present invention is well-behaved since both the optoelectronic chip and the optical system have identical growth rates. The H-tree fan-in structure permits a layout within an area O(N) for the detector units of one OPE. The total area (SBP) required by the optical system is also O(N$^2$) since a space-invariant optical system is used.

Because the holographic beamsplitter is functionally separate from the demagnifying stage, the maximum diffraction angle does not increase with array size. As a result, the system length can be shown to scale as O(N) while maintaining a constant F-number and CGH minimum feature size. In addition, the system size is not limited by the power dissipation of optical source/modulator, even at high switching speeds, since individual transmitters are placed far apart on the optoelectronic chip. The yield of the electronic circuitry does not limit the system size, since no electrical communications between OPs are necessary.

The OPEs can therefore be implemented in a modular fashion on separate chips, which are then placed on a multi-chip carrier that can house several hundred such chips. Reference H. B. Bakoglu Circuits, *Interconnections and Packaging for VLSI*, Addison Wesley, 1990.

Finally, total optical power requirements indicate that a system with 10$^6$ detector sub-processing units, or leaf units, can be achieved.

4.6.2 Comparative Analysis

It is instructive to compare the scaling performance of the D-STOP architecture system to a fully electronic VLSI system. Area limitations are a major concern for wafer-scale integrated VLSI systems, since the yield of a chip rapidly decreases as $e^{-Ta}$ (assuming no defects can be tolerated), where A is the area of the chip and t is a constant). Reference I. Koren (ed.), *Defect and Fault Tolerance in VLSI Systems*, Plenum Press 1989.

On the other hand, multi-chip VLSI modules can be built with high reliability and low cost, but at the price of increased power dissipation and time delay due to the off-chip environment. For the D-STOP architecture of the present invention, note, as an extension of the previous statement regarding the lack of any requirement for electrical connectivity between OPs, that the yield of the electronic circuitry again does not limit the system size, since no electrical communications between the OPEs are necessary. When the OPEs are dedicated to performing functions used in neural networks as is shown by the unit labels within FIG. 12, this condition is sometimes expressed as an absence of a requirement to electrically communicate between neurons.

At the module level, the D-STOP system offers smaller delays than fully electronic multi-chip systems In a VLSI crossbar-type architecture, the delay of a network with N input channels is given by:

$$\tau = 2N\Delta T_{Module} \qquad [1]$$

where $\Delta T_{module}$ is the sum of the on-chip and inter-chip delays. Reference M. A. Franklin et. al., IEEE Trans. Computers, C-31, no. 11, pp. 1109, November 1982. In this case, the system delay grows linearly with the number of inputs (N).

Conversely, for the D-STOP architecture there are three terms in the delay equation: the speed-of light propagation delay between chips (negligible), the rise-time of the modulators (a constant), and the electronic delay due to the fan-in structure ($Log_2N$ stages). The delay can accordingly be written as:

$$\tau = Log_2 N \times \Delta T_{Chip} + \Delta T_{OP} \quad [2]$$

Due to the compact nature of the H-tree layout, the longest line grows as $\sqrt{N}$. Hence the second term ($\Delta T_{OP}$) in equation 4 grows as $\sqrt{N}$. Since the wire delay is approximately linear with line-length (for the line-lengths under consideration), this results in reduced delay for the optoelectronic system. Reference H. B. Bakoglu, infra.

The reduction in delay can also lead to larger system throughput for the D-STOP system. Many network models require the outputs of a layer to relax to a stable state (e.g. a layer of competitive neurons), before being propagated forward. In this case the ability to pipeline the system is reduced, and the throughput is proportional to the inverse of the network delay.

Power dissipation is another important issue. For multi-chip electronic systems, additional drivers and buffer circuits are needed for each chip to drive the pins and the off-chip interconnection lines. This increases the system delay and the power dissipation. This restriction is removed for the D-STOP architecture system, since no off-chip electronic lines are needed for signal propagation. The use of polarization-based modulators, such as PLZT modulators, is also crucial since the on-chip power dissipation is essentially independent of the fan-out. The system size is not limited by the power dissipation of the driver circuits of the transmitters, since individual transmitters are placed far apart on the optoelectronic chip.

A still further advantage of the D-STOP architecture system is its capability to accept parallel input of the neuron signals as well as memory matrices. For VLSI matrix-vector multipliers, the minimum time required to load new matrices onto the chip is $\Omega[N]$, if semi-parallel loading facilities (e.g. multiplexing signal pins for memory loading) are provided. For the optoelectronic system, the detector units can be modified to accept new memory as well as input data. High bandwidth parallel accessed optical memories that can store up to $10^8$ interconnections and provide fast, parallel-accessed storage for the synaptic matrices are currently being under active development. Reference P. Marchand, A. V. Krishnamoorthy, P. Ambs, and S. C. Esener, SPIE Proceedings 1347, pp. 86–97, 1990.

4.7 Applications of the D-STOP Architecture

Figure 15:
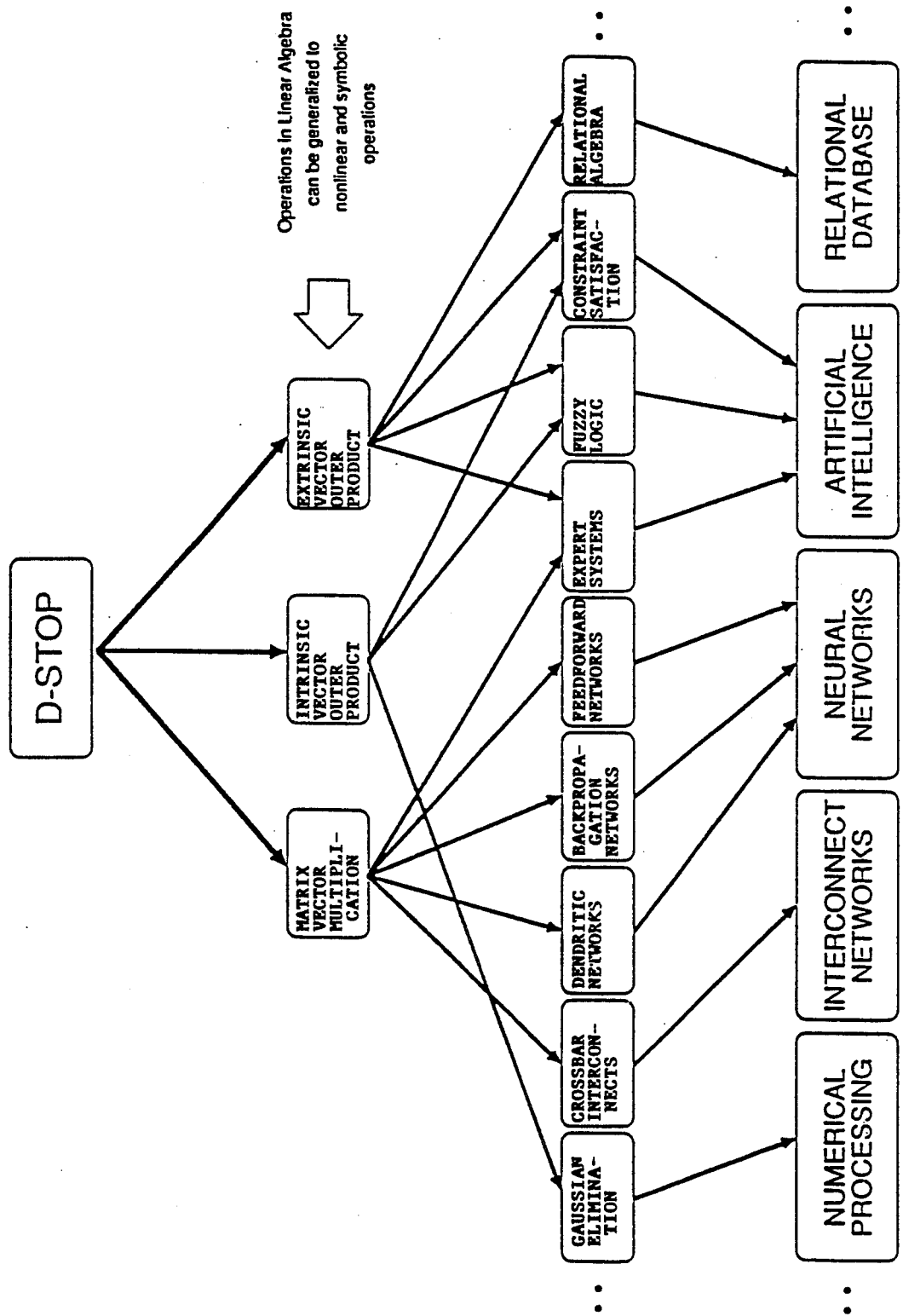
FIG. 15 is a chart showing a hierarchical range of applications to which the D-STOP architecture of the present invention may beneficially be applied.

The D-STOP architecture can be applied to many problems, as is illustrated in the chart of FIG. 15. For instance, the D-STOP architecture is well suited to implement a variety of neural network models (see the following section 4.5). At the other end of the complexity spectrum, and in a simpler form, the matrix-vector operation performed on the D-STOP architecture can be reduced to a crossbar interconnection.

Figure 16A:
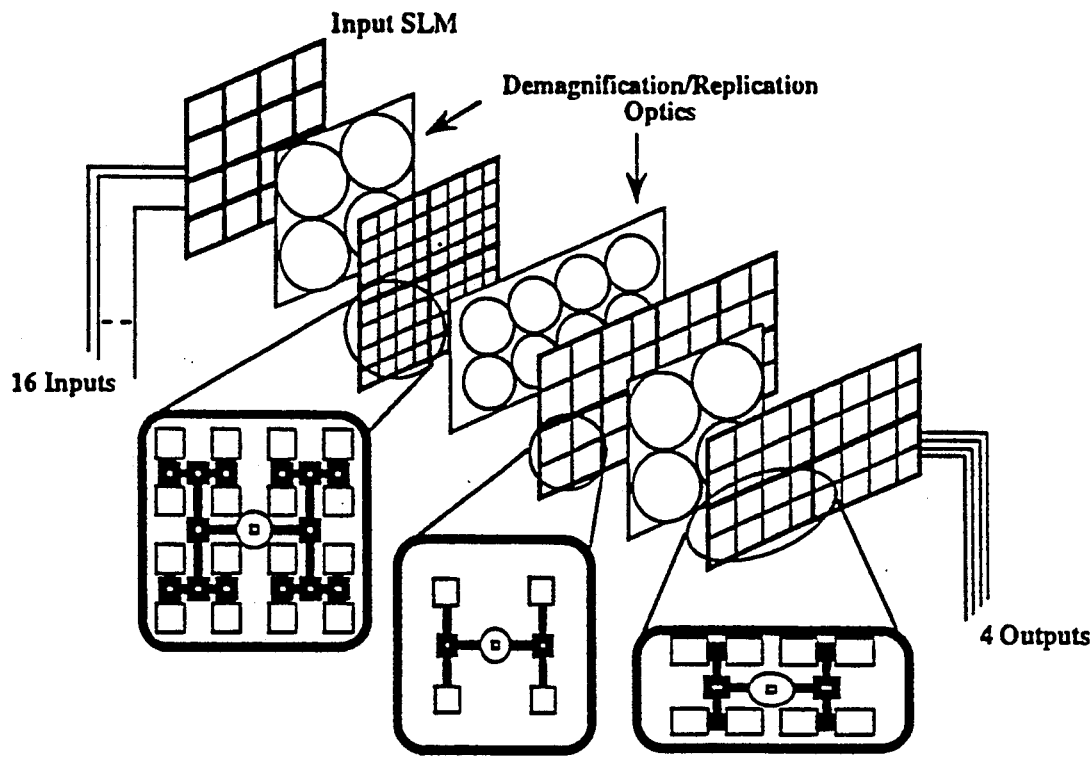
FIG. 16a is a diagrammatic representation of a multi-layered (3 layer) matrix algebraic processing system in accordance with the D-STOP architecture in which system a source vector is routed from input Spatial Light Modulators (SLMs) to a first plane of optoelectronic processors (OPs), and subsequent vector data is routed to successive planes of OPs, by action of demagnification and replication optics.

A diagrammatic representation of a arbitrary multi-layered (3 layer) matrix algebraic processing system in accordance with the D-STOP architecture is shown in FIG. 16a. In the illustrated system a source vector is routed from input Spatial Light Modulators (SLMs) to a first plane of optoelectronic processors (OPs), and subsequent vector data is routed to successive planes of OPs, by action of demagnification and replication optics.

Figure 16B:
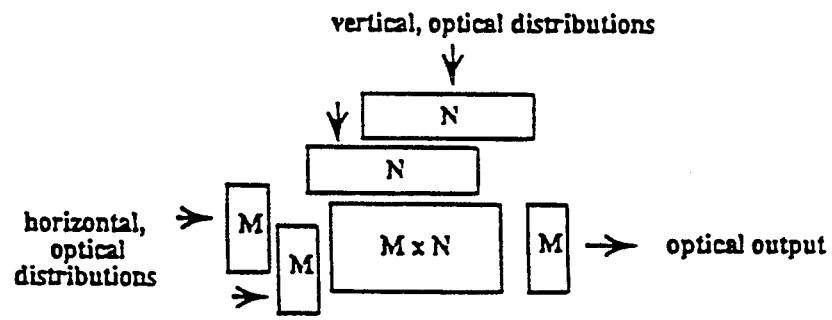
FIG. 16b is an abstract representation of a layer—containing optoelectronic processors holding an M row by N column matrix, and receiving vectors via each of plural vertical and horizontal optical distributions—of a matrix algebraic processing system in accordance with the D-STOP architecture

An abstract representational form of depicting one layer, which layer contains, by happenstance, one optoelectronic processor, in a D-STOP architecture system is shown in FIG. 16b. The layer shown contains a single optoelectronic processor holding an M row by N column matrix, and receiving vectors via each of plural vertical and horizontal optical distributions.

Figure 16C:
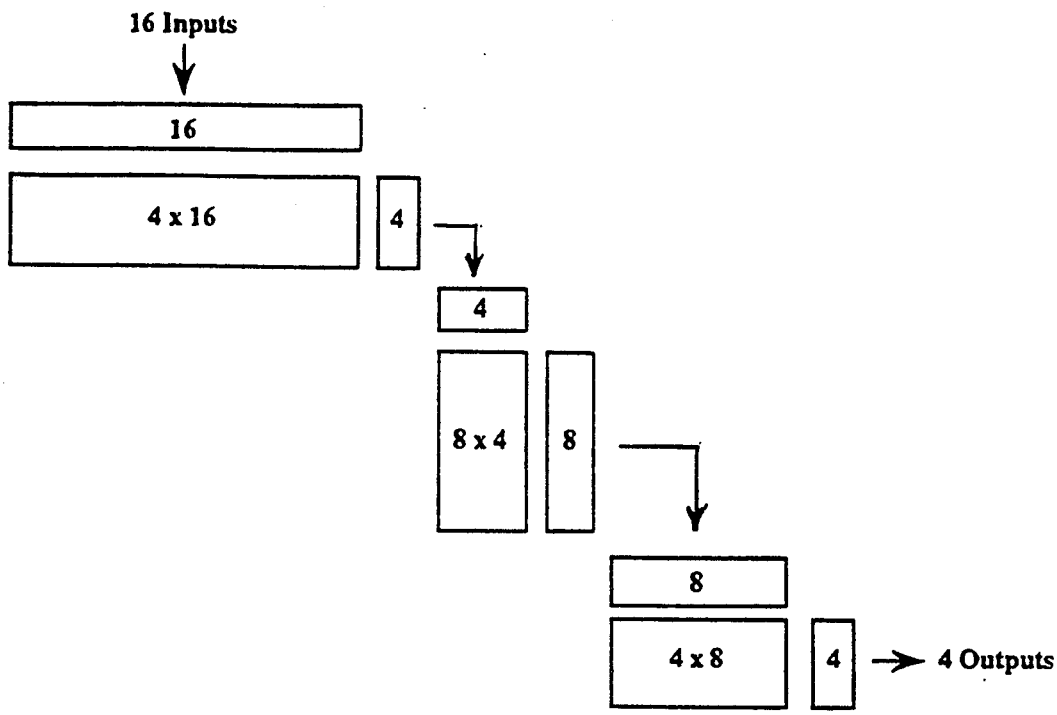
FIG. 16c is an abstract representation of the multi-layered matrix algebraic processing system of FIG. 16a in accordance with the abstract representation of FIG. 16b.

Another representation of the selfsame multi-layered matrix algebraic processing system previously seen in FIG. 16a in accordance with the abstract representational form of FIG. 16b is shown in FIG. 16c.

Figure 16D:
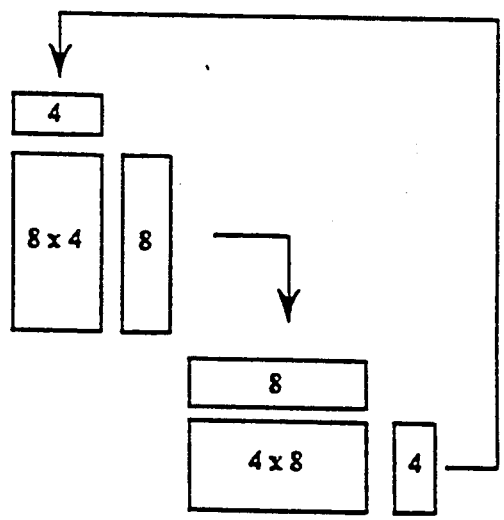
FIG. 16d is an abstract representation of a particular variant of that tandem-processor first embodiment of an optoelectronic matrix algebraic processing system in accordance with the present invention previously illustrated in general form in FIG. 7a, the FIG. 16d illustrating (i) feedback, and also (ii) that the M rows need not equal in number the N columns of a matrix that is processed by the system.

An abstract representation of a particular variant of that tandem-processor first embodiment of an optoelectronic matrix algebraic processing system in accordance with the present invention previously illustrated in general form in FIG. 7a is shown in FIG. 16d. Feedback, and the concept that the M rows need not equal in number the N columns of a matrix that is processed by the system, are both shown.

Figure 16E:
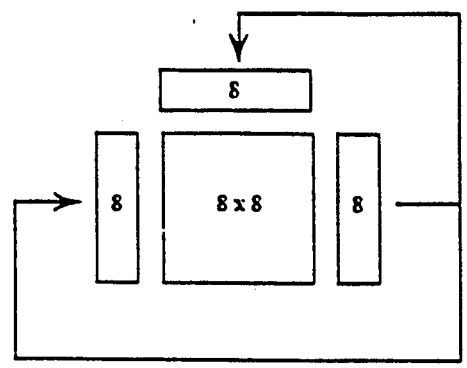
FIG. 16e is an abstract representation of a particular unitary-processor embodiment of an optoelectronic matrix algebraic processing system in accordance with the present invention, the resultant, or output, vector of the single OP optically feeding back as both a horizontal, and a vertical, vector input (in which case $M+N^2$ i.e., the matrix is square).

An abstract representation of a particular unitary-processor embodiment of an optoelectronic matrix algebraic processing system in accordance with the present invention is shown in FIG. 16e. A resultant, or output, vector of the single OP is optically feed back as both a horizontal, and a vertical, vector input (in which case $M+N$, i.e., the matrix is square). This is the unitary-processor embodiment of the present invention.

Figure 16F:
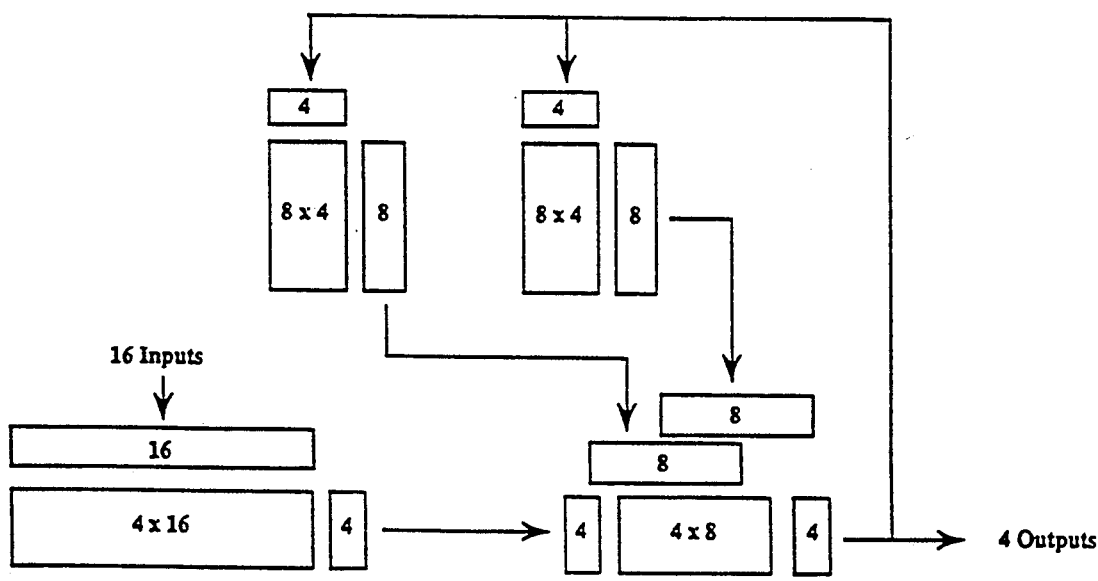
FIG. 16f is an abstract representation of a particular, contrived, embodiment of an optoelectronic matrix algebraic processing system in accordance with the present invention simply to illustrate that (i) an output vector of one may be used as the horizontal input of another, successor OP, (ii) an output vector of one may be used as the vertical input of another, successor OP, (iii) multiple vertical (and horizontal) vector distributions may be made to a single OP, and (iv) the vector result of one OP may be optically feed back as an input vector to a previous OP.

An abstract representation of a particular, highly contrived, embodiment of an optoelectronic matrix algebraic processing system in accordance with the present invention is shown in FIG. 16f. This contrived embodiment simply illustrates that (i) an output vector of one may be used as the horizontal input of another, successor OP, (ii) an output vector of one OP may be used as the vertical input of another, successor OP, (iii) multiple vertical (and horizontal) vector distributions may be made to a single OP, and (iv) the vector result of one OP may be optically feed back as an input vector to a previous OP.

According to the various systems shown in FIG. 16, it will be recognized that the optoelectronic processors in accordance with the present invention are configurable in many different row and column widths, and from many different optoelectronic processing elements. Additionally, the OPs, or layers (planes) of OPs, can be optically interconnected and cross-connected and even bidirectionally connected in many different manners. Accordingly, the D-STOP architecture of the present invention may be sized, and adapted, for optimal performance upon matrix algebraic problems of various sizes and natures. What is less obvious, but equally true, is that even set embodiments of a system in accordance with the D-STOP architecture are quite flexible, and readily adaptable to diverse tasks. The concept s analogous to computers where larger and faster computers can do certain tasks more speedily, but where even smaller computers can, given enough time and recursive computation, do the same tasks.

4.7.1 Generalized Matrix Algebra

The support of the D-STOP architecture for generalized functionality does no preclude that it should perform linear operations. Thus the D-STOP architecture can readily be applied to linear algebraic processing simply by choosing the appropriate electronics to guarantee a desired level of accuracy for a given class of problems. In particular, the intrinsic outer product can be used to perform Gaussian elimination, using an outer product of the pivot row and pivot column to determine, in parallel, the change in each matrix element's value. Reference R. A. Athale, infra.

The D-STOP architecture can also be configured to solve symbolic problems. One such important problem is the parallel implementation of the relational algebra, which is the core set of operations used in relational database systems. Relational database operations consist of comparisons between sets of records, and keeping, merging or modifying records which satisfy a particular criterion. Parallel processing offers the only practical solution to the increasing demand for faster retrieval and higher capacity. By directly implementing relational algebra on a parallel architecture, much of the hierarchy of the database operating system currently used can be eliminated. Reference S. Y. W. Su, Database Computers, McGraw Hill 1988. The relational algebra can be directly translated into generalized matrix algebraic operations, primarily using extrinsic outer products. Reference G. C. Marsden et. al., (to be presented at 1991 OSA Annual Meeting, San Jose, paper FBB4) .

The use of an optoelectronic architecture such as the D-STOP architecture permits efficient coupling to high speed optical storage devices, such as an optical disk with a motionless parallel readout head. A MOTIONLESS PARALLEL READOUT HEAD FOR AN OPTICAL DISK RECORDED WITH ONE-DIMENSIONAL HOLOGRAMS is the subject of co-pending U.S. patent application Ser. No. 07/785,742 filed Oct. 31, 1991, to Philippe J. Marchand, Pierre Ambs, Kristopher Urquhart, Sing Lee and the selfsame Ashok Krishnamoorthy and Sadik Esener who are inventors of the present application. Reference also P. Marchand, op cit.

Generalized intrinsic outer products can be used to accelerate the solution of constraint satisfaction problems in artificial intelligence through a highly parallel version of the consistent labeling. Reference both previous citations to G. C Marsden, et al. Constraint satisfaction problems usually require search through a large set of possibilities. Consistent labeling can greatly reduce the size of the search space by discovering new constraints implied by the originally stated constraints. Reference A. K. Mackworth, Artificial Intelligence 8, 99–118, 1977.

In the parallel algorithm, constraint satisfaction problems are represented by a 2-dimensional Boolean matrix called the relations matrix. Various levels of constraint propagation can be achieved through domain consistency (reference G. C. Marsden, et al., infra.), arc and path consistency (reference A. K. Mackworth, op cit.), or k-consistency (reference E. C. Freuder, Comm. ACM 21, 958–966, 1978). All of these constraints can be implemented on a parallel architecture capable of generalized intrinsic outer products.

4.7.2 Design and Analysis of a D-STOP Architecture Neural System

Key issues in determining the suitability of a particular technology for implementing a large scale neural network include (i) the required connectivity and (ii) the required precision in the synaptic connections. For large networks, theoretical and simulation results suggest that a synaptic precision of 6–8 bits and a neuron output precision of 6 bits during learning is necessary for low output error. Reference P. W. Hollis, J. S. Harper, and J. J. Paulos, Neural Computation 2, (3) , Fall 1990, pp. 363-373. Alternatively, a lower synaptic precision of 1-3 bits can be tolerated during operation, depending on the particular application and network type. Reference H. P. Graf and L. K. Jackel, IEEE Circuits and Devices, pp. 44–49, July 1989.

The connectivity issue is in addition to the storage/precision issue. For parallel-learning network implementations using iterative learning algorithms and local learning rules, the minimum connectivity required per neuron is bounded by the entropy of the problem being learned. Reference Y. S. Abu-Mostafa, Journal of Complexity 4, pp. 246–255, 1988. Full connectivity may, therefore, be required if the network architecture is to be general purpose and applicable to a variety of "hard" problems.

The functional requirements of a single layer of a feed-forward network (or an iteration step of a recurrent network) can be described in broad terms as a matrix-vector multiplication or inner-product. This consists of a distribution of the neuron outputs, a local operation at each synaptic element, and a global summation of the resultant synaptic outputs, followed by a non-linear squashing function.

All of these operations are readily implementable on the D-STOP architecture. The D-STOP architecture provides (i) full connectivity between neurons, (ii) flexible functionality of neurons and synapses, (iii) accurate electronic fan-in and (iv) biologically inspired dendritic-type fan-in processing.

4.7.2.1 Optimal Data Encoding Methods

A critical issue for an artificial neural network implementation is the method of data representation, which should be chosen to minimize the silicon area and on-chip power dissipation while providing the precision necessitated by the application in question.

Several potential data encoding methods for communication between electronic neuron modules have been suggested. Pulse-amplitude modulation (PAM) is suggested in J. J. Hopfield, Proc. Natl. Acad. Sci. U.S.A., 81, pp. 3088-3092, May 1984. Pulse frequency modulation (PFM) is suggested in A. F. Murray, IEEE Micro December 1989, pp. 64-74; and in D. Del Corso, F. Gregoretti, C. Pellegrini, L. Reyneri, Proc. of Workshop on Microelectronics for Neural Networks, Dortmund, June 1990. Finally, pulse width modulation (PWM) is suggested by A. F. Murray, infra and also by O. N. Mian and N. E. Cotter, Proc. of IJCNN, San Diego, pp. 599-609, July 1990.

4.7.2.2 Optical Neuron-to-Synapse Channel

For the optical neuron-to synapse channel, PAM schemes require high contrast ratio light modulators and optical interconnects with tightly controlled uniform losses in order to provide accurate analog intensity information. While electrically addressed light modulators with high contrast ratios are achievable, the inherent trade-off between the speed-of-operation and electro-optic efficiency as well as voltage incompatibility with VLSI imposes serious system constraints if PAM methods are used. Reference T. Y. Hsu, et al., Optical Engineering 5 (27) May, 1988.

Binary encoding schemes such as PFM and PWM demand the detection of only two light intensity levels and are more immune to parameter variations and system noise. Hence, they are more suitable for fast light modulators with lower contrast ratios such as flip-chip bonded Si/PLZT modulators where compatibility with VLSI dictates that low modulation voltages be used. Reference S. Esener, J. Wang, M. Title, T. Drabik, and S. H. Lee, Optical Engineering 5 (26) May 1987.

Figure 17B:
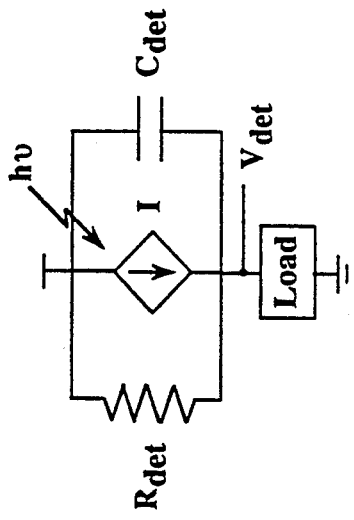
FIG. 17, consisting of FIGS. 17a through 17d, is a series of schematic diagrams respectively showing the equivalent electrical circuits of (a) a light modulator, (b) a light detector, (c) an analog light detector with a resistive load, and (d) a binary light detector with a capacitive load.
Figure 17D:
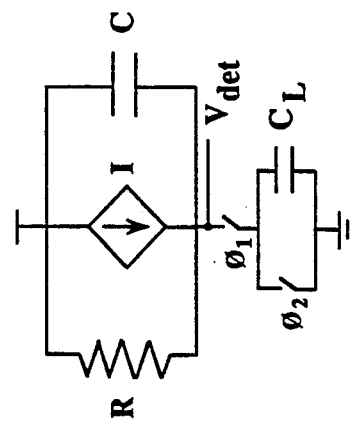
Figure 17A:
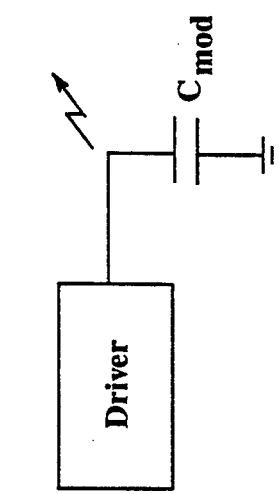

Another important consideration is the power consumption. In FIGS. 17a and 17b, the equivalent circuits of a light modulator (LM) and a light detector (LD) are shown: LD consists of a light-intensity controlled current source (or resistance) driving a load and LM consists of a circuit which drives the capacitance of an electro-optic material. Reference S. Esener, op cit.

Figure 17C:
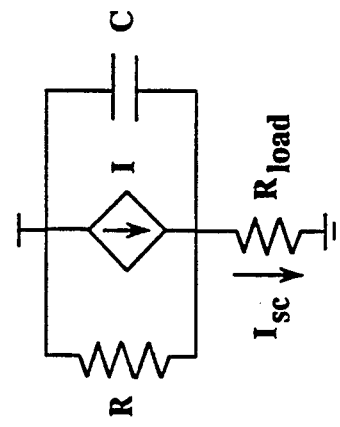

PAM methods require analog voltage states to be detected, which necessitates a linear resistive load, as shown in FIG. 17c. This results in static power consumption at the synapse level due to the short circuit current Isc. This DC current may be considerably high since large value VLSI resistors are difficult to implement without incurring inefficiencies in area (passive resistors), linearity (active resistors), or complexity (switched capacitor resistors).

These problems severely limit synaptic resolution and/or integration density. For example, using a 10 V supply voltage with a 100 K linear load resistor, the number of synapses that can be implemented on a square centimeter of silicon, using conventional air-cooling methods, is limited to a few thousand due to this static power dissipation alone. With PFM or PWM methods, the detected voltage VDET has binary values as stable states. In these cases, the driver circuitry can be designed as a simple CMOS buffer with negligible static power consumption. The detector circuit can be designed using a dynamic capacitance-based technique eliminating any static power dissipation (FIG. 17d).

Among the binary encoding methods, PFM methods require high speed modulators and generally result in higher dynamic power consumption than PWM methods since the modulator capacitance C MOD and the detector capacitance CDET must be charged and discharged at higher frequencies. For these reasons, a PWM encoding method is well suited for optical neuron to synapse communication.

4.7.2.3 Electronic Synapse-to-Neuron Channel

For the electronic synapse-to-neuron channel, a PAM method has several advantages. Available VLSI devices and circuit techniques can provide the required precision for PAM methods to be used with high integration densities. In contrast, the time resolution available at the synapse level is low due to area considerations. Reference A. F. Murray, IEEE Micro, December 1989, pp. 64–74.

Another issue is the linear dynamic range limitation. If the synapses modulate the received neuron output signal in its original dimension, a resolution or dynamic range problem may occur. This problem is alleviated if the synapses modulate the neuron signal in a different dimension (as is the case in biological neurons). This suggests that a PAM method for the synapse-to neuron communication in conjunction with a pulse-width modulating neuron can result in high precision, low area circuits. (See Section 4.5).

Both current (or charge packets) and voltage signals have been used in synapse to neuron communication. However, the summation and integration of current signals are easier than voltage signals: one electronic node is sufficient to sum the current signals and one capacitor is sufficient to integrate them. There is no pulse overlap problem as in the case of voltage summation. Reference A. F. Murray, D. Del Corso, and L. Tarasserko, IEEE Transactions on Neural Networks 2, pp. 193–204, March 1991.

Furthermore, the scheme using amplitude modulated current signals is inherently suited to the physics of the chip layout: the H-tree connecting the synapses of a neuron to its body has the same line length for each neuron and this line has a capacitance which naturally integrates the synaptic currents. In other words, the neuron capacitance can be implemented as an H-shaped capacitor automatically providing the necessary interconnection and reducing the area of the neuron body.

Figure 18A:
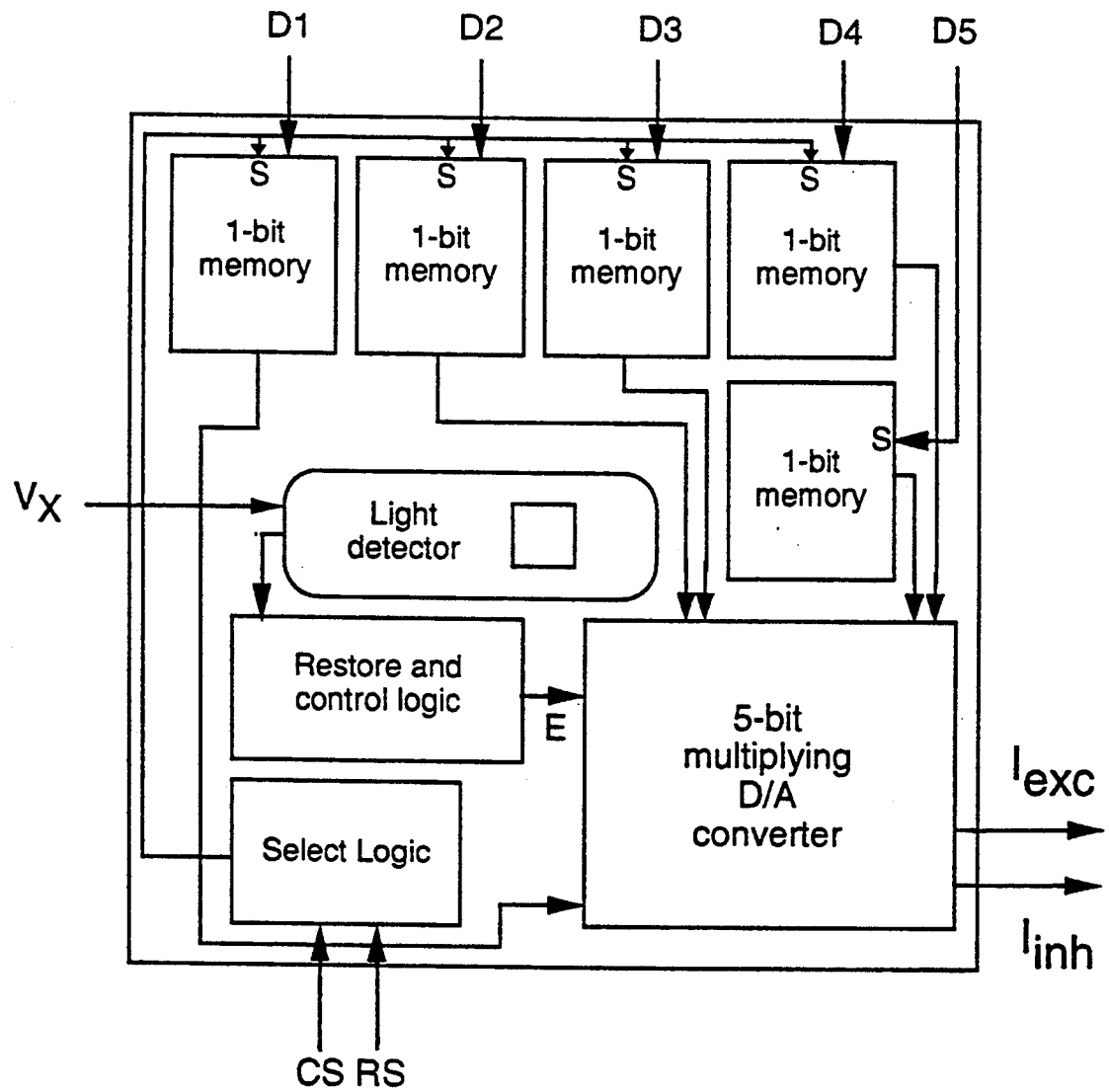
FIG. 18a is a diagrammatic representation of a leaf-node SYNAPSE UNIT replicated within each of the sixteen leaf units within each of the four H-tree-structured optoelectronic processing elements (OPEs) within the second embodiment of an optoelectronic processor (OP) previously diagrammatically represented in FIG. 9, and shown in use within a D-STOP architecture system in FIG. 12.
Figure 18B:
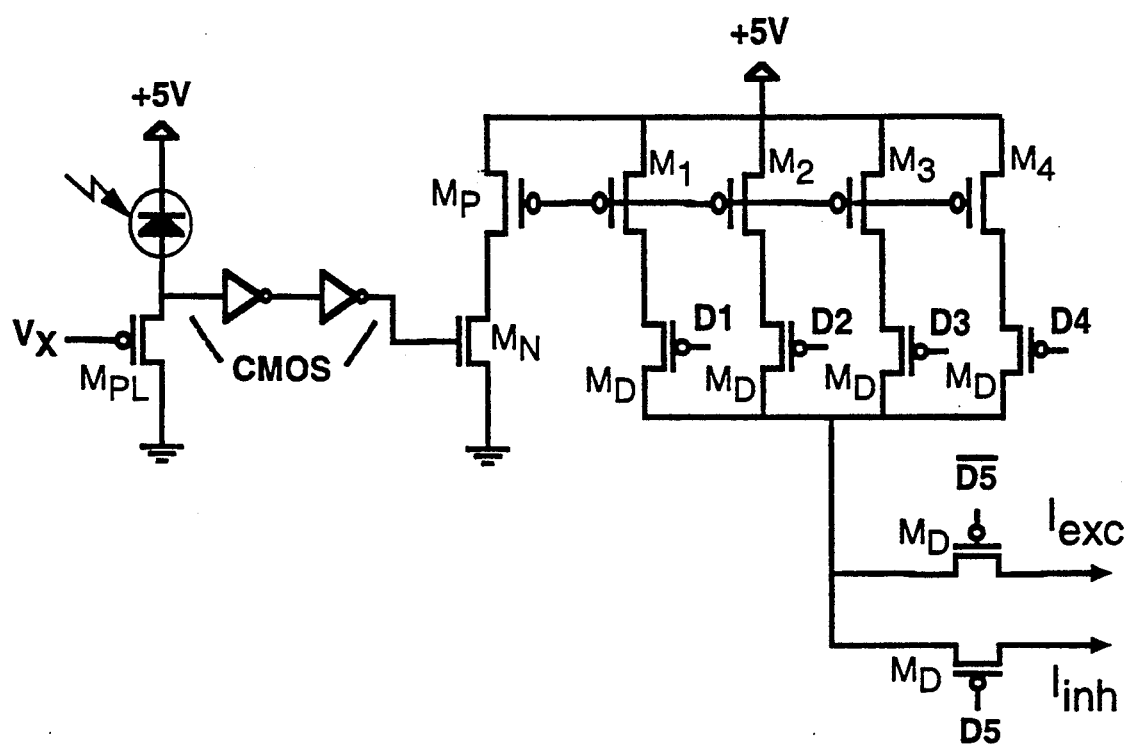

A diagrammatic representation of a leaf-node SYNAPSE UNIT which is replicated within each of the sixteen leaf units within each of the four H-tree-structured optoelectronic processing elements (OPEs) within the second embodiment of an optoelectronic processor (OP) which was previously diagrammatically represented in FIG. 9, and which was shown in use within a D-STOP architecture system in FIG. 12, is shown in FIG. 18a. The memories, logic circuitry and centrally-located light detector are clearly visible. A schematic diagram of the leaf-node SYNAPSE UNIT is shown in FIG. 18b. The photodetector active area is preferably approximately $15 \times 15$ $\mu m^2$. The width to length ratios of circuit features in $\mu m/\mu m$ are preferably as follows: $M_{PL}=3/10$; $M_N=\frac{1}{8}$; $M_P=9/4$; $M_1=4/26$; $M_2=4/13$; $M_3=4/9$; $M_4=5/5$; and $M_D=4/3$.

Figure 19A:
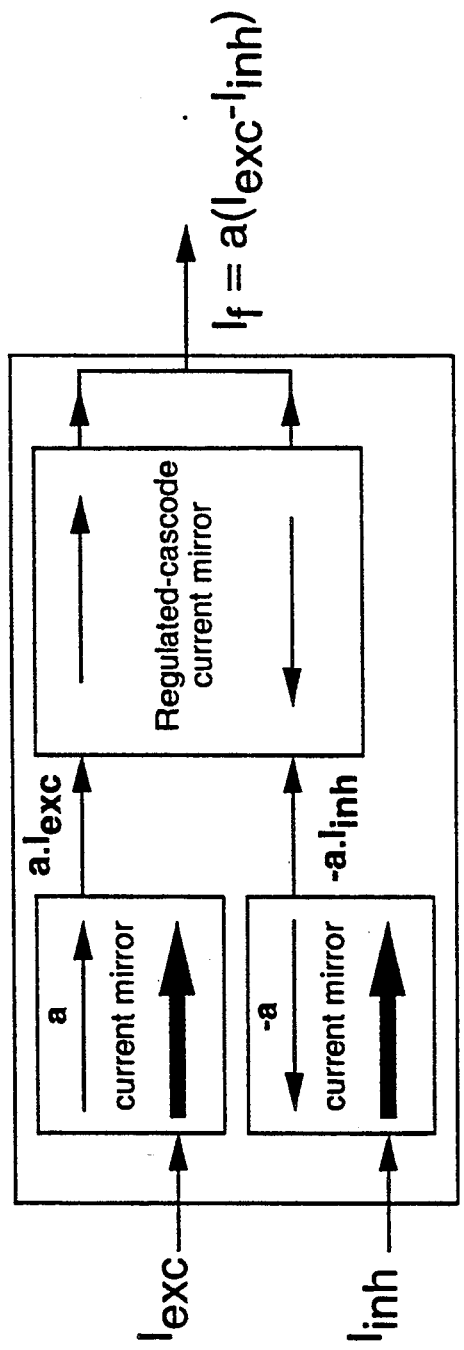
FIG. 19a is a diagrammatic representation of an intermediate node FANIN UNIT replicated fourteen times within each of the four H-tree-structured optoelectronic processing elements (OPEs) within the second embodiment of an optoelectronic processor (OP) previously diagrammatically represented in FIG. 9, and shown in use within a D-STOP architecture system in FIG. 12.
Figure 19B:
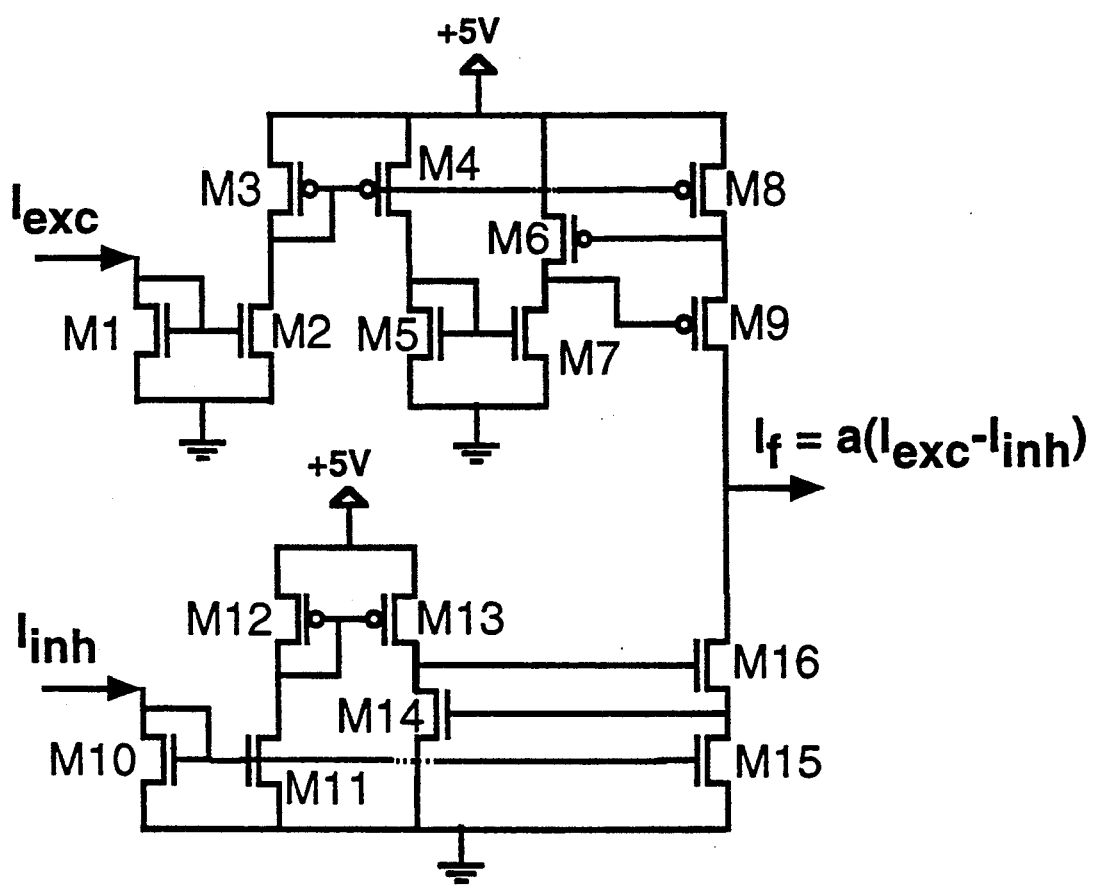

A diagrammatic representation of an intermediate node FANIN UNIT replicated fourteen times within each of the four H-tree-structured optoelectronic processing elements (OPEs) within the second embodiment of an optoelectronic processor (OP) previously diagrammatically represented in FIG. 9, and shown in use within a D-STOP architecture system in FIG. 12, is shown in FIG. 19a. A schematic diagram of the FANIN UNIT is shown in FIG. 19b. The width to length ratios of circuit features in $\mu m/\mu m$ are preferably as follows: $M_1=12/4$; $M_2=4/4$; $M_3=4/14$; $M_4=4/14$; $M_5=\frac{3}{8}$; $M_6\frac{3}{4}$; $M_3=\frac{3}{4}$; $M_7=\frac{3}{8}$; $M_8=3/10$; $M_9=5/2$; $M_{10}=12/4$; $M_{11}=4/4$; $M_{12}=4/14$; $M_{13}=4/14$; $M_{14}=4/4$; $M_{15}=4/4$; and $M_{16}=4/4$.

Figure 20A:
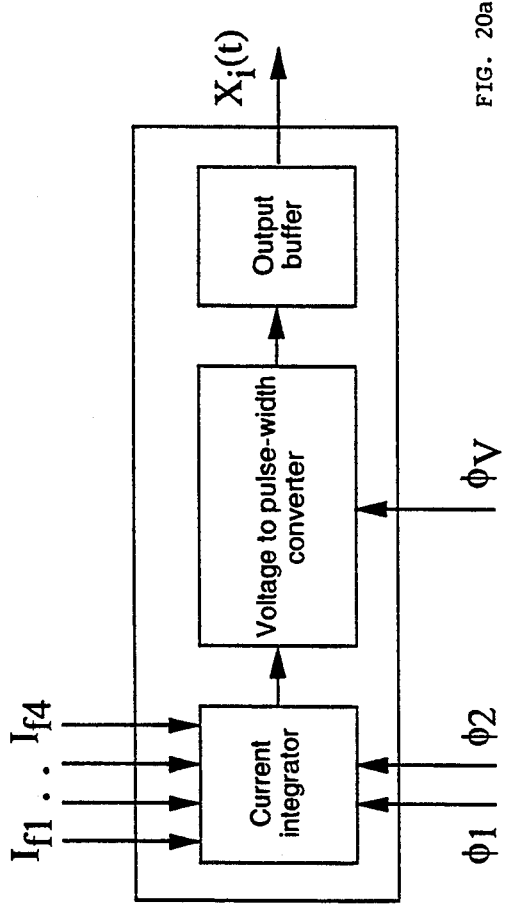
FIG. 20a is a diagrammatic representation of a root node SOMA UNIT replicated once within each of the four H-tree-structured optoelectronic processing elements (OPEs) within the second embodiment of an optoelectronic processor (OP) previously diagrammatically represented in FIG. 9, and shown in use within a D-STOP architecture system in FIG. 12.
Figure 20B:
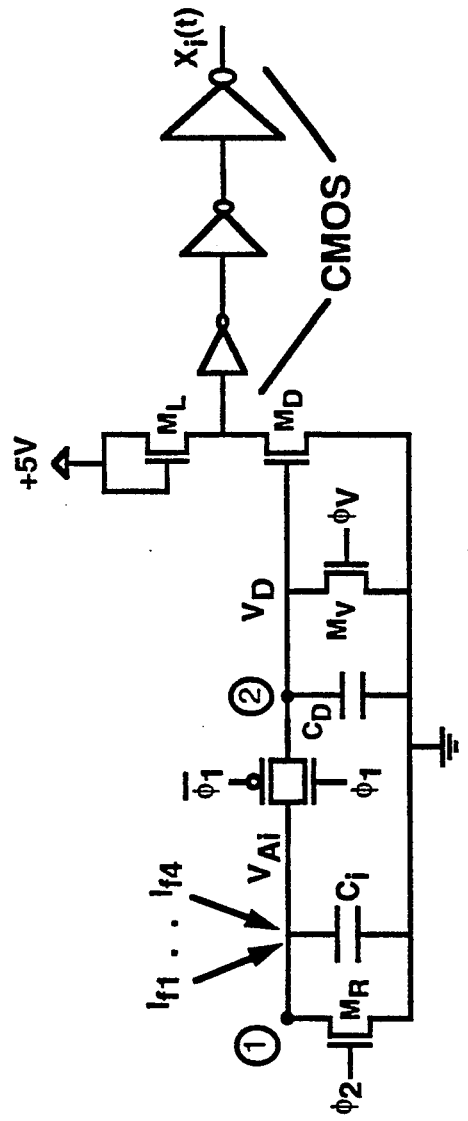

A diagrammatic representation of a root node SOMA UNIT replicated once within each of the four H-tree-structured optoelectronic processing elements (OPEs) within the second embodiment of an optoelectronic processor (OP) previously diagrammatically represented in FIG. 9, and shown in use within a D-STOP architecture system in FIG. 12, is shown in FIG. 20a. A schematic diagram of the SOMA UNIT is shown in FIG. 20b. The width to length ratios of circuit features in $\mu m/\mu m$ are preferably as follows: $M_V=2/40$; $M_R=8/2$; $M_L=2/20$; and $M_D=20/2$. The capacitor $C_i$ is preferably of value 4 pF, and the capacitor $C_D$ is preferably of value 0.3 pF.

A graph of the Neuron Output Pulse-Width versus the Integrated Input Activity Voltage ($V_{Ai}$) for Different $V_H$ Values realizable with the second embodiment of the optoelectronic processor (OP) previously diagrammatically represented in FIGS. 9, 17a, 19a and 20a, and previously shown in schematic diagram in FIGS. 18b, 19b and 20b, is shown in FIG. 21. The linearity (straightness) of the plotted function indicates that performance is as is desired.

Figure 22:
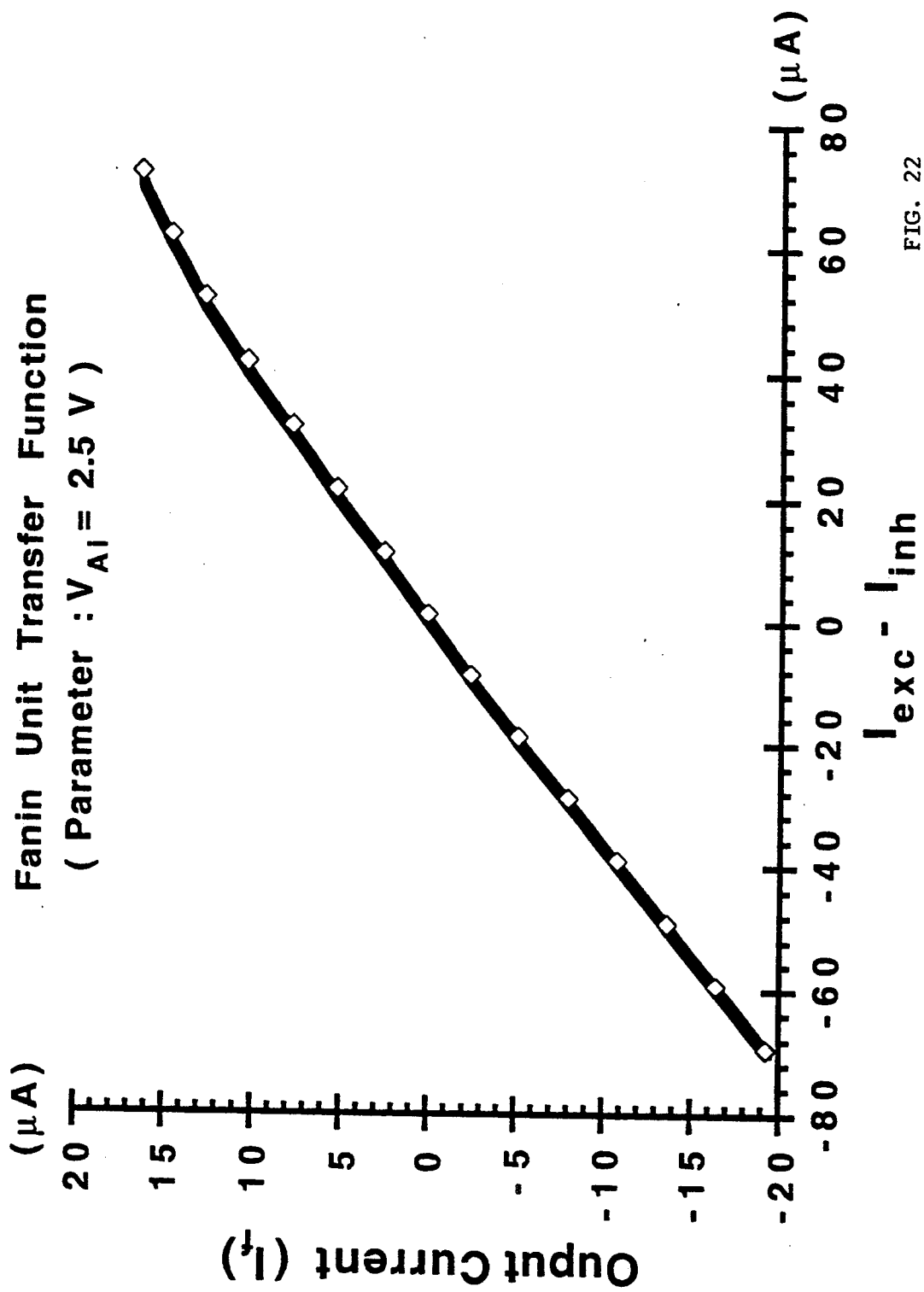
FIG. 22 is a graph of the Fanin Unit Transfer Function Neuron Output Pulse-Width versus the Integrated Input Activity Voltage ($V_{Ai}$) for Different $V_H$ Values realizable with the intermediate-node FANIN UNIT previously shown in FIGS. 19a and 19b as is used in the second embodiment of the optoelectronic processor (OP) previously diagrammatically represented in FIG. 9.

A graph of the Fanin Unit Transfer Function Neuron Output Pulse-Width versus the Integrated Input Activity Voltage ($V_{Ai}$) for Different $V_H$ Values realizable with the intermediate-node FANIN UNIT previously shown in FIGS. 19a and 19b as is used in the second embodiment of the optoelectronic processor (OP) previously diagrammatically represented in FIG. 9, is shown in FIG. 22.

Figure 23:
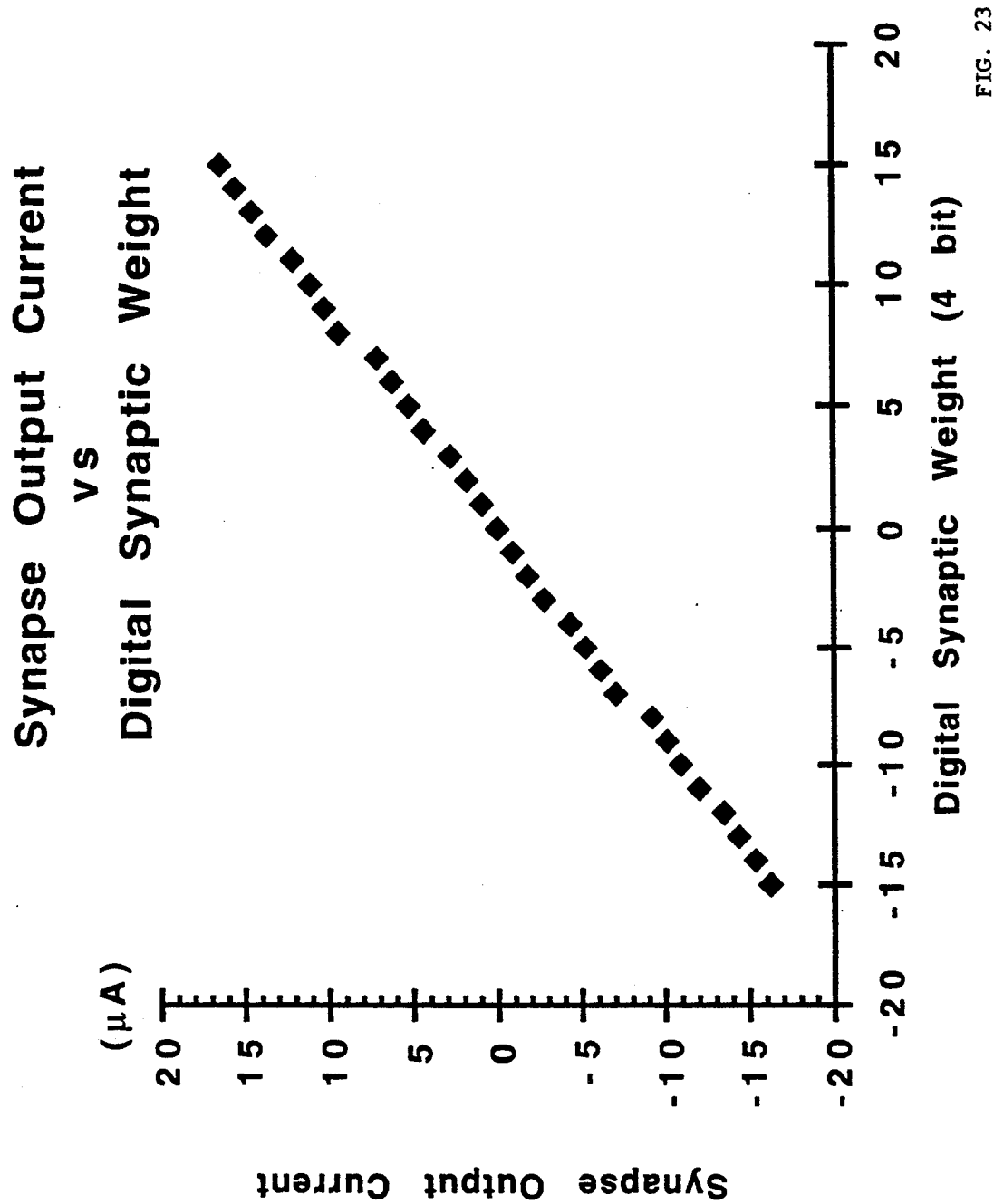
FIG. 23 is a graph of the synapse output current versus a four-bit digital synaptic weight realizable with the leaf-node SYNAPSE UNIT previously shown in FIGS. 18a and 18b as is used in the second embodiment of the optoelectronic processor (OP) previously diagrammatically represented in FIG. 9.

A graph of the synapse output current versus a four-bit digital synaptic weight realizable with the leaf-node SYNAPSE UNIT previously shown in FIGS. 18a and 18b as is used in the second embodiment of the optoelectronic processor (OP) previously diagrammatically represented in FIG. 9, is shown in FIG. 23. The linearity (straightness) of the plot indicates that the discrimination, or sensitivity, of the circuit is good, and that desirably distinct results are obtained for different input stimuli.

4.7.3 Use of a D-STOP Architecture Processing System in Fuzzy Inference—Part 1

It is often the case in reasoning problems that propositions are neither entirely true nor entirely false. In fuzzy logic, the truth values of propositions are not restricted to true or false, but may range from zero (absolutely false) to one (absolutely true). Reference G. J. Klir and T. A. Folger, *Fuzzy Sets, Uncertainty and Information*. Prentice Hall, (1988). Concepts and reasoning mechanisms from classical logic can be extended to fuzzy logic.

An important extension is the concept of a fuzzy subset. In classical set theory, an element is either a member of a subset or it is not a member of the subset. This can be stated as a Boolean valued membership function:

$$\mu_x(x) = 1 \times \epsilon X \quad [3]$$
$$= 0 \times \epsilon X$$

Figure 24:
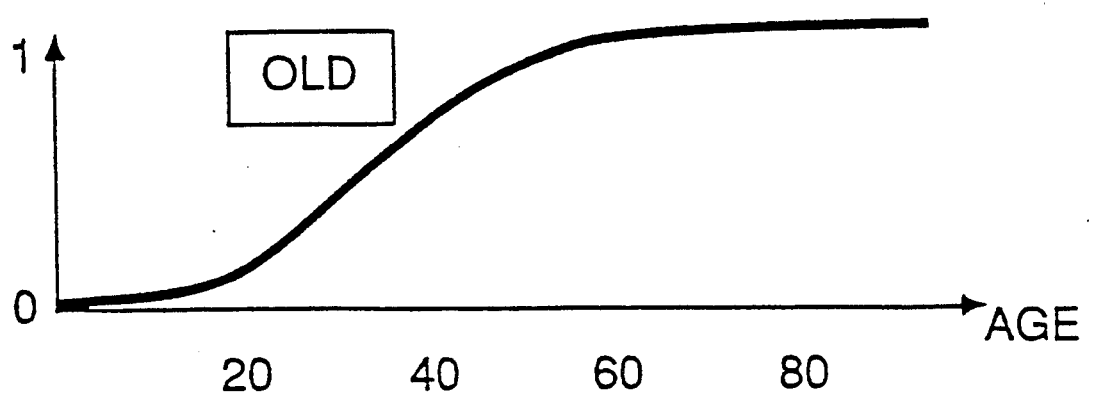
FIG. 24 is a graph showing that fuzzy subsets can be used to represent vague, uncertain or approximate information such as, for example, "X is old".

Fuzzy subsets allow varying degrees of membership. Thus, a membership function $\mu_x(x)$ can be defined with values between zero and one. Fuzzy subsets can be used to vague, uncertain or approximate reasoning information. For example, the fuzzy subset shown in FIG. 24 may represent the statement "X is old". FIG. 24 is a graph showing that fuzzy subsets can be used to represent vague, uncertain or approximate information such as, for example, "X is old".

Concepts such as set intersection, union and negation can also be extended to fuzzy subsets. In classical set theory, an element is a member of the intersection of two subsets, $X_1$ and $X_2$, if its membership functions equal one for both subsets. This can be stated as:

$$\mu_{X1 \cap X2}(x) = \mu_{X1}(x) \text{ AND } \mu_{X2}(x) \quad [4]$$

Similarly, the union can be defined as, $$\mu_{X1 \cap X2}(x) = \mu_{X1}(x) \text{ OR } \mu_{X2}(x) \quad [5]$$

In order to extend intersection and union to fuzzy subsets, functions analogous to AND and OR must be defined on fuzzy values. MIN and MAX have been shown to be useful extensions of AND and OR, respectively. Reference G. J. Klir, infra. The negation of a fuzzy subset is most often defined as:

$$\mu_{NOT\ X}(x) = 1 - \mu_X(x) \quad [6]$$

Inferences can be made from one subset to another through a relation, which is a subset of their Cartesian product. The relation represents the implication of elements of one subset, the consequent, from elements of another, the antecedent. In classical logic, the conditional rule of inference is stated as:

$$\mu_Y(y_i) = OR_{x_j \epsilon x}[\mu_R(y_i, x_j) \text{ AND } \mu_X(x_j)) \quad [7]$$

where $\mu_R$ is the relation, $\mu_X$ is the antecedent, and $\mu_Y$ is the consequent. If $\mu_R$, $\mu_X$ and $\mu_Y$ are allowed to be fuzzy subsets, the fuzzy conditional rule of inference can be defined as $$\mu_U(y_i) = MAX_{x_j \epsilon x} MIN[\mu_R(y_i, x_j), \mu_X(x_j)] \quad [8]$$

Reference L. Zadeh, Info. Sci. 8, 199 (1975).

If the fuzzy relation is interpreted as a matrix, with the antecedent and consequent interpreted as vectors, Equation 8 can be viewed as a generalized matrix vector multiplication, where MIN replaces multiplication and MAX replaces summation. Using appropriate electronic circuitry and encoding of fuzzy values, the D-STOP architecture can provide a parallel implementation of fuzzy inference. Reference G. C. Marsden, B. Olsen, S. C. Esener, and S. H. Lee, OSA Optical Computing Tech. Digest, 212 (1991), and in preparation for Applied Optics.

The relations matrix can be loaded from an external memory prior to the conditional inference. In the special case of fuzzy Modus Ponens inference, the relations matrix can be calculated in situ using a generalized extrinsic vector outer product.

In classical logic, Modus Ponens is the inference mechanism:

$$\begin{array}{c} X \text{ is } A \rightarrow Y \text{ is } B \\ \underline{X \text{ is } A} \\ Y \text{ is } B \end{array} \quad [9]$$

Fuzzy Modus Ponens allows a partial match of the antecedents to induce a partial inference of the consequent. Thus, fuzzy Modus Ponens can be stated as, $$\begin{array}{c} X \text{ is } A \rightarrow Y \text{ is } B \\ \underline{X \text{ is } A'} \\ Y \text{ is } B' \end{array} \quad [10]$$

In order to perform conditional inference, a relations matrix must be generated from the antecedent $\mu_A(x)$ and consequent $\mu_B(y)$ of the inference rule. At least fifteen different generating functions have been suggested. Reference M. Mizumoto and H.-J. Zimmermann, Fuzzy Sets and Systems 8, 253 (1982). However, in all cases the relations matrix elements are given by:

$$\mu_R(y_i, x_j) = f(\mu_B(y_i), \mu_A(x_j)) \quad [11]$$

where f is one of the generating functions. As an example, reference L. Zadeh, Info. Sci. 9, 43 (1975) where it sets forth:

$$f(\mu_B(y_i), \mu_A(x_j)) = MAX[MIN(\mu_B(y_i), \mu_A(x_j)), 1 - \mu_A(x_j)] \quad [12]$$

Equation 11 can be viewed as a generalized extrinsic vector outer product. Thus, the relations matrix can be generated within a D-STOP architecture system using a generalized extrinsic outer product between input vectors $\mu_A(x)$ and $\mu_B(y)$. Once the relations matrix is calculated, or in some cases concurrently, the conditional inference can be performed as a matrix vector multiplication with the input vector $\mu A'(x)$.

4.7.4 Use of a D-STOP Architecture Processing System in Fuzzy Inference—Part 2

The following three paragraphs of this section 4.9 are repetitious of the preceding section 4.8, but show the use of a different mathematical notation. Such a restatement is normal in mathematics where, as in other sciences, it is occasionally useful to have an idea repeated in an alternative guise in order that it may best be understood.

Therefore, and as previously stated, it is often the case in reasoning problems that propositions are neither entirely true nor entirely false. In fuzzy logic the truth values of propositions are not restricted to true or false, but rather may range between zero (absolutely false) and one (absolutely true), allowing a quantitative representation and evaluation of vague propositions. Reference G. J. Klir and T. A. Folger, *Fuzzy Sets, Uncertainty, and Information*, Prentice Hall, 1988; and H. J. Zimmermann, *Fuzzy Set Theory—And Its Applications*, Kluer-Nijhoff, 1985. For example, the proposition, "Marsden is a boring speaker" is neither totally true nor totally false, but might have a value 0.30. Many existing Boolean reasoning methods can be extended to include fuzzy truth values. However, since Boolean operators such as AND and OR are undefined on non-Boolean data, analogous fuzzy operators must be defined for these algorithms to be useful. It has been shown that MIN and MAX have desirable properties when used as extensions of AND and OR, respectively. Reference G. J. Klir, infra.

In this paper we are concerned with the parallel implementation of the logic function Modus Ponens. In Modus Ponens, a proposition $y_i$ is inferred to be true if both $x_j$ and $x_j \rightarrow y_i$ are true. For simplicity of discussion we shall assume that the value, $y_i$ is initially zero. Thus, the truth value for $y_i$ is given by, $$y_i = x_j \text{ AND } x_j \rightarrow y_i \quad [13]$$

With the appropriate substitutions of MIN for AND we can extend Modus Ponens to fuzzy logic, $$y_i = MIN[x_j, x_j \rightarrow y_i] \quad [14]$$

A parallel algorithm for Boolean Modus Ponens inference was developed for use on an optical matrix-vector multiplier with binary thresholding on the output vector. Reference H. J. Caulfield, "Optical Inference Machines," Optics Comm. SS (1985) pp. 259-260. In this algorithm, truth values are encoded as either zeros or ones. The matrix element $M_{ij}$ represents the truth value of the implication $X_j \rightarrow Y_i$. The product $M_{ij}*X_j$, which is equivalent to an AND, determines if $y_i$ is true due to implication from $x_j$. If the sum of these products over index j is greater than zero, that is, if at least one of the AND operations is true, then $y_i$ is implied from the input vector x. Boolean encoding is maintained by thresholding the output of the matrix-vector multiplication.

$$y_i = T(\Sigma_j M_{ij}*x_j) \quad [15]$$

The summation/threshold is equivalent to a global OR. Therefore the use of an optical matrix-vector multiplier allows many truth values, represented by the output vector y, to be inferred in parallel from the set of input values in the vector x. This algorithm can be extended to fuzzy inference by substituting MIN for the local (AND) multiplication and MAX for the global (OR) summation/threshold operation, with data ranging between [0,1]. That is, $$y_i = MAX_j[MIN[M_{ij}, X_j]] \quad [16]$$

For the Boolean Modus Ponens algorithm, a standard transmissive optical matrix-vector multiplier is sufficient. Unfortunately, the local MIN and global MAX operations of the fuzzy algorithm are difficult to implement with such architectures. Nonlinear optical components might offer a solution but would be subject to dynamic range and response time limitations. Optoelectronic architectures, on the other hand, offer both the desired parallelism, through optical communication, and functionality, through tailored electronic circuitry.

Figure 25:
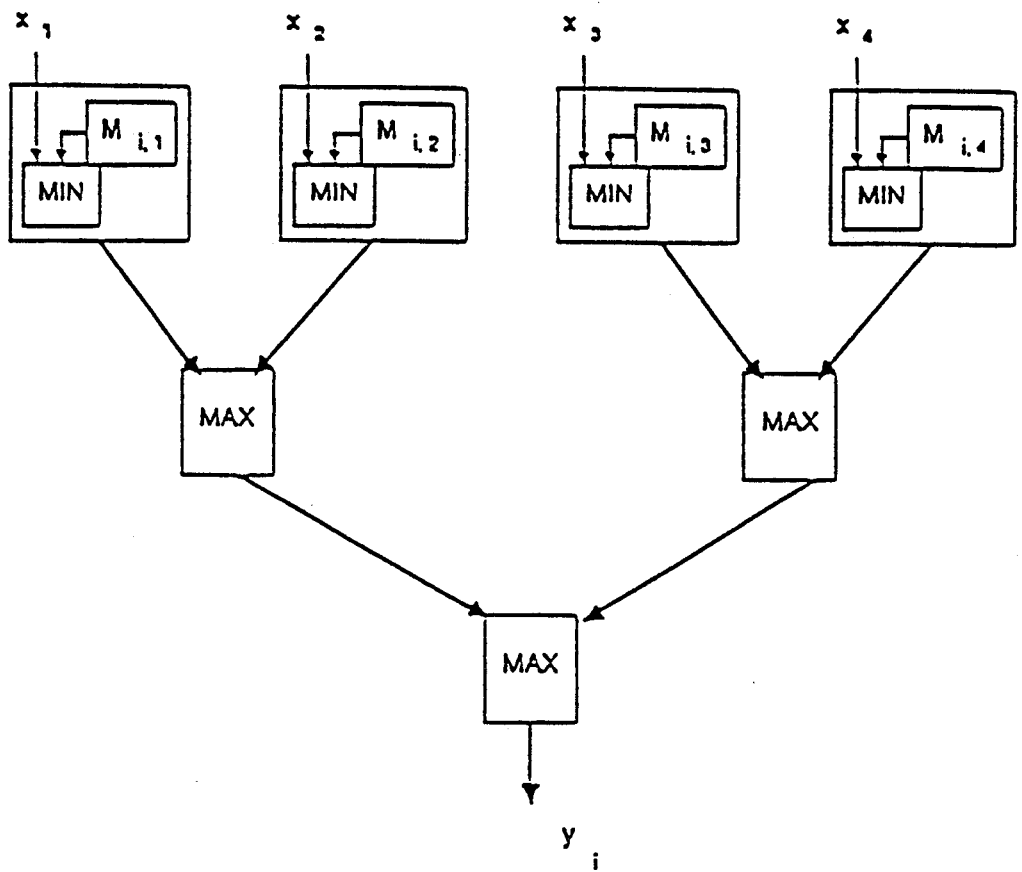
FIG. 25 is a functional diagram of a tree-structured processing element used to compute the ith element of the generalized matrix-vector product; a MIN operation being performed with locally-stored matrix elements in the first stage of the tree while the following stages collectively perform the global MAX operation.

An array of binary tree structures can be used to perform the necessary generalized matrix-vector multiplication. FIG. 25 shows an abstract model of one processing element (PE) in this architecture. Each PE is dedicated to one element of the output vector. Elements of the input vector are transmitted optically to the electronic leaf units of the tree. These leaf units have local memory, which store the appropriate matrix elements, and logic circuitry to perform the necessary MIN operation. The results are passed down the tree, where at each intermediate fan-in unit, a MAX operation is performed. It is easily seen that the necessary combination of local MIN and global MAX operations is performed.

Figure 26:
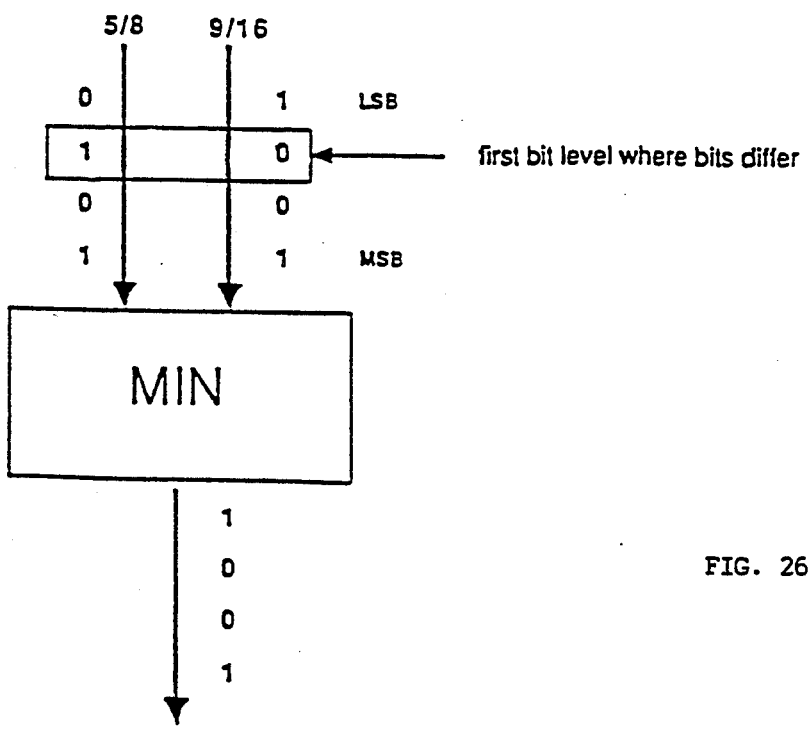
FIG. 26 is a functional diagram of the serial arrival of data, most significant bit (MSB) first, to each of the bit-serial fuzzy operators; the serial nature of the logic units permitting a fully pipelined system implementation.

Although the results of these operations must traverse $\log_2 N$ stages of fan-in units, the proper choice of data representation allows a fully pipelined system. Fuzzy values are transmitted serially, most-significant-bit first. FIG. 26 shows the operation of a MIN circuit. After reset, the circuit performs successive bitwise comparisons. As long as no difference is detected, the most significant bits which are common to both values are passed to the next stage of the tree. The smaller value has been determined, the circuit passes the remaining bits of this value to the next stage of the tree. MAX circuits operate in a similar fashion, passing the larger value. A significant advantage of this methodology is that the length of the digital fuzzy value can be set to any desired accuracy.

Figure 27:
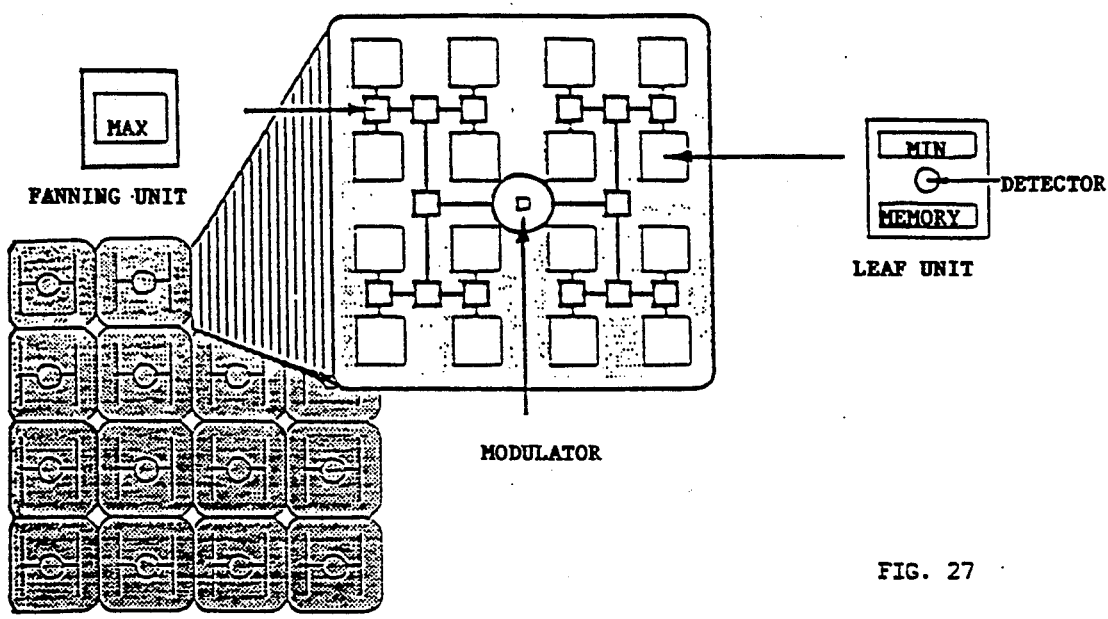
FIG. 27 is a diagrammatic illustration of the arrayed optoelectronic processing elements (OPEs) in accordance with the D-STOP architecture of the present invention in use to compute an entire generalized matrix-vector product; an enlarged region of the FIG. showing a detailed representation of a single OPE that computes a single element of the vector output; the area-efficient H-tree organization of the OPE being clearly shown.

The D-STOP architecture permits an efficient implementation of this binary tree structure. Reference G. C. Marsden, A. Krishnamoorthy, S. Esener, and S. H. Lee, "Dual-Scale Topology Optoelectronic Processor (D-STOP)," OSA 1990 Annual Meeting, Boston (1990). A system in accordance with the D-STOP architecture for performing fuzzy logic consists of an array of N processing elements (PEs). Each PE, as shown in FIG. 27, consists of N processing sub-units having detectors and local memory. These detector units, which correspond to the leaf units of the abstract architecture of FIG. 25, are connected by an H-tree interconnection. The fan-in units exist at intermediate nodes of the tree, as in the abstract model. The resulting output vector element is transmitted via an optical modulator.

Figure 28:
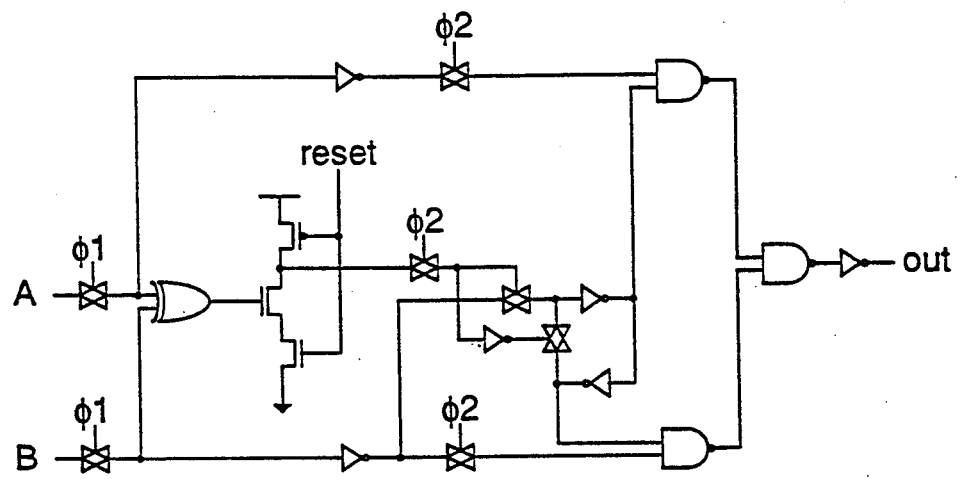
FIG. 28 is a schematic logic diagram of a bit-serial comparator used to perform the MIN operation; a MAX operation being obtained by inverting the inputs.

The MAX and MIN fuzzy operators in this system are implemented using bit serial comparators. A gate level description of the comparator used to realize the MAX operation is depicted in FIG. 28. It is easily adapted to perform the MIN operation by inverting the inputs. The bit serial comparator is compatible with the serial arrival of the data, and therefore additional latches and control circuitry are not needed. It is smaller in size than most comparators and in particular to a parallel comparator. This combined with the regularity of the individual processing elements makes the system well suited for VLSI implementation.

4.7.6 Consistent Labeling

Constraint satisfaction problems usually require a search through a large set of possibilities. Often, consistent labeling can greatly reduce the size of the search space. Reference A. K. Mackworth, "Consistency in Networks of Relations", Artificial Intelligence, Vol. 8, pp. 99–118, 1977. A highly parallel version of consistent labeling uses generalized intrinsic vector outer products together with matrix summation and intersection. Reference G. C. Marsden, F. Kiamiliev, S. Esener, S. H. Lee, "Highly Parallel Consistent Labeling Algorithm Suitable for Optoelectronic Implementation", Applied Optics, Vol. 30, No. 2, pp. 185–194, 1991. Thus, the D-STOP architecture is well suited to a parallel implementation of consistent labeling.

Constraint satisfaction problems can often be abstracted as a network with unary constraints associated to nodes and binary constraints associated to arcs between nodes. Unary constraint are encoded in the domain vector, defined as a boolean array with elements representing particular node labels. Binary constraint are encoded in the relations matrix. In the domain vector as well as in the relation matrix, the allowed values are encoded as ones while disallowed values are encoded as zeros.

Many levels of constraint propagation can be achieved using this encoding. The simplest, domain consistency, removes binary relations which are found to be inconsistent with the unary constraints. Reference G. C. Marsden, et al., infra. This can be achieved in parallel with a single outer product of the domain vector, with the resulting matrix intersected with the relations matrix. In an implementation of the D-STOP architecture, this intersection can be performed in parallel at the leaf sub-units with a simple AND operator. Arc consistency and path consistency can also be implemented using intrinsic outer products, each followed by a matrix summation or intersection. Reference E. C. Freuder, "Synthesizing Constraint Expressions", Communications of ACM, Vol. 21, pp. 958–966, 1978. In fact, vector outer product based algorithms can be used to achieve highly parallel implementations of any level of consistent labeling, described in general as k-consistency. Reference E. C. Frueder, id.

4.8 Integration, and Extension, of the Functionality of the D-STOP Architecture

Considerable versatility, and breadth of functional capabilities, results in systems constructed in accordance with the D-STOP architecture because of the permissible generality, and even (in some embodiments) the programmability, of the optoelectronics. Namely, each successive structure of (i) leaf, fanning, and root elements comprising an OPE, (ii) arrayed OPEs comprising an OP, (iii) arrayed OP's within a functional layer, and (iv) numbers of optically communicating functional layers (of arrayed OPs), may be, to some extent and in some manner, considered to be general purpose, and akin to the lower-to-higher-level functional sections of a general purpose digital electronic computer.

The reason that the expression of the D-STOP architecture of the present invention is called a "matrix algebraic processing system", instead of a "computer", is because the function performed, the "repertoire" of the system as it might well be called, is directed to manipulation of vectors and matrices much as a conventional computer is directed to the manipulation of scalars. Even the word "algebraic" in "matrix algebraic processing system" encompasses both arithmetic and logical functions. Indeed, the word includes functions like neural network thresholding operations and fuzzy logic that are not even contemplated as executable functions, or instructions, of existing computers.

It may initially be difficult to recognize the breath and scope of matrix algebraic processing permissibly transpiring within systems in accordance with the D-STOP architecture. This is because the functionality of the D-STOP architecture is taught within this specification by example, and the examples will likely seem relatively disparate—much as the operations of addition, multiplication and hardware square root might initially appear to be quite different manipulations when performed between and among the circuits of a the arithmetic section of a digital computer. In particular, a matrix algebraic processing system's operations of (i) vector-matrix multiplication, (ii) intrinsic vector outer product, (iii) extrinsic outer product, are discussed in this specification, as are system's applications of neural network manipulations, fuzzy inference, and relational databases.

Since the choice, and interconnection alignment, of the different resources of a D-STOP architecture processing system is somewhat different for each of these primitive functions, a natural tendency is to regard the architecture of present invention as simply being conveniently configurable to perform different matrix algebraic processing tasks. Although indisputably true, this is but a portion of the truth; it is akin to identifying those different paths and circuit elements of a digital computer which are used in different arithmetic operations to be separate and distinct expressions of an architecture for performing digital arithmetic. The opposite is, of course, the actual case: modern architectures for digital arithmetic permit multiple arithmetic and logical functions to be selectively performed on the same logic circuitry, variously enabled.

The detailed enablement, or control, of an integrated, multi-algebraic-function, matrix algebraic processing system is outside the scope of this specification, which teaches only the D-STOP system architecture and the use of such architecture in some common, and uncommon, matrix algebraic manipulation tasks. However, certain properties of the D-STOP architecture will suggest to a practitioner of the arts of electronic computer, and array processor, design that a general-purpose matrix algebraic processing system is realizable.

First, leaf, fanning and root electronic elements (within the optoelectronic processing elements (OPEs)) variously performing bit summations, multiplications, comparisons and the like may be easily constructed so each as to perform multiple operations. Control, and selection, of which operation(s) are to be electrically performed, and upon what times, requires the (i) origination and (ii) distribution of control signals. The (i) origination of a command control to enable the performance of, for example, the multiplication of a 1024 element vector by a 1024×1024 matrix, is similar to the decode of instructions within electrical computers. The (ii) distribution of control is typically optical, and may be by time-multiplexed usage of the flexible, typically multiple, optical data distributions or, alternatively and preferably, by dedicated optical control distributions. These control distributions are non-interfering, by the properties of intersecting light paths, with the data distributions. They may go intimately to any and all of the leaf, fanning, and root elements.

Second, the D-STOP architecture permits flexible data distribution to accompany flexible control. Each of three different data distributions—an optical vertical distribution, and optical horizontal distribution, and an electrical distribution—are typical. The single electrical distribution is more precisely called a "horizontal" electrical distribution. It is suitable for communicating, albeit slowly in comparison with the optical distributions, between all the (typically) leaf elements holding the data associated with a single row of a matrix. This "within-the-row" electrical communication falls far short of the full connectivity of an all-electronic electrically-connected matrix algebraic processor of the prior art. Namely, between-the-rows data communication is not enabled to transpire electrically. However, in a great tour de force, the D-STOP architecture permits between-the-rows data communication by a combination of a vertical optical distribution and a horizontal electrical distribution of a transposed matrix. Accordingly, all reasonable distributions of the data produced by the flexibly-controlled electronics are possible.

In aggregate, these characteristics of the D-STOP architecture would likely influence a designer of either electrical or optical matrix algebraic processors/processing systems to believe that a generalized, multi-purpose, multi-function optoelectronic matrix algebraic processing system could be constructed in accordance with the architecture. Such a system may not only be constructed, but reliably and relatively inexpensively so.

4.9 Summary, Conclusions and Future Extensions of the D-STOP Architecture

The Dual-Scale Topology Optoelectronic Processor (D-STOP) is a parallel optoelectronic architecture for generalized matrix algebraic processing. The architecture can be used, for example, for matrix-vector multiplication and two types of vector outer product. The ability of the architecture to permit generalized matrix algebraic operations permits that it may be applied to many problems in machine perception, including neural networks, fuzzy logic and consistent labeling. The D-STOP architecture provides the basic features for future work concerned with the mapping of learning algorithms for neural networks.

It should by now, be recognized that a generalized optoelectronic matrix algebraic processing system in accordance with the present invention for operating on external data vectors is based on (i) optoelectronic processors, and (ii) optical distributions. A number L of optoelectronic processor $OP_k$ where k equals 1 though L, each include a number $M_k$ arrayed optoelectronic processing elements $OPE_m$, m equals 1 through $M_k$. Each optoelectronic processing element $OPE_k$ itself includes, and electrically connects in a tree structure, $N_k$ leaf units $LU_n$, n equals 1 to $N_k$. Each leaf unit $LU_n$ includes an electrically-connected (i) plurality of light detectors, (ii) local memory, (iii) logic circuitry, and (iv) an electrical input/output. Each leaf unit LU is electrically connected in a tree-based electrical connection to a root node unit. The root nod unit includes an electrically-connected local memory, logic circuitry, electrical input/output, and optical transmitter. The optoelectronic processing element $OPE_k$ supports an electrical distribution of data via its tree structure between the plurality of leaf units and the root unit.

The generalized optoelectronic matrix algebraic processing system in accordance with the present invention further includes a number of vertical optical distributions $VOD_v$, v equals 1 though V. Each vertical optical distribution $VOD_v$ is for the purpose of distributing a data vector transmitted from an associated optoelectronic processor $OP_{r(v)}$ to an associated optoelectronic processor $OP_{r(v)}$. During this distribution the data vector portion transmitted by the optoelectronic processing element $OPE_i$ of the transmitting optoelectronic processor $OP_{r(v)}$ is received by one of the plurality of light detectors within the leaf unit $TU_i$ within each optoelectronic processing element $OPE_m$, m equals 1 though $M_{r(v)}$, within the receiving optoelectronic processor $OP_{r(v)}$. Importantly, there is a restriction that $M_{r(v)}$ equals $N_{r(v)}$.

Finally, the generalized optoelectronic matrix algebraic processing system in accordance with the present invention additionally includes a number of horizontal optical distributions $HOD_h$, h equals 1 though H, each for the purpose of distributing a data vector transmitted from an associated optoelectronic processor $OP_{r(h)}$ to an associated optoelectronic processor $OP_{r(h)}$. In the horizontal optical distribution the data vector portion transmitted by the optoelectronic processing element OPE: of the transmitting optoelectronic processor $OP_{r(h)}$ is received by one of the plurality optoelectronic processing element $OPE_j$, within the receiving optoelectronic processor $OP_{r(h)}$. Importantly, there is a restriction that $M_{r(h)}$ equals $N_{r(h)}$.

Within a generalized matrix algebraic processing system so constructed local computation is performable at each processing element's leaf units on (i) data received via any of the optical distributions and the electrical distribution, and (ii) data from the leaf unit's local memory. During a fan-in of the external data vector a computation, distributed among leaf units and the root unit, is performed within each processing element during passage of the data from the leaf units to the root unit. Finally, computation on data vectors received through optical distributions produces a result at the root unit.

This computational result is transmittable from the root unit's optical transmitter as an optical output. Accordingly, the optoelectronic processing system is capable of performing matrix vector arithmetic and symbolic—i.e., algebraic—manipulations.

Within systems in accordance with the D-STOP architecture, computations are performed electronically, allowing multiplication and summation concepts in linear algebra to be generalized to other operations. The hardware architecture provides the ability to perform operations during the summation or fan-in process. This generalization is what permits the application of D-STOP architecture to many computational problems.

The D-STOP architecture uses the minimum number of light transmitters, thereby reducing fabrication requirements, while maintaining area efficient electronics. There is negligible timing skew between signals, which facilitates pipelined operations.

An optical system in accordance with the D-STOP architecture is also compact, since the required optical interconnections are space-invariant. A matrix algebraic processing system in accordance with the D-STOP architecture outperforms fully electronic modules in terms of delay, area, and power dissipation. For neural system implementations, low area, high linear dynamic range analog synapse and neuron circuits have been designed that are compatible with on-chip learning. Using state-of-the-art VLSI and optoelectronic technologies, a system with greater than 1,000 fully connected processing elements can be achieved in the near term. For neural network systems, this corresponds to capacities of $10^6-10^8$ interconnects, and processing speeds of $10^{12}$ interconnects/second.

Therefore, in accordance with these and other variations in structure and in application, the present invention should be interpreted in accordance with the following claims, only, and not solely in accordance with those particular embodiments within which the present invention has been taught.

What is claimed is:

1. An optoelectronic processing system comprising:
    a plurality of optoelectronic processors each having
        multiple pluralities of light detector means each of which pluralities is two-dimensionally arrayed in a first pattern, each plurality of light detector means for receiving optically-encoded input data
        electrical circuit means for manipulating the received input data to produce result data, and
        a plurality of light transmitters two-dimensionally arrayed in a second pattern for transmitting the result data as optically-encoded light; and
    a plurality of processor-to-processor optical distribution means functionally interleaved between the plurality of optoelectronic processors, each simultaneously operative
        for optically distributing in a third dimension the result data from the two-dimensionally second-arrayed plurality of light transmitters within a one processor to multiple two-dimensionally first-arrayed pluralities of light detectors within a next successive one of the plurality of optoelectronic processors;
    wherein manipulation of optically-encoded input data transpires electrically within a processor while distribution of the result data by the plurality of processor-to-processor optical distribution means transpires optically.

2. The optoelectronic processing system according to claim 1 wherein each of the plurality of processor-to-processor optical distribution means is optically distributing the result data in parallel from the plurality of light transmitters within the one processor to each of the multiple pluralities of light detectors within the next successive one of the plurality of processors wherein optical distribution of the result vector is in parallel.

3. The optoelectronic matrix algebraic processing system according to claim 1
    wherein the first pattern of each of the multiple arrayed pluralities of light detectors in one processor is geometrically similar to the second pattern of the plurality of light transmitters within a preceding one of the plurality of processors;
    wherein each of the plurality of processors-to-processor optical distribution means is optically distributing the result data in parallel from each of the pluralities of light transmitters, arrayed in the second pattern, of one processor to each of the multiple pluralities of light detectors, arrayed in a geometrically similar first pattern, of a next successive one of the plurality of processors.

4. The optoelectronic processing system according to claim 1 wherein each of the plurality of processor-to-processor optical distribution means comprises:
    space-invariant optics.

5. The optoelectronic processing system according to claim 4 wherein one of the plurality of space-invariant optics comprises:

demagnification means for reducing the size of the optically-encoded result data; and
    replication means for replicating the reduced-sized optically-encoded result data and distributing the replicated result data in parallel to the multiple pluralities of light detectors of a next successive one of the plurality of processors.

6. The optoelectronic matrix algebraic processing system according to claim 5 wherein the demagnification means comprises:
    a lens;
    and wherein the replication means comprises:
    a hologram.

7. The optoelectronic processing system according to claim 4 wherein one of the plurality of space-invariant optics comprises:
    replication means for replicating the optically-encoded result data and distributing the replicated result data in parallel to the multiple pluralities of light detectors of a next successive one of the plurality of processors.

8. The optoelectronic matrix algebraic processing system according to claim 7 wherein the replication means comprises:
    lenslets.

9. The optoelectronic matrix algebraic processing system according to claim 7 wherein the replication means comprises:
    lenslets.

10. An optoelectronic matrix algebraic processing system comprising:
    an optoelectronic processor means
        for receiving, in each of multiple two-dimensionally arrayed pluralities of light detectors an optically-encoded input data vector,
        for storing in a local memory a data matrix,
        for electrically algebraically manipulating in electrical circuitry the received input data vector in consideration of the stored data matrix to produce a result vector, and
        for transmitting, in a plurality of two-dimensionally arrayed light transmitters, the result vector as optically-encoded light; and
    an optical distribution means
        for optically distributing the result data vector from the plurality of light transmitters to each of the multiple arrayed pluralities of light detectors of the processor means as the input data vector;
    wherein a recycling of the output vector by the optical distribution means back to the processor means as the input vector permits recursive electronic algebraic manipulation of the input vector by the processor means. processor means as the input data vector;

11. The optoelectronic matrix algebraic processing system according to claim 10 wherein the optical distribution means comprises:
    space-invariant optics.

12. The optoelectronic matrix algebraic processing system according to claim 11 wherein the space-invariant optics comprises:
    demagnification means for reducing the size of the optically-encoded result data vector; and
    replication means for replicating the reduced-sized optically-encoded result data vector and distributing the replicated result vector in parallel back to the processor means as the inout vector.

13. The optoelectronic matrix algebraic processing system according to claim 12 wherein the demagnification means comprises:
a lens;
and wherein the replication means comprises:
a hologram.

14. The optoelectronic matrix algebraic processing system according to claim 11 wherein the space-invariant optics comprises:
replication means for replicating the reduced-sized optically-encoded result data vector and distributing the replicated result vector in parallel back to the processor means as the input vector.

15. An optoelectronic method of matrix algebraic processing comprising:
storing one or more data matrices in local memories of each of a plurality of optoelectronic processors,
receiving one or more optically-encoded input data vectors in each of multiple arrayed pluralities of light detectors that are within each of the optoelectronic processors,
electrically algebraically manipulating in electrical circuitry within each optoelectronic processor the one or more input data vectors received at that optoelectronic processor in consideration of the one or more data matrices stored at that optoelectronic processor so as to produce at least one result vector,
transmitting the at least one result vector off each optoelectronic processor as optically-encoded light; and
optically distributing, in each of a plurality of processor-to-processor optical distribution means that are functionally interleaved between the plurality of optoelectronic processors, the result data vector of a one processor to the multiple arrayed pluralities of light detectors of one or more of the processors;
wherein algebraic manipulations producing the result vector are performed electrically while communication of the result vector is performed optically;
wherein there is a distribution of each result data vector arising at one processor to one or more processors.

16. The optoelectronic method of matrix algebraic processing according to claim 15 wherein the optically distributing is space-invariant.

17. The optoelectronic method of matrix algebraic processing according to claim 15
wherein the optical distributing of one optical distribution means communicates the result data vector in a feedback loop back to the same optoelectronic processor from which it arose;
therein to permit recursive performance said same optoelectronic processor of the electrical algebraic manipulating.

18. The optoelectronic method of matrix algebraic processing according to claim 15
wherein the optical distributing of one optical distribution means communicates the result data vector from one processor to a next processor as a first receipt by the next processor of the result vector;
therein to successive performance in successive optoelectronic processors of the electrical algebraic manipulating.

19. The optoelectronic method of matrix algebraic processing according to claim 15
wherein the optically distributing of one of the optical distribution means communicates the result data vector from one processor to a plurality of processors.

20. The optoelectronic method of matrix algebraic processing according to claim 15
wherein the optically distributing of a plurality of the optical distribution means communicates the result data vector from a plurality of processors to one processor.

21. The optoelectronic method of matrix algebraic processing according to claim 15 further comprising:
optically receiving at an optoelectronic processor the one or more data matrices via multiple arrayed pluralities of light detectors that are within the optoelectronic processors; and
storing the optically-received data matrices in the local memories of the receiving optoelectronic processor.

22. The optoelectronic method of matrix algebraic processing according to claim 15 further comprising:
electrically receiving at an optoelectronic processor the one or more data matrices; and
storing the electrically-received data matrices in the local memories of the receiving optoelectronic processor.

23. A optically-mapping light-communicating optoelectronic vector-matrix algebraic processing system for algebraically manipulating a received source vector stepwise in accordance with each of a plurality of stored matrices to produce a result vector, the vector-matrix algebraic processing system comprising:
a plurality of optoelectronic processors each having a plurality of optoelectronic processing elements, each optoelectronic processing element having
a plurality of light detector means, collectively for receiving one or more optically-encoded input data vectors,
local memory means for storing a portion of one or more data matrices,
electrical computational means for electrically performing an algebraic operation on the input vector data received by the plurality of light detector means in consideration of the portion of the matrix data stored within the local memory means to produce a portion of a result data vector, and
a light transmitting means for transmitting the result data vector portion as a portion of an optically-encoded output data vector,
wherein the local memory means of all the plurality of optoelectronic processing elements of an optoelectronic processor collectively store at least one complete data matrix,
wherein the collective electrical computational means of all the plurality of optoelectronic processing elements of an optoelectronic processor collectively produce at least one complete result data vector, and
wherein the collective light transmitting means of all the plurality of optoelectronic processing elements collectively transmit at least one complete optically-encoded output data vector;
a source data vector distribution means for distributing at least one optically-encoded source data vector to the plurality of light detectors of at least one of the optoelectronic processing elements of at least one of the plurality of processors for use therein as an optically-encoded input data vector; and a plurality of processor-to-processor optical distribution means, each
for distributing an optically-encoded output data vector of an optoelectronic processor to a plurality of light detectors within a plurality of optoelectronic processing elements of a next one of the plurality of optoelectronic processors for use therein as an input data vector,
wherein a result vector of a one optoelectronic processor is optically received as an input vector by one or more next optoelectronic processors, and so on, one processor to the next;
wherein each optoelectronic processor stepwise in turn electrically performs an algebraic operation on a received vector so that, ultimately, a final optically-encoded result vector is produced by successive algebraic manipulations of an original, source, vector in accordance with those matrices that are held within the local memories of the plurality of optoelectronic processing elements of each of the plurality of optoelectronic processors.

24. The optically-mapping optoelectronic vector-matrix algebraic processing system according to claim 23
wherein the plurality of light detector means of each of the optoelectronic processing elements of each of the optoelectronic processors are arrayed in a pattern associated with each such plurality of optoelectronic processing elements; and
wherein the optoelectronic processing elements of each of the optoelectronic processors are arrayed in a pattern associated with each such plurality of optoelectronic processors;
wherein because the optoelectronic elements are arrayed in patterns, and because the light transmitting means are within the optoelectronic processing elements, then the light transmitting means are also arrayed in the patterns of the optoelectronic processing elements within which they are contained.

25. The optically-mapping optoelectronic vector-matrix algebraic processing system according to claim 24
wherein the pattern of the light transmitters of the plurality of optoelectronic processing elements of an optoelectronic processor is replicated in a next successive optoelectronic processor in its pattern of its light detectors that are within each of its optoelectronic processing elements, but at a smaller scale.

26. The optically-mapping optoelectronic vector-matrix algebraic processing system according to claim 24
wherein the pattern of the light transmitters of the plurality of optoelectronic processing elements of an optoelectronic processor is replicated in a next successive optoelectronic processor in its pattern of its optoelectronic processing elements.

27. The optoelectronic vector-matrix algebraic processing system according to claim 23
wherein the processor-to-processor optical distribution means is space-invariant.

28. The optoelectronic vector-matrix algebraic processing system according to claim 27 wherein the space-invariant processor-to-processor optical distribution means comprises:
means for distributing each bit of each output data vector so that it is received by a corresponding one of the plurality of light detectors within each of the plurality of optoelectronic processing elements of the next processor;
wherein this means is arbitrarily called, in consideration of the matrix that is stored within the local memories of the plurality of optoelectronic processing elements, a vertical optical distribution.

29. The optoelectronic- vector-matrix algebraic processing system according to claim 27 wherein the space-invariant processor-to-processor optical distribution means comprises:
means for distributing each bit of each output data vector so that it is received by all of the plurality of light detectors that are within each corresponding one of the plurality of optoelectronic processing elements of the next processor;
wherein this means is arbitrarily called, in consideration of the matrix that is stored within the local memories of the plurality of optoelectronic processing elements, a horizontal optical distribution.

30. The optoelectronic vector-matrix algebraic processing system according to claim 23 wherein the source vector distribution means comprises:
optical means for distributing the source vector to the plurality of light detectors of the plurality of optoelectronic processing elements of a first one of the plurality of optoelectronic processors for use by this first optoelectronic processor as the input data vector.

31. The optoelectronic vector-matrix algebraic processing system according to claim 23 wherein the source vector distribution means comprises:
electrical means for distributing the source vector to the electrical computational means of the plurality of optoelectronic processing elements of a first one of the plurality of optoelectronic processors for use by this first optoelectronic processor as the input data vector.

32. A single-processor optoelectronic matrix-algebraic processing system for receiving and for algebraically manipulating an optically-encoded external data vector, the system comprising:
one optoelectronic processor comprising:
a plurality of optoelectronic processing elements first-arrayed in a plane in a first pattern, each element comprising:
a plurality of light detector means, second-arrayed in the plane in a second pattern similar to the first pattern, for receiving the optically-encoded external data vector from spatially off the plane,
memory means for storing a portion of a data matrix,
electrical circuit means for electrically algebraically manipulating the external data vector received by the light detector means in consideration of the portion of the data matrix stored by the memory means to produce a portion of a result vector, and
a light transmitter means for transmitting the portion of the result vector spatially off the plane as optically-encoded light,
wherein the collective electrical circuit means of the collective optoelectronic processing elements produce, and the collective light transmitter means of the collective optoelectronic processing elements transmit, the entire result vector; and a free-space light transfer means for communicating the result vector from the collective light transmitting means of the collective optoelectronic processing elements of the optoelectronic processor in a closed loop back to the light detector means of the plurality of optoelectronic processing elements of the optoelectronic processor;

therein to feed back in a loop back via optical communication a result vector from the optoelectronic processor to itself.

33. The system according to claim 32 further wherein the optoelectronic processor further comprises:

means for optically receiving the data matrix into the optoelectronic processor; and means for storing the optically-received data matrix in the local memories.

34. The system according to claim 32 further comprising:

means for electrically receiving the data matrix into the optoelectronic processor; and means for storing the electrically-received data matrix in the local memories.

35. The system according to claim 32 wherein the free-space light transfer means is space-invariant.

36. The system according to claim 35 wherein the free-space space-invariant light transfer means comprises:

optical distribution means for distributing the result vector so that it is received by a corresponding one of the plurality of light detectors within each of the plurality of optoelectronic processing elements of the optoelectronic processor;

wherein this optical distribution is arbitrarily called, in consideration of the matrix that is stored within the plurality of local memories of the optoelectronic processing elements of the optoelectronic processor, a vertical optical distribution.

37. The system according to claim 36 wherein the vertical optical distribution means comprises:

optical demagnification means for demagnifying the first pattern of optically-encoded light that is transmitted from the collective transmitting means as are within the collective plurality of opto-electronic processing elements of the optoelectronic processor to the size of the second pattern, and optical replication means for replicating the demagnified optically-encoded light so that it is received into the detector means within each of the plurality of optoelectronic processor elements of the optoelectronic processor;

therein to achieve optical connection from the collective transmitting means as are within the collective plurality of opto-electronic processing elements of the optoelectronic processor to the detector means within each of the plurality of optoelectronic processor elements of the optoelectronic processor.

38. The system according to claim 35 wherein the free-space space-invariant light transfer means comprises:

optical distribution means for distributing the result vector so that portion of the result vector transmitted by the light transmitting means of an optoelectronic processing element of the optoelectronic processor is received by all of the plurality of light detectors that are within the same optoelectronic processing element of the optoelectronic processor;

wherein this optical distribution is arbitrarily called, in consideration of the matrix that is stored within the plurality of local memories of the optoelectronic processing elements of the optoelectronic processor, a horizontal optical distribution.

39. The system according to claim 38 wherein the horizontal optical distribution means comprises:

optical replication means for replicating the optically-encoded light as arises from each transmitter within each of plurality of optoelectronic processing elements of the optoelectronic processor and for distributing such light to the detector means of that same identical one of the plurality of optoelectronic processing elements of the optoelectronic processor;

therein to achieve optical connection from the transmitters within each optoelectronic processing element of the optoelectronic processor to the detector means of the same optoelectronic processing element of the optoelectronic processor.

40. A plural-processor optoelectronic matrix-algebraic processing system for receiving and for algebraically manipulating an optically-encoded external data vector, the system comprising:

a first optoelectronic processor in a first-processor plane comprising:

a plurality of optoelectronic processing elements arrayed in the first-processor plane in a first pattern, each element comprising:

a plurality of light detector means, arrayed in the first-processor plane in a second pattern, for receiving an optically-encoded data vector from spatially off the first-processor plane, memory means for storing a portion of a data matrix, electrical circuit means for electrically algebraically manipulating the data vector received by the light detector means in consideration of the portion of the data matrix stored by the memory means to produce a portion of a first result vector, and a light transmitting means for transmitting the portion of the first result vector spatially off the first-processor plane as optically-encoded light, wherein the collective electrical circuit means of the collective optoelectronic processing elements of the first optoelectronic processor produce, and the collective light transmitting means of the collective optoelectronic processing elements of the first optoelectronic processor transmit, the entire first result vector;

a second optoelectronic processor in a second-processor plane comprising:

a plurality of optoelectronic processing elements, arrayed in the second-processor plane in a third pattern similar to one of the first and the second patterns, each element comprising:

a plurality of light detector means, arrayed in the second-processor plane in a fourth pattern, similar to one of the first and second patterns, for receiving an optically-encoded data vector from spatially off the second-processor plane, memory means for storing a portion of a data matrix, electrical circuit means for electrically algebraically manipulating the data vector received by the light detector means in consideration of the portion of the data matrix stored by the memory means to produce a portion of a second result vector, and
- a light transmitting means for transmitting the portion of the second result vector spatially off the second-processor plane as optically-encoded light, wherein the collective electrical circuit means as are within the collective processing elements produce, and the collective light transmitting means as are within the collective optoelectronic processing elements transmit, the entire second result vector;

a first free-space light transfer means for communicating the first result vector from the light transmitting means of the collective optoelectronic processing elements of the first processor to the light detector means within the plurality of optoelectronic processing elements of one of (i) the first and the second processors, and (ii) the second processor;

a second free-space light transfer means for communicating the second result vector from the light transmitting means of the collective optoelectronic processing elements of the second processor to the light detector means within the plurality of optoelectronic processing elements of one of (i) the second and the first processors, and (ii) the first processor.

41. The optoelectronic processing system according to claim 40 further comprising:

and external data matrix distribution means for optically communicating an optically-encoded external data matrix to the plurality of optoelectronic processing elements of at least one of the first and the second optoelectronic processors.

42. The system according to claim 40 wherein the first free-space light transfer means is space-invariant.

43. The system according to claim 42 wherein the space-invariant first free-space light transfer means comprises:

- optical demagnification means for demagnifying the first pattern of optically-encoded light that is transmitted from the collective light transmitting means as are within the collective plurality of opto-electronic processing elements of the first processor to the size of the third pattern; and
- optical replication means for replicating the demagnified optically-encoded light in the first pattern, and for distributing the demagnified and replicated first-pattern light to the detector means within the plurality of optoelectronic processor elements within the second processor, which detector means within the second processor are arrayed in the third pattern;
- wherein the third pattern is similar to the first pattern, but of a reduced size;
- therein to achieve optical connection from the light transmitting means of the first processor to each of the plurality of detector means as are within all the optoelectronic processing elements of the second processor.

44. The system according to claim 37 or claim 43 wherein the optical demagnification means comprises: a lens.

45. The system according to claim 37 or claim 43 wherein the optical replication means comprises: a hologram.

46. The system according to claim 42 wherein the space-invariant free-space light transfer means comprises:

- optical replication means for replicating the second pattern of optically-encoded light that is transmitted from the collective light transmitting means as are within the collective plurality of opto-electronic processing elements of the first processor, and for distributing the replicated second-pattern light to the plurality of light detector means within one of the plurality of optoelectronic processor elements within the second processor, which light detector means within one optoelectronic processing element of the second processor are arrayed in the fourth pattern;
- wherein the fourth pattern is similar to the second pattern;
- therein to achieve optical connection from the light transmitting means of the first processor to each of the plurality of light detector means as are within one of the optoelectronic processing elements of the second processor.

47. The system according to claim 39 or claim 46 wherein the optical replication means comprises: lenslets 48. The system according to claim 32 or claim 40 wherein at least one light transmitting means of one optoelectronic processor comprises:
a first chip;
and wherein at least one electrical circuit means of one optoelectronic processor comprises:
a second chip electrically connected to the first chip.

49. The system according to claim 32 or claim 40 wherein at least one light transmitting means of one optoelectronic processor comprises:
a circuit upon a first chip;
and wherein at least one electrical circuit means of one optoelectronic processor comprises:
a circuit upon a second chip electrically connected to the first chip by being bonded face-to-face with the first chip in a flip-chip arrangement.

50. The system according to claim 32 or claim 40 wherein at least one light detector means comprises:
a circuit upon a first chip fabricated in silicon technology; and wherein at least one light transmitting means comprises:
a circuit upon a second chip fabricated in PLZT technology and electrically connected to the first chip.

51. The system according to claim 32 or claim 40 wherein at least one light detector means comprises:
a circuit upon a first chip fabricated in silicon technology;
and wherein at least one light transmitting means comprises:
a circuit upon a second chip fabricated in PLZT technology and electrically connected to the first chip by being bonded face-to-face with the first chip in a flip-chip arrangement.

52. The system according to claim 32 or 40 wherein at least one light transmitting means comprises:
a circuit upon a chip;
and wherein at least one the light detecting means comprises:
a circuit upon the chip;
and wherein at least one electrical circuit means comprises:
a circuit upon the chip;

wherein at least one light transmitting means, at least one light detecting means, and at least one electrical circuit means are fabricated as a monolithic structure upon a single chip.

53. The system according to claim 32 or claim 40 wherein at least one plurality of optoelectronic processing elements in at least one processor comprises:
   N optoelectronic processing elements arrayed in a square two-dimensional first array of dimension $\sqrt{N}$ elements by $\sqrt{N}$ elements.

54. The system according to claim 32 or claim 40 wherein at least one of the plurality of optoelectronic processing elements in at least one processor comprises:
   an electrically-connected tree-based interconnection of the plurality of light detector means, the memory means, the electrical circuit means, and the light transmitting means.

55. The system according to claim 32 or claim 40 wherein at least one of the plurality of optoelectronic processing elements in at least one processor comprises:
   an electrically-connected binary tree-based interconnection of the plurality of light detector means, the memory means, the electrical circuit means, and the light transmitting means.

56. The system according to claim 32 or claim 40 wherein at least one of the plurality of optoelectronic processing elements in at least one processor comprises:
   an electrically-connected binary H-tree-based interconnection of the plurality of light detector means, the memory means, the electrical circuit means, and the light transmitting means.

57. The system according to claim 32 or claim 40 wherein at least one of the plurality of optoelectronic processing elements in at least one processor comprises:
   fan-in processing unit means for electrically summing the outputs of the plurality of light detector means and presenting the sum to the light transmitting means.

58. A matrix algebraic optoelectronic processing system operating on external data vectors, the system comprising:
   an optoelectronic processor comprising a plurality of M processing elements arranged in a substantially planar having M rows, each processing element comprising and electrically interconnecting in a tree structure
      N leaf units corresponding to the matrix elements within a given row, each leaf unit comprising an electrically-connected
         plurality of light detectors,
         local memory,
         logic circuitry, and
         electronic input/output,
      the leaf units electrically connected to a root node unit of the tree, the root node unit comprising an electrically-connected
         local memory,
         logic circuitry,
         electronic input/output, and
         optical transmitter;
      wherein the processing element supports an electrical distribution of data via its tree structure between the plurality of leaf units and the root unit; and
   a first, vertical, optical distribution for introducing to the M processing elements a first data vector originating outside the matrix algebraic processor, the introducing being from a location off the plane of the M planar-arrayed processing elements, the introducing transmitting the first external vector data element $x_j$ to the jth leaf unit of each processing element by action of supplying information-encoded light to a first one of the plurality of light detectors of this jth leaf unit;
   wherein local computation is performable at each processing element's leaf units on (i) data received via the first optical distribution and the electrical distribution, and (ii) data from the leaf unit's local memory;
   wherein during a fan-in of the external data vector a computation, distributed among leaf units and the root unit, is performed within each processing element during passage of the data from the leaf units to the root unit;
   wherein computation upon the external data vector produces a result at the root unit;
   wherein the computational result is transmittable from the root unit's optical transmitter as an optical output;
   wherein the optoelectronic processing system is capable of performing matrix vector arithmetic and symbolic manipulations.

59. The matrix algebraic optoelectronic processing system according to claim 58 wherein the optoelectronic processors tree-structured processing elements further comprise between the leaf units and the root node unit:
   intermediate fanning-unit nodes of the tree, each fanning-unit node comprising electrically-connected
      local memory,
      logic circuitry, and
      electronic input/output,
   wherein local computation is also performable at each processing element's fanning-unit nodes on (i) data received via the electrical distribution from the leaf nodes, and (ii) data from the fanning-unit's local memory;
   wherein during a fan-in of the external data vector the computation is distributed among the fanning-unit nodes as well as the leaf units and the root unit element during the passage of the data from the leaf units to the root unit;
   wherein the optoelectronic processing system is capable of performing generalized matrix vector arithmetic and symbolic manipulations with tree-based processing.

60. The matrix algebraic optoelectronic processing system according to claim 59
   wherein the electrical distribution of data within each tree-structured processing element is bi-directional, being from and to the plurality of leaf units to and from the root unit via the fanning units;
   and wherein the system further comprises:
      a second, horizontal, optical distribution for introducing to the M processing elements a second data vector originating outside the matrix algebraic processor, the introducing being from a location off the plane of the M planar-arrayed processing elements, the introducing transmitting the second external vector data element $y_i$ to each leaf unit of the ith processing element by action of supplying information-encoded light to a second one of the plurality of light detectors of each leaf unit;
      wherein the optoelectronic processing system is capable of performing intrinsic and extrinsic vector outer product arithmetic and symbolic manipulations.

61. Two matrix algebraic optoelectronic processors according to claim 58 physically spaced parallel and operating in tandem as a system to process the matrix algebraic problem of M×N size, the tandem matrix algebraic processing system comprising:
- a first space-invariant optical system for performing the first optical distribution from a first to a second of the spaced-parallel optoelectronic processors by action of transmitting the first external vector data element $x_j$ to the jth leaf unit of each processing element by action of supplying information-encoded light to a first one of the two light detectors of the leaf unit;
- a second space-invariant optical system for performing the second optical distribution from the first to the second of the spaced-parallel optoelectronic processors by action of transmitting the second external vector data element $y_i$ to each leaf unit of the ith processing element by action of supplying information-encoded light to a second one of the two light detectors of the leaf unit;
- a third space-invariant optical system for performing the first optical distribution from the second to the first of the spaced-parallel optoelectronic processors by action of transmitting the first external vector data element $x_j$ to the jth leaf unit of each processing element by action of supplying information-encoded light to a first one of the two light detectors of the leaf unit; and
- a fourth space-invariant optical system for performing the second optical distribution from the second to the first of the spaced-parallel optoelectronic processors by action of transmitting the second external vector data element $y_i$ to each leaf unit of the ith processing element by action of supplying information-encoded light to a second one of the two light detectors of the leaf unit.

62. The matrix algebraic optoelectronic processing system according to claim 58 further comprising:
- a space-invariant optical system for introducing to the M processing elements a plurality M of memory data vectors originating outside the matrix algebraic processing system, one data vector per processing element;
- wherein the introducing is to the local memories of the plurality N leaf units, the fanning units, and the root unit of the M processing elements.

63. The matrix algebraic optoelectronic processing system according to claim 58 further comprising:
- a second electrical distribution for introducing to the M processing elements a plurality M of memory data vectors originating outside the processing system, one data vector per processing element;
- wherein the introducing is to the local memories of the plurality N leaf units, the fanning units, and the root unit of the M processing elements.

64. An optoelectronic matrix algebraic processing system operating on external data vectors, the system comprising:
- a plurality L of optoelectronic processor $OP_k$ where k equals 1 through L, each optoelectronic processor $OP_k$ comprising:
  - a plurality of $M_k$ arrayed optoelectronic processing elements $OPE_m$, m equals 1 through $M_k$, each optoelectronic processing element $OPE_k$ comprising and electrically connecting in a tree structure
    - $N_k$ leaf units $LU_n$, n equals 1 to $N_k$, each comprising an electrically-connected
      - plurality of light detectors,
      - local memory,
      - logic circuitry, and
      - electrical input/output,
      electrically connected to
    - a root node unit of the tree, the root node unit comprising an electrically-connected
      - local memory,
      - logic circuitry,
      - electrical input/output, and
      - optical transmitter;
    - wherein the optoelectronic processing element $OPE_k$ supports an electrical distribution of data via its tree structure between the plurality of leaf units and the root unit; and
- a plurality of vertical optical distributions $VOD_v$, v equals 1 though V, each for the purpose of distributing a data vector transmitted from an associated optoelectronic processor $OP_{t(v)}$ to an associated optoelectronic processor $OP_{r(v)}$, where the data vector portion transmitted by the optoelectronic processing element $OPE_i$ of the transmitting optoelectronic processor $OP_{t(v)}$ is received by one of the plurality of light detectors within the leaf unit $TU_i$ within each optoelectronic processing element $OPE_m$, m equals 1 though $M_{r(v)}$, within the receiving optoelectronic processor $OP_{r(v)}$, with the restriction that $M_{t(v)}$ equals $N_{r(v)}$; and
- a plurality of horizontal optical distributions $HOD_h$, h equals 1 though H, each for the purpose of distributing a data vector transmitted from an associated optoelectronic processor $OP_{t(h)}$ to an associated optoelectronic processor $OP_{r(h)}$, where the data vector portion transmitted by the optoelectronic processing element $OPE_i$ of the transmitting optoelectronic processor $OP_{t(h)}$ is received by one of the plurality of light detectors within each leaf unit $LU_i$ within each optoelectronic processing element $OPE_j$, within the receiving optoelectronic processor $OP_{r(h)}$, with the restriction that $M_{t(h)}$ equals $M_{r(h)}$;
- wherein local computation is performable at each processing element's leaf unit on (i) data received via any of the optical distributions and the electrical distribution, and (ii) data from the leaf unit's local memory;
- wherein during a fan-in of the external data vector a computation, distributed among leaf units and the root unit, is performed within each processing element during passage of the data from the leaf units to the root unit;
- wherein computation on data vectors received through optical distributions produces a result at the root unit;
- wherein the computational result is transmittable from the root unit's optical transmitter as an optical output;
- wherein the optoelectronic processing system is capable of performing matrix vector arithmetic and symbolic, algebraic, manipulations.

65. A tandem-architecture free-space-optically-communicating optoelectronic matrix-algebraic processing system comprising: two planar optoelectronic processors, each for (i) accepting optically-encoded information received from off-plane, (ii) electrically processing the received information, and (iii) optically transmitting the electrically-processed information off-plane;

a first free-space optical system for coupling the optical off-plane transmission of a first processor to a second processor; and a second free-space optical system for coupling the optical off-plane transmission of the second processor to the first processor.

66. The system according to claim 65 wherein each of the planar optoelectronic processors comprises:

a grid array of M×N leaf units each having an light detector;

M root units each having an optical transmitter; and

N electrical fanning means connected in a tree-based structure between M leaf elements and a corresponding root unit, for processing and for electrically communicating optically-encoded information received at the leaf units to a corresponding one of the N root units;

wherein the processed information received at the root unit is transmitted off-plane by the optical transmitter.

67. The system according to claim 65 wherein the grid array of M×N leaf units of the first processor encodes an M×N data matrix;

wherein the grid array of M×N leaf elements of the second processors encodes the transpose of the data matrix;

wherein the first space-invariant optical system couples the M transmitters of the M root units of the first processor to a selected row of the N×M matrix of leaf elements of the second processor; and wherein the second space-invariant optical system couples the N transmitters of the N root units of the second processor to a selected column of the M×N matrix of leaf elements of the first processor.

68. The system according to claim 65 wherein the two planar optoelectronic processors are on distinct planes.

69. The system according to claim 65 wherein the two planar optoelectronic processors are coplanar.

70. An optically-mapping optoelectronic vector-matrix algebraic processing system for algebraically manipulating an $N_1$-bit input vector stepwise in accordance with L stored matrices $Y_k$, each matrix $Y_k$ being of $M_k$ rows by $N_k$ columns where k equals 1 through L, in order to produce a $M_k$-bit output vector, the vector-matrix algebraic processing system comprising:

one or more, L, optoelectronic processors, each optoelectronic processor $OP_k$, k equals 1 through L, comprising:

a plurality of $M_k$ arrayed optoelectronic processing elements 1, 2, ... M, each optoelectronic processing element $OPE_m$, m equals 1 through M, comprising:

a plurality of $N_k$ light detectors, each light detector $LD_n$, n equals 1 through N, for detecting a corresponding data bit $X_n$, n equals 1 through $N_k$, of an optically-encoded $N_k$-bit input vector X, a plurality of at least $N_k$ local memories, each local memory $LM_n$, n equals 1 though $N_k$, for storing a data bit $Y_{mn}$ of a row m of a matrix $Y_k$, m equaling the number of the $OPE_m$ in processor $OP_k$, in which processor $OP_k$ the local memory $LM_{mn}$ is located while n equals 1 through $N_k$, an electrical computational means for electrically performing an algebraic operation on the $N_k$-bit input vector X detected by the $N_k$ light detectors of processor $OP_k$ in consideration of the row m of the stored matrix $Y_k$ held within the at least $N_k$ local memories to produce a result bit $Z_i$ of a result vector Z, and a light transmitter for transmitting the result bit $Z_i$ of the result vector Z as an optically-encoded output signal;

wherein the collective $N_k$ local memories of the collective $M_k$ optoelectronic processing elements of each optoelectronic processor $OP_k$ thus hold a matrix $Y_k$ of size $M_k$ rows $\times N_k$ columns, wherein the collective $M_k$ light transmitters of the collective $M_k$ optoelectronic processing elements of each optoelectronic processor $OP_k$ thus transmit a result vector $Z_j$ of $M_k$ bits;

wherein the algebraic operation performed by the collective L optoelectronic processors is thus the stepwise manipulation of an $N_1$-bit input vector X by a successive matrices $Y_k$ each of $M_k$ rows by $N_k$ columns, k equals 1 through L, with the additional restriction that $N_k$ is equal to $M_{k-1}$; and a processor-to-processor optical distribution means for optically distributing a first result vector $Z_1$ from the $N_1$ light transmitters of an first optoelectronic processor $OP_1$ to the $N_1$ light detectors of each of the $M_2$ optoelectronic processing elements of a next optoelectronic processor $OP_2$ and so on, processor-to-processor as each in turn performs an algebraic operation, the distributing being so that each bit $Z_1$ of the first result vector $Z_1$ of the first optoelectronic processor $OP_1$ is transmitted to the ith light detector of all $M_1$ rows of processing elements of the next optoelectronic processor $OP_2$ and so on;

wherein a last optically-encoded result vector $Z_L$ is derived as an algebraic manipulation of the original optically-encoded input vector X by a series of matrices $Y_k$, k equals 1 through L, as are held within each of the plurality L of optoelectronic processors.

71. An optically-mapping optoelectronic tandem vector-vector algebraic processing system for algebraically manipulating an N-bit vector X in accordance with an N-bit vector Y to produce a N×N-bit result matrix Z, and, in tandem, for algebraically manipulating the N-bit vector Y in accordance with the N-bit vector X to separately produce the N×N-bit result matrix Z, wherein one reason for separately-producing two same-result matrices Z is that these matrices are located separately, and are useful in intrinsic vector outer product computations, the vector-vector algebraic processing system for producing two result matrices in tandem comprising:

a first optoelectronic processor 1 having a plurality of N arrayed optoelectronic processing elements 1, 2, ... N, each processing element i, i equals 1 through N, comprising a plurality of N light detectors, each for detecting a data bit $X_j$ of an optically-encoded input vector X, j equals 1 through N, a plurality of at least N local memories at least one of which is for storing a data bit $Y_1$ of a stored vector Y, an electrical computational means for electrically performing an algebraic operation on the input vector X detected by the N light detectors in consideration of the stored data vector Y held within the N local memories to produce a result bit $Z_i$ of a result vector Z, a light transmitter for transmitting a received bit-signal as an optically-encoded output signal, a bi-directional electrical distribution means (i) for, at a first time, communicating the data bit $Y_i$ of the vector Y as is stored in at least one of the N local memories to the light transmitter in order that it may be transmitted as an output signal, and, (ii) for, at a second time, distributing the result bit $Z_i$ to the N local memories for storage therein as a new result data bit $Z_{ij}$ of the result matrix Z, and wherein the collective local memories of the collective N optoelectronic processing elements thus initially hold a vector Y of size N bits;

wherein, at the first time, the collective light transmitters of the collective N optoelectronic processing elements transmit this vector Y of N bits;

wherein the algebraic operation performed by the collective optoelectronic processing elements of the first optoelectronic processor is thus the manipulation of an N-bit input vector X by a N-bit stored vector Y to produce a N×N-bit result matrix Z which is stored in the collective local memories of the first optoelectronic processor;

a second optoelectronic processor 2 having a plurality of N arrayed optoelectronic processing elements 1, 2, ... N, each processing element i, i equals 1 through N, comprising a plurality of N light detectors, each for detecting a data bit $Y_j$ of an optically-encoded input vector Y, j equals 1 through N, a plurality of at least N local memories at least one of which is for storing a data bit $X_i$ of a stored vector X, an electrical computational means for electrically performing an algebraic operation on the input vector Y detected by the N light detectors in consideration of the stored data vector X held within the N local memories to produce a result bit $Z_i$ of a result vector Z, a light transmitter for transmitting a received bit-signal as an optically-encoded output signal, a bi-directional electrical distribution means (i) for, at a first time, communicating the data bit $X_i$ of the vector X as is stored in at least one of the N local memories to the light transmitter in order that it may be transmitted as an output signal, and, (ii) for, at a second time, distributing the result bit $Z_1$ to the N local memories for storage therein as a new result data bit $Z_{ij}$ of the result matrix Z, and wherein the collective local memories of the collective N optoelectronic processing elements thus initially hold a vector X of size N bits;

wherein, at the first time, the collective light transmitters of the collective N optoelectronic processing elements transmit this vector X of N bits;

wherein the algebraic operation performed by the collective optoelectronic processing elements of the second optoelectronic processor is thus the manipulation of an N-bit input vector Y by a N-bit stored vector X to produce a N×N-bit result matrix Z which is stored in the collective local memories of the first optoelectronic processor;

a first-processor-to-second-processor optical distribution means for optically distributing the data vector Y from the N light transmitters of the first processor to each of the N light detectors of each of the N processing elements of the second processor, this distributing being so that each bit $Y_i$ of the data vector Y of the first processor is transmitted to the ith light detector of all N rows of processing elements of the second processor; and a second-processor-to-first-processor optical distribution means for optically distributing the data vector X from the N light transmitters of the second processor to each of the N light detectors of each of the N processing elements of the first processor, this distributing being so that each bit $X_i$ of the data vector X of the second processor is transmitted to the ith light detector of all N rows of processing elements of the first processor; and wherein a result matrix Z is derived in the first processor as an algebraic manipulation of the original optically-encoded input vector X by a the vector Y that was held within local memories of the plurality of N arrayed optoelectronic processing elements;

wherein the same result matrix Z is derived in the second processor as an algebraic manipulation of the original optically-encoded input vector Y by a the vector X that was held within local memories of the plurality of N arrayed optoelectronic processing elements.

72. An optoelectronic matrix-algebraic processing system operating on external data vectors in order to solve a matrix algebraic problem of M×N size, the system comprising:

two optoelectronic processors 1,2 each having M optoelectronic processing elements arrayed in N rows, each processing element $PE_i$, i equals 1 through M, comprising N light detectors, each for detecting a data bit $X_j$ of an optically-encoded input vector X, j equals 1 through M, N local memories each for storing a data bit $Y_{ij}$ of a stored vector Y, j equals 1 through N, an electrical computational means for electrically performing a matrix algebraic operation on the input vector X detected by the N light detectors and on the stored data vector Y held within the N local memories to produce a result bit Z: of a result vector Z, and an optical transmitter for transmitting the result bit $Z_i$ of the result vector Z off the plane of the arrayed processing elements;

wherein the collective optical transmitter of the M optoelectronic processors transmit an M-bit result vector Z;

a first-processor-to-second-processor optical distribution means for distributing a first result vector $Z_1$ from the M light transmitters of a first processor to the M light detectors of each of the N optoelectronic processing elements of a second processor, the distributing being so that each bit $Z_{1i}$ of the first data vector $Z_1$ of the first processor is transmitted to the ith light detector of all N rows of processing elements of the second processor;

a second-processor-to-first-processor optical distribution means for distributing a first result vector Z from the N light transmitters of the second processor to the N light detectors of the first processor, the distributing being so that each bit $Z_{2i}$ of the second data vector $Z_2$ of the second processor is transmitted to the jth light detector of the ith row of processing elements of the first processor.

73. The matrix-algebraic optoelectronic processing system according to claim ,4 wherein at least one of the first-to-second-matrix optical distribution means and the second-to-first-matrix optical distribution means comprises:

a space-invariant optical system.

74. A dual-topology H-tree optoelectronic matrix-algebraic processing system comprising:

two planar optoelectronic processors, each comprising one or more processing elements in an H-tree topology, each processing element comprising an N×M array of leaf node light detectors receiving optically-encoded information from off-plane, electrically connected by equal-length first electrical paths to intermediate-node electrical circuits for electrically processing the received information, the electrical circuits being electrically connected to one another in a tree by second electrical paths that are of substantially the same, equal-length, length as are the first electrical paths, and finally electrically connecting by third electrical paths that are again substantially the same, equal-length, length as are the first electrical paths to a plurality of N light transmitters for optically transmitting the processed information off-plane; and a first optical system for mapping the optical off-plane broadcast of the N light transmitters of a first processor onto the M light detectors of a second processor; and a second optical system for mapping the optical off-plane broadcast of the N light transmitters of the second processor onto the M light detectors of the first processor;

wherein the H-tree topology of the processing elements supports that all the light detectors and electrical circuits and optical transmitter are electrically connected by paths of substantially the same length;

wherein a duality of the topology arises because the optoelectronic processors are two in number.

75. A method of optically communicating information between two-dimensional planes of an optoelectronic processor having a plurality of successive two-dimensional planes, and a plurality of optoelectronic processing elements, each which optoelectronic processing element has (i) an energy transmitter, by which transmitter information is encoded and transmitted off plane in third dimension, and (ii) a plurality of energy receivers, by each of which receivers encoded information is optically received from off plane in the third dimension, the method comprising:

first-arraying the optoelectronic processing elements in at least one of the plurality of planes in a first pattern at a first scale;

wherein because the optoelectronic processing elements are first-arrayed in the first pattern at the first scale then so also are the energy transmitters arrayed in the same first pattern at the same first scale;

second-arraying the plurality of energy receivers that are within each of the optoelectronic elements of a next successive one of the plurality of planes to be in a second pattern at a second scale which is smaller than the first scale;

demagnifying via optics a first pattern of energy, which first energy pattern is encoded and transmitted from the collective energy transmitters as are within the collective plurality of optoelectronic processing elements as are first-arrayed within the at least one plane, to the size of the second pattern, and replicating via optics the demagnified encoded energy pattern so that it is received into the energy receivers that are within each of the plurality of optoelectronic processing elements of the next subsequent plane;

therein to achieve optical connection from the collective energy transmitters as are within the collective plurality of optoelectronic processing elements of the one plane to the energy receivers that are within each of the plurality of optoelectronic processing elements of the next subsequent plane.

76. An optoelectronic processor comprising:

a plurality of successive two-dimensional planes each of which has and contains a plurality of optoelectronic processing elements, two-dimensionally first-arrayed in a first pattern at a first scale, each of which optoelectronic processing elements has and contains an energy transmitter, by which transmitter information is encoded and transmitted off plane in third dimension, and a plurality of energy receivers, by each of which receivers encoded information is optically received from off plane in the third dimension, arrayed in a second pattern at a second scale which is smaller than the first scale wherein because the optoelectronic processing elements are first-arrayed in the first pattern at the first scale then so also are the energy transmitters of the plural optoelectronic processing elements arrayed in the same first pattern at the same first scale;

optical demagnification means for demagnifying a first pattern of energy, which first energy pattern is encoded and transmitted from the collective energy transmitters as are within the collective plurality of optoelectronic processing elements as are first-arrayed within a plane, to the size of the second pattern; and optical replication means for replicating the demagnified encoded energy pattern so that it is received into the energy receivers that are within each of the first-arrayed plurality of optoelectronic processing elements of a next subsequent plane;

wherein the optical demagnification means and the optical replication means jointly optically communicatively connect the collective energy transmitters as are within the collective plurality of optoelectronic processing elements of the one plane to the energy receivers that are within each of the plurality of optoelectronic processing elements of the next subsequent plane.

77. An optoelectronic processor comprising:

a plurality of successive two-dimensional planes each of which has and contains a plane-associated number of optoelectronic processing elements, two-dimensionally first-arrayed in an plane-associated first pattern at a plane-associated first scale, each of which optoelectronic processing elements has and contains an energy transmitter, by which transmitter information is encoded and transmitted off plane in third dimension, and a plurality of energy receivers, by each of which receivers encoded information is optically received from off plane in the third dimension, arrayed in a plane-associated second pattern at a plane-associated second scale which is smaller than the first scale, wherein because the optoelectronic processing elements are first-arrayed in the plane-associated first pattern at the plane-associated first scale then so also are the energy transmitters of the plural optoelectronic processing elements arrayed in the same plane-associated first pattern at the same first scale, wherein any of (i) the numbers of optoelectronic processing elements, (ii) the plane-associated first pattern, (iii) the plane-associated first scale, (iv) the plane-associated second pattern, and (v) the plane-associated second scale, may vary from one plate to the next, and at least some do so very;

wherein (i) the numbers of optoelectronic processing elements varies as between at least two successive planes out of the plurality thereof; and optical distribution means for optically distributing a first pattern of energy encoded and transmitted from the collective energy transmitters that are within a collective plurality of optoelectronic processing elements as are first-arrayed within a one plane to the energy receivers that are within each of the first-arrayed plurality of optoelectronic processing elements of a next subsequent plane;

wherein, between the at least two successive planes that do not contain equal numbers of optoelectronic processing elements, the optical distribution means suffices to optically distribute energy from some collective number of energy transmitters as are within the collective plurality of optoelectronic processing elements of the one plane to another, different, numbers of energy receivers that are within each of the plurality of optoelectronic processing elements of the next subsequent plane;

wherein optical communication between planes accords both for fan-out from smaller to larger numbers of optoelectronic processing elements, and for fan-in from larger to smaller number of optoelectronic processing elements.

* * * * *